(12) United States Patent (10) Patent No.: US 7,987,228 B2
McKeown et al. (45) Date of Patent: Jul. 26, 2011

(54) BROADBAND COMMUNICATIONS

(75) Inventors: Jean Christophe McKeown, Mandelieu (FR); Henri Chabrier, Biot (FR)

(73) Assignee: Accenture Global Services Limited, Dublin (IE)

( * ) Notice: Subject to any disclaimer, the term of this patent is extended or adjusted under 35 U.S.C. 154(b) by 533 days.

(21) Appl. No.: 10/481,933

(22) PCT Filed: Jul. 3, 2002

(86) PCT No.: PCT/GB02/03074
§ 371 (c)(1),
(2), (4) Date: Jun. 21, 2004

(87) PCT Pub. No.: WO03/005195
PCT Pub. Date: Jan. 16, 2003

(65) Prior Publication Data
US 2004/0261116 A1 Dec. 23, 2004

(30) Foreign Application Priority Data

Jul. 3, 2001 (EP) .................... 01401767
Mar. 26, 2002 (WO) ............. PCT/GB02/01461
May 22, 2002 (WO) ............. PCT/GB02/02372

(51) Int. Cl.
*G06F 15/16* (2006.01)
(52) U.S. Cl. ........ 709/202; 709/223; 709/224; 709/229; 714/2; 714/4; 714/13; 714/703; 714/741; 726/11; 726/12; 726/15; 726/25; 379/1.01; 379/26.01
(58) Field of Classification Search .......... 709/217, 709/222, 224, 202, 223, 229; 714/4, 2, 703, 714/13, 741, 28, 47; 715/34; 726/15, 25, 11, 12; 379/1.01, 26.01
See application file for complete search history.

(56) References Cited

U.S. PATENT DOCUMENTS

| 5,049,873 | A | | 9/1991 | Robins et al. |
| 5,682,325 | A | * | 10/1997 | Lightfoot et al. ............. 709/229 |
| 5,687,212 | A | | 11/1997 | Kinser, Jr. et al. |
| 5,774,689 | A | | 6/1998 | Curtis et al. |
| 6,023,464 | A | | 2/2000 | Woundy |
| 6,049,826 | A | | 4/2000 | Beser |
| 6,081,506 | A | | 6/2000 | Buyukkoc et al. |
| 6,094,676 | A | | 7/2000 | Gray et al. |
| 6,101,535 | A | | 8/2000 | Hussmann et al. |
| 6,101,539 | A | | 8/2000 | Kennelly et al. |

(Continued)

FOREIGN PATENT DOCUMENTS

EP 0310782 4/1989

(Continued)

OTHER PUBLICATIONS

GB0422868.0 Search Report, Jun. 8, 2005.

(Continued)

*Primary Examiner* — Thuong T Nguyen
(74) *Attorney, Agent, or Firm* — Fish & Richardson P.C.

(57) ABSTRACT

The invention relates to communications, particularly but not exclusively broadband communications. One facet of the present invention relates to provisioning of services in a communications network and finds particular, but not exclusive, application in a broadband network environment or other environment where services are provisioned. The provisioning of services will now be discussed in more detail.

20 Claims, 65 Drawing Sheets

U.S. PATENT DOCUMENTS

| | | | |
|---|---|---|---|
| 6,173,324 B1 | 1/2001 | D'Souza | |
| 6,188,757 B1 | 2/2001 | Malik | |
| 6,233,449 B1 * | 5/2001 | Glitho et al. | 455/423 |
| 6,269,330 B1 | 7/2001 | Cidon et al. | |
| 6,292,838 B1 | 9/2001 | Nelson | |
| 6,341,221 B1 | 1/2002 | Huotari | |
| 6,466,986 B1 | 10/2002 | Sawyer et al. | |
| 6,557,030 B1 | 4/2003 | Hoang | |
| 6,594,305 B1 | 7/2003 | Roeck et al. | |
| 6,601,020 B1 | 7/2003 | Myers | |
| 6,636,505 B1 | 10/2003 | Wang et al. | |
| 6,662,221 B1 | 12/2003 | Gonda et al. | |
| 6,725,267 B1 | 4/2004 | Hoang | |
| 6,778,525 B1 | 8/2004 | Baum et al. | |
| 2001/0019559 A1 | 9/2001 | Handler et al. | |
| 2001/0049737 A1 | 12/2001 | Carolan et al. | |
| 2002/0022969 A1 * | 2/2002 | Berg et al. | 705/1 |
| 2002/0039352 A1 * | 4/2002 | El-Fekih et al. | 370/252 |
| 2002/0141544 A1 | 10/2002 | Brown et al. | |
| 2002/0194076 A1 * | 12/2002 | Williams et al. | 705/26 |
| 2002/0198840 A1 * | 12/2002 | Banka et al. | 705/50 |
| 2002/0199007 A1 * | 12/2002 | Clayton et al. | 709/230 |
| 2003/0023710 A1 * | 1/2003 | Corlett et al. | 709/223 |
| 2003/0033406 A1 * | 2/2003 | John et al. | 709/224 |
| 2003/0051163 A1 * | 3/2003 | Bidaud | 713/201 |
| 2003/0051186 A1 * | 3/2003 | Boudnik et al. | 714/2 |
| 2003/0145039 A1 * | 7/2003 | Bonney et al. | 709/202 |
| 2004/0261116 A1 * | 12/2004 | Mckeown et al. | 725/109 |
| 2006/0034185 A1 | 2/2006 | Patzschke et al. | |

FOREIGN PATENT DOCUMENTS

| | | |
|---|---|---|
| EP | 1139221 | 10/2001 |
| GB | 2350031 | 11/2000 |
| JP | 10051488 | 7/1996 |
| WO | WO 95/34866 | 12/1995 |
| WO | WO 97/50209 | 12/1997 |
| WO | WO 99/18695 | 4/1999 |
| WO | WO 00/22534 | 4/2000 |
| WO | WO 00/74304 | 12/2000 |
| WO | WO 01/14988 | 3/2001 |
| WO | WO 01/19080 | 3/2001 |
| WO | WO 01/41365 | 6/2001 |
| WO | WO 02/093804 | 11/2002 |
| WO | WO 02/095584 | 11/2002 |

OTHER PUBLICATIONS

GB0510679.4 Search Report, Jun. 14, 2005.
"Network management basics", www.cisco.com/univercd/cc/td/doc/cisintwk/ito_doc/nmbasics.htm, Jun. 2, 2005.
Tl Glossary 2000 definition of provisioning, www.its.bldroc.gov/projects/devglossary/tlg2k.html, Jun. 9, 2005.
GB0511999.5 Search Report, Jul. 19, 2005.
GB0511997.9 Search Report, Jul. 19, 2005.
Broadband Cable Association of Pennsylvania (BCAP) Glossary, printed from <http://www.bcapa.com/about/glossary.php?page=e>.
GB0510679.4 Combined Search and Examination Report, Jun. 15, 2005.
Correspondence and claim chart from Attorney Michael J. Colitz, dated Jun. 12, 2007.
CIPO (Canada) examination & search report, May 21, 2009.
European Office Action for EP Application No. 02 730 437.7, dated Jul. 21, 2010, 6 pages.

* cited by examiner

| | | | |
|---|---|---|---|
| Imagine SA - STB Manager | | | |
| User Name | | First Name | Logout |
| IP Address | 10.0.5.10 | MAC Address | FW / Search |

| | |
|---|---|
| MAC Address | 00:50:04:30-4D:D3 |
| Set Top Box IP | 10.0.5.10 |
| DNS Server IP | 0.0.0.0 |
| Subnet Mask IP | 255.255.255.128 |
| Default Gateway IP | 10.0.5.1 |
| Quality of Service | gold1.cm |
| IMcast Proxy | 192.168.7.10 |
| Liberate Security Proxy | 192.168.7.10 |
| First URL | http://192.168.7.10/cgi-Browser/Bar/HTML/home.html |
| Channel Frequency | 150000 Hz |
| Symbol Rate | 5300 M Symbols/sec |
| SNR Estimate | 34.5 dB |
| Pre RS Error Rate | 0.10.3 s |
| Post RS Error Rate | 0.10.5 s |
| Lock Status | Locked |
| Power Level | -4 dBmV |
| Assigned SID | 5 |

1802, 1804, 1806, 1808, 1810, 1812, 1814, 1816, 1818, 1820, 1822, 1824, 1826, 1828, 1830, 1832, 1834

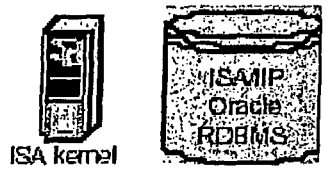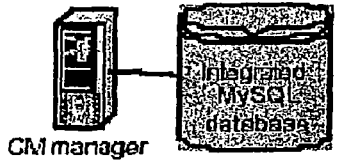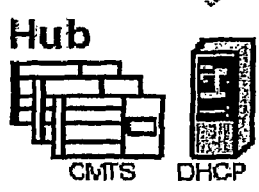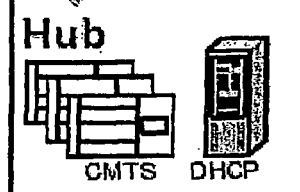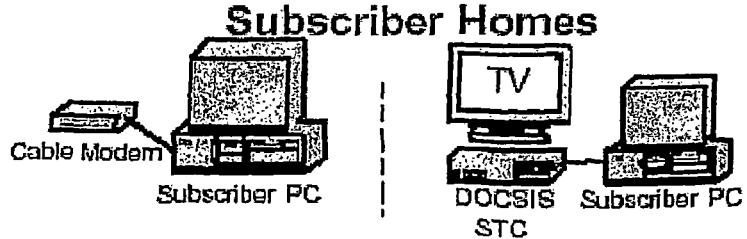
*Fig. 22*

| XML tag | Description | Value |
|---|---|---|
| <Connection> | Start tag for the Connection section | |
| <Type> | Sets the type of the connection | Fixed Value<br>Direct = Management<br>Switch = Switch<br>CableModem = Cable modem<br>DSLModem= DSL Modem |
| <Interface> | Sets the Interface used for the Management connection | Fixed Value<br>Eth0 = Management<br>Eth1= switch or Cable Modems |
| <IPAddress> | Sets the IP Address of the Switch | Fixed Value |
| <Community> | Sets the community of the Switch | Public<br>Private |
| <PortOid> | Sets the Port Object Identification | |
| <TypeOid> | Sets the type of the UpOid and the DownOid | Fixed Value – Integer |
| <UpOid> | Sets 1 if the port of the switch is opened | 1 |
| <DownOid> | Sets 2 if the port of the switch is closed | 2 |
| <AgentPort> | Sets the Port for the connection with the ISEA Agent | What ever port number on the switch as long as it is only used to connect the ISEA to the switch |
| <ManagementPort> | Sets the Port used for the connection with the Management | What ever port number on the switch as long as it is only used to connect to the management network. It must be unique and different that the Agent Port |
| </Connection> | End tag for the Connection section | |

*Fig. 49*

| XML tag | Description | Value |
|---|---|---|
| <Connection> | Start tag for the Connection section | |
| <Type> | Sets the type of the connection | Fixed Value<br>Direct = Management<br>Switch = Switch<br>CableModem = Cable modem<br>DSLModem = DSL Modem |
| <Interface> | Sets the port of the switch where the cable modem is connected (Caveat to not use the switch port) | Fixed Value<br>1 to 8<br>1 to 24 |
| <Location> | Sets the Location of the Cable Modem connection to the switch | Fixed value |
| <IPAddress> | Sets the IP Address of the Cable Modem. The cable modem must be provisioned | Fixed value |
| <MACAddress> | Sets the MAC Address of the Cable Modem. The cable modem must be provisioned | Fixed value |
| <Community> | Sets the community of the Cable Modem | Public<br>Private |
| <CommandToKill> | Deprovision the Cable Modem | dhcpcd -k #interface# |
| <CommandToLaunch> | Provision the Cable Modem | dhcpcd -d -t #timeout# #interface# |
| <WaitedResponse> | Returns the message: "dhcpcd: your IP address" | Fixed value |
| <Timeout> | Sets the connection Time out in seconds | 45 |
| </Connection> | End tag for the Connection section | |

*Fig. 50*

| XML tag | Description | Value |
|---|---|---|
| <?xml version="1.0" ... ?> | Xml file header | Fixed Value |
| <SchedulerManager> | Start tag for the File Name | Fixed value |
| <!-- Common Part --> | Commentary | |
| <DebugName> | Sets the Scheduler Manager Name used for the Debug mode | SchedulerManager |
| <DebugLevel> | Sets the debug level used by the application to log debugging info. | Info = all Agent activities<br>Warning = abnormal activities<br>Error = Error activities<br>Critical = Agent is down |
| <AlarmWriter> | Sets a file as a default Alarm Writer | FlatFile |
| <AlarmWriter> | Sets a mail account as a default Alarm Writer | Mail |
| <AlarmHandler> | Start tag for the Alarm handler section | |
| <DebugName> | Sets the Alarm Handler Name used for the Debug mode | AlarmHandler |
| <DebugLevel> | Sets the debug level used by the application to log debugging info. | Info = all Agent activities<br>Warning = abnormal activities<br>Error = Error activities<br>Critical = Agent is down |

Fig. 51a

| XML tag | Description | Value |
|---|---|---|
| <SleepTime> | Sets the time interval during which the alarm is not activated in milliseconds | 5000 |
| <AlarmWriter> | Start tag for the Alarm Writer section | |
| <Type> | Sets the type of the file Alarm Writer | FlatFile |
| <Path> | Sets the file path | test.alarms |
| </AlarmWriter> | End tag for the file Alarm Writer section | |
| <AlarmWriter> | Start tag for the mail Alarm Writer section | |
| <Type> | Sets the type of the Alarm Writer | Mail |
| <From> | Sets the alarm IP Address as defined in the Xmail Configuration | Fixed Value alarm@hostname.domain |
| <To> | Sets the destination IP Address as defined in the Xmail Configuration | Fixed Value alarm@hostname.domain |
| <Host> | Sets the Agent IP Address | Fixed value |
| <Port> | Sets the port used for the mail | Fixed Value - 25 |
| </AlarmWriter> | End tag for the Alarm Writer section | |
| </AlarmHandler> | End tag for the Alarm Handler section | |

*Fig. 51b*

| XML tag | Description | Value |
|---|---|---|
| <Protocol> | Start tag for the Protocol section | |
| <Name> | Sets the Name of the Protocol | Fixed value - DHCP |
| <CommandToKill> | Sets the command used to kill the protocol | Fixed value /sbin/dhcpcd -k #interface# |
| <CommandToLaunch> | Sets the command used to launch the protocol | Fixed value /sbin/dhcpcd -d -t #timeout# #interface# |
| <WaitedResponse> | Returns a message: "dhcpcd: your IP address =" | Fixed Value |
| </Protocol> | End tag for the Protocol section | |

*Fig. 52*

| XML tag | Description | Value |
|---|---|---|
| <Scenario> | Start tag for the Scenario section | |
| <Name> | Sets the Name of the Scenario | Test |
| <Location> | Start tag for the location section | |
| <Code> | Sets the location code of the Cable modem | Fixed value Same as defined in the IBSAAgent.xml file |
| <Action> | Start tag for the Action section | |
| <ServiceName> | Sets the Name of the Service, as defined in the Service section | Provisioning |
| <Timeout> | Sets the global time out of the specific Action in milliseconds | 10000 |
| <HSDCode> | Sets the alarm Class (i.e. HSD_0_x00000) | x = Service code: 0 = Management 1 = Internet Access 2 = Provisioning 3 = Mail (ISP) 4 = Security 5 = Performance |
| </Action> | End tag for the Scenario section | |
| <Action> | Start tag for the Action section | |
| <ServiceName> | Sets the Name of the Service, as defined in the Service section | InternetAccess |
| <Timeout> | Sets the global time out of the specific Action in milliseconds | 50000 |

*Fig. 53a*

| XML tag | Description | Value |
|---|---|---|
| <HSDCode> | Sets the alarm Class (i.e. HSD_0_x00000) | x = Service code:<br>0 = Management<br>1 = Internet Access<br>2 = Provisioning<br>3 = Mail (ISP)<br>4 = Security<br>5 = Performance |
| </Action> | End tag for the Action section | |
| <Action> | Start tag for the Action section | |
| <ServiceName> | Sets the Name of the Service, as defined in the Service section | ISP |
| <Timeout> | Sets the global time out of the specific Action in milliseconds | 10000 |
| <HSDCode> | Sets the alarm Class (i.e. HSD_0_x00000) | x = Service code:<br>0 = Management<br>1 = Internet Access<br>2 = Provisioning<br>3 = Mail (ISP)<br>4 = Security<br>5 = Performance |
| <AlarmLocation> | Sets the Location of the Alarm (Hub) | Fixed Value |
| </Action> | End tag for the Action section | |
| <Action> | Start tag for the Action section | |
| <ServiceName> | Sets the Name of the Service, as defined in the Service section | Security |
| <Timeout> | Sets the global time out of the specific Action in milliseconds | 10000 |

*Fig. 53b*

| XML tag | Description | Value |
|---|---|---|
| <HSDCode> | Sets the alarm Class (i.e. HSD_0_x00000) | x = Service code:<br>0 = Management<br>1 = Internet Access<br>2 = Provisioning<br>3 = Mail (ISP)<br>4 = Security<br>5 = Performance |
| | | Fixed Value |
| <AlarmLocation> | Sets the Location of the Alarm (Hub) | |
| </Action> | End tag for the Action section | |
| </Location> | End tag for the Location section | |
| </Scenario> | End tag for the Scenario section | |

*Fig. 54*

BROADBAND COMMUNICATIONS

The invention relates to communications, particularly but not exclusively broadband communications. One facet of the present invention relates to provisioning of services in a communications network and finds particular, but not exclusive, application in a broadband network environment or other environment where services are provisioned. The provisioning of services will now be discussed in more detail.

According to one embodiment, the broadband network may be, but is not limited to, an MPLS (Multi-Protocol Label Switching) or an IPSec (IP Security) network and the service may be provisioned via a Virtual Private Network (VPN) connection.

Provisioning is a fundamental step in establishing a connection with a user. The user is normally provided with a user device, a non-limiting but illustrative example of which includes a Personal Computer (PC) and an access device. For example, in a broadband network, a cable modem or Digital Subscriber Line (DSL) modem normally provided as an access device to connect the user device to the broadband network. With a conventional dial up network, any user with a suitable modem and is able to dial into a service (although some service may request a password following connection whereas others may allow open or guest access). Similarly, with Internet services, any user with access to the Internet can access a desired web address, although some sites may require passwords. In both cases, however, it is not necessary for the service to have details of the user equipment in advance of connection. In contrast, broadband services must be specifically provisioned for a given user. In order to provision services for a broadband connection, it is necessary for the provisioning application to have a unique "physical" identifier of the user with whom the service is being provisioned. In the case of a cable modem connection in particular, this may be referred to variously as physical address or identifier, hardware address or Media Access Control (MAC) address. This may be achieved by, for example, a user manually reading an identifier of a hardware product (for example cable modem) printed on the packaging and communicating this, for example by telephone, to the service provider. This manual provisioning method obviously has drawbacks; it is labour intensive and renders rapid provisioning of new services cumbersome.

In the case of a DSL connection, the DSL modem does not have a MAC address nor a permanent IP address but the PVC ID used for the connection between a DSL modem and a Broadband Access Router (BRAS) is used to identify the user; provisioning is carried out by managing the software PVC between the BRAS and DSL modem. Class of service and Quality of service are managed through the settings of the PVC. When connecting the PC to the modem and booting the system, the actual PVC ID is transmitted across the network and can be used for user association. Thus, in the case of a DSL connection, although the relevant "physical address" which identifies the DSL modem is in fact that of an ATM virtual connection, pursuant to the invention it has been appreciated that this can be regarded as a physical or hardware address for the purpose of provisioning and treated in a similar manner to a cable modem MAC address. As used in this specification, the term "hardware address" or "physical address" is intended to encompass a PVC ID in the case of a DSL connection. The terms may encompass another address or identifier which uniquely characterises a connection to a specific access device in other contexts. The terms are intended to distinguish from higher level identifiers, such as an IP address or email address, which is not directly associated with a particular access device.

It is also possible to provide web-based applications for provisioning for a cable modem whereby a user enters a MAC address (as defined below) or physical device identifier into an interactive website; this reduces labour at the provisioning end but still requires a user to provide a (normally lengthy) physical identifier correctly. In prior art systems, the access device generally connects substantially transparently and the physical address (MAC address) of the user device (PC) is normally used to define the connection.

It has been proposed to provide specific application software to read the hardware address details and communicate these to a provisioning service provider and the provision of high-level application software at the user end may facilitate automatic provisioning of services. It does, however, of course require specialist software at the user end, which must be provided, adding to costs and complexity, and which may not always be present so may need to be installed by a user.

Aspects of the invention are set out in the independent claims to which reference should be made. Preferred features are set out in the dependent claims. Representative and further aspects are discussed below.

There is herein provided a method of providing an assured service to a user via a virtual private connection in a distributed network, the method comprising providing an agent in the network and configuring the agent to monitor the virtual private connection by simulating communication over the connection.

Preferably, the agent is arranged to reside on a node of the network other than the user's end node.

Further preferably, the agent is arranged to receive configuration information identifying a connection to monitor.

According to a further preferable feature, a single agent is arranged to receive configuration information identifying a plurality of independent connections to monitor.

Preferably, the method further comprises configuring the agent to pass a fault report to a remote network monitoring component in the event that a fault is detected in the provisioned virtual private connection.

There is also herein described a method of providing an assured service to a user via a virtual private connection in a distributed network, the method comprising provisioning a virtual private connection based on provisioning information and, based on the provisioning information, configuring an agent in the network to monitor the provisioned virtual private connection by simulating communication over the connection.

Preferably, configuration information is sent to a pre-existing agent.

According to an alternative preferable feature, an agent is launched if no preexisting agent is available to monitor the provisioned connection.

Preferably, the agent is further configured to pass a fault report to a remote network monitoring component in die event that a fault is detected in the provisioned virtual private connection.

According to a further aspect, there is provided a method of provisioning a desired communications service for a user across a network, the method comprising obtaining information for a desired communications service to be provisioned based on information associated with an existing connection for the user and provisioning the desired communications service based on the information obtained.

This may facilitate provisioning by making use of an existing connection as a source of information on which to base provisioning of a new connection.

According to a preferred embodiment, there is provided a method of provisioning a service in a broadband network to a user device having an internetwork protocol address, the method comprising:
obtaining an internetwork protocol address of a user device for whom a service is to be provisioned;
sending a configuration protocol query message to a configuration related address server, the message containing the internetwork protocol address of the user device;
waiting for a response message from the server;
extracting a hardware address related to the user device from the response message;
provisioning a network connection with the user device based on the hardware address obtained from the response message.

There is herein described an improved and simplified method of facilitating provisioning in communications networks, particularly broadband networks. Preferably a user may be able to purchase an access device, such as a cable or DSL modem, "off the shelf" and services may be provisioned for the access device without the service provider having pre-provisioned the access device or supplied specialist software.

According to one embodiment, the broadband network may be an MPLS or an IPSec network. The user device may be provisioned via a Virtual Private Network (VPN) connection and, in particular, via an IP VPN connection.

There is described herein a method of provisioning a communications service for a user, the method comprising obtaining a hardware address for an access device, for example a cable modem MAC address or PVC ID in the case of a DSL connection, based on a communications protocol address, such as an Internet Protocol address, of a user device, for example a PC, and provisioning a service based on the hardware address obtained. The hardware address can be obtained using a low level protocol, for instance DHCP lease query.

Also described is the use of a communications protocol address, such as an Internet Protocol (IP) address, of a user device to obtain a physical address of an access device for use in provisioning a service for the user via the access device.

Further, there is also described herein a method of provisioning a service for a network access device comprising receiving a request from a user for a service which request does not include the physical address of the access device and provisioning a service based on obtaining the physical address of the access device using a communications protocol address, such as an Internet Protocol (IP) address, for the user.

A provisioning application is also described, which comprises means for receiving a communications protocol address, such as an Internet Protocol (IP) address, of a user device; means for discovering the physical address of an access device associated with tile user device based on the communications protocol address and means for provisioning a service for the access device based on the discovered physical address.

The methods and apparatus described above preferably operate without requesting the user to supply a physical address for the access device and without requiring the user to install software specific to the service provider.

It has been appreciated that it is possible to obtain or verify the physical device address of a user device such as a PC by a "brute force" trawl through IP servers in an IP environment. However, such a method is not particularly efficient in terms of resources and a more elegant method has been developed; this can drastically reduce time taken to obtain a physical address corresponding to an IP address.

There is further herein-described a method of provisioning a service in a communications network for a user having an communications protocol address, such as an IP address, the method comprising:
obtaining a communications protocol address of a user for whom a service is to be provisioned;
sending a DHCP lease query message to a DHCP server, the message containing the communications protocol address of the user;
waiting for a DHCP response packet from the server;
extracting a hardware address, such as the MAC address or the PVC ID, of the user from the DHCP response packet;
provisioning a network connection with the user based on the hardware address obtained from the DHCP response packet.

By way of additional background, it is noted that the method described above makes use of the well established Dynamic Host Configuration Protocol (DHCP), details of which can be found in RFC 2131 of the Internet Community dated March 1997 and available, inter alia, at http://www.dhcp.org/rfc2131.html, the contents of which are incorporated herein by reference. The method also makes use of the draft DHCP Lease Query message protocol, details of which may be found on the ietf.org website and are summarised below. As those skilled in the art will appreciate, DHCP is an established low-level protocol for managing IP connections. DHCP presupposes that services have been previously provisioned for the user with whom a connection exists and does not directly concern itself with provisioning.

Those skilled in the art will appreciate that provisioning of services is normally a distinct process from low level communication between access concentrators and DHCP is not normally considered directly relevant to provisioning applications. In particular, die DHCP lease query has been designed for access concentrators within a network to rebuild address information gleaned from their access relay function after rebooting or replacement. However, it has been appreciated that features of DHCP can in fact also be used to simplify provisioning. A user for whom a service is to be provisioned will often have a pre-existing IP address. Using DHCP Lease Query, the hardware parameters associated with that address can be identified from the DHCP server without the need for specialist application software at the user end nor for manual provision of the hardware identifier and this information can be used to provision a new service. Thus, surprisingly, DHCP lease query can be used in a provisioning context to facilitate automatic provisioning.

It is particularly advantageous that an address allocated in an internetworking environment, such as the Internet environment, can be used to obtain a hardware address. Within a network, the arrangement is usually that the network has at least one server, such as a DHCP server, which controls allocation of a block of internetworking protocol addresses (e.g. IP scope), which can be used across the internetworking environment, to individual hardware devices connected within the network. The mapping between internetworking protocol addresses and hardware addresses is then only known within the network doing the allocation and the DHCP lease query is only a low level communication designed for use by access concentrators in a network to rebuild data for use in carrying traffic. Increasingly, however, there is a demand for open access services in which networks carry services provided by off-net service providers but that means provisioning has to be done for new access devices, or new services to be provided to existing access devices, by off-net service providers. Here a further problem arises since an off-net service provider doesn't have access at all to the DHCP server.

This further problem may be solved using a facility of internetworking protocols known as tunnelling. In tunnelling, a datagram is encapsulated in a protocol from a higher or the same level and passed across the transport system to an endpoint where it is decapsulated. There are various forms of tunnelling, including Virtual Local Area Network (VLAN) encapsulation and source network address routing but a form that is likely to be particularly appropriate is Point-to-Point Protocol (PPP), for example PPP over Ethernet (PPPoE). This is described in an Internet Engineering Task Force (IETF) Draft, a list of current Drafts being available at http://www.ietf.org/ietf/lid-abstracts .txt. Increasingly, networks such as broadband networks will support tunnelling and this is exploited in the apparatus and methods herein described.

The user access device IP address may be obtained by means of an existing internetworking connection such as a TCP/IP connection For example, most conveniently a user may be required or requested to visit a website in order to obtain a new service and the user's access device IP address may be captured from this website for use in formulating a DHCP lease query for a provisioning application. Other TCP/IP transactions may be used to obtain an IP address for the user access device.

There is also herein described use of a DHCP lease query message to obtain a physical hardware identifier of a user device for use in a provisioning application to provision a broadband service for the user.

Further, there is also described a provisioning application having means, preferably a provisioning module, for provisioning a broadband service based on an access device physical address characterised by means, preferably a query module, for obtaining the user hardware identifier based on a DHCP lease query message submitted to a DHCP server and containing an IP address related to the access device. The access device may be a cable modem or DSL modem and the physical address may be a MAC address or PVC ID.

There is also herein described a computer program or computer program product, preferably stored on a computer readable medium, for performing any method described herein, preferably containing instructions for:
generating a DHCP query message containing an identifier related to an access device;
obtaining from a response to said message a hardware identifier of the access device;
provisioning a service for the access device based on the hardware identifier obtained.

Whilst the use of DHCP lease query may provide a particularly preferred, efficient and elegant implementation, other mechanisms may alternatively be used which allow an access device physical address to be returned using an internetworking address (or other pre-existing identifier related to the user of the access device) and preferably without requiring specialised software on the user machine.

Prior art provisioning methods generally provision services based on physical addresses (MAC addresses) of user devices such as PCs. Further, there is also herein described a method of provisioning a service for a user having a user device connected to a broadband network via a broadband access device, the user device and the broadband access device each having a respective physical address, the method comprising provisioning a service based on the physical address of the access device.

This allows the user to replace a user device, for example to connect multiple PCs without having to re-provision each device, which can be a cumbersome process, particularly with prior art provisioning methods. It also reduces the risk of fraudulent access as the service is made to the nearest point to the broadband network, namely the access device. Thus, if the access device is swapped, the service will need to be re-provisioned.

A significant advantage of the methods and apparatus described above is that they may facilitate more rapid expansion of services as users may purchase suitable access devices from retail outlets without requiring pre-provisioning or specialist skills to install the devices.

It has been further appreciated that because the novel provisioning application described can autonomously propagate services, it is desirable to integrate this with or tie the provisioning application to a capacity management application.

Thus preferably the provisioning method or provisioning application includes the step of or means for communicating with a capacity management application and such a method or application may be independently provided.

The method may include checking for available capacity prior to provisioning a service and/or reporting provisioning of a service to a capacity management application after provisioning.

Conventionally, provisioning and capacity planning are distinct and this reflects conventional provisioning processes; problems have hitherto not been appreciated. However, this method may enable provisioning to be controlled at a higher level before problems arise; thus this solves a surprising and hitherto unappreciated problem which studies reveal might arise were efficiency of existing provisioning processes improved. The benefits of this method may be realised even with conventional provisioning processes.

The system described herein further extends to a capacity management application having means for communicating with a provisioning application. The capacity management application will normally have means for storing data relating to network capacity and user interface for communicating the stored data with a user. The capacity management application will normally provide a graphical interface and may include conventional statistical and graphing tools for displaying information concerning present, historical or predicted network capacity. The details of the capacity planning application are not critical and may be based on existing network planning applications. According to the inventive development, the application has means for communicating (preferably dynamically/in real time) with a provisioning application. Thus a provisioning application can report provisioning of new services and thus advise that capacity will be reduced before this would normally be featured in capacity planning considerations (for example before an actual increase in traffic can be detected). Particularly in the case of rapid roll out of services, this may lead to a significant increase in reliability of predictions. Alternatively or in addition, the capacity management application may feed information back to the provisioning application and may inhibit provisioning if capacity is unavailable, or may limit the capacity that can be provisioned. Again this may be advantageous particularly in the case of rapid roll out as it may reduce the risk of a service being provisioned and leading to network overload or the service being unsatisfactory to a user.

Preferably a network management tool comprises means for displaying at least one of performance, no of modems on a given node, quality of service, duration of connection, uptime, identifiers of faulty modems. Preferably a network management tool has means for communicating with an agent associated with a network component for receiving information from the agent. Preferably the network management tool comprises means for displaying information based on network usage at the level of network segments, preferably wherein a network segment corresponds to a card of a universal broadcast router or cable modem termination system. Preferably an agent is provided to report usage at the segment level. Preferably the management tool has means for displaying an indication of subscriber types as well as traffic information. A network management tool having any of the preferred features disclosed herein may be independently provided.

Information gathered by agents associated with at least some of the individual network components may allow the remote network component, which may be, for example, a network monitoring component, to be provided with realtime data from that point in the network. The information provided to the remote network component may allow the remote network component, for example, to monitor services provided to users and to identify quickly the source of a fault in the network. The remote network component may use the information to monitor the status of the network as a whole, or the status of a portion of the network.

Information other than the equipment status information may also be passed to the remote network component. For example, identification information for the network component may be transmitted, or service data, such as the rates at which data is being transmitted through the component, may also be transmitted to the remote network component.

Preferably, the agent further comprises means for receiving a configuration instruction. The presence of the agent on the network component may allow the network component to be configured remotely. If the network component stores service parameters for a user, then the agent may allow the remote modification of these service parameters, for example by the end user, or by a control centre.

Preferably at least a portion of the operation of the agent is configurable by means of a script. Hence the agent may be configured to send different types of data to the remote network component or to send data at predefined intervals.

As discussed above, the remote network component may be a network management tool which may be used to monitor and control the network and individual components within the network. In addition, or alternatively, the remote network component may be a planning tool or a provisioning tool, the network component may pass information regarding new user devices that connect to it to these remote components. Planning tools or provisioning tools may also receive information from the network component regarding traffic flow through the network component to allow the tools to plan for future provisioning requests.

According to a highly preferable feature, at least a portion of the operation of the agent is configurable to simulate activity of other network components at the network component incorporating the agent. Hence the agent may test the operation of the network component by simulating the activity of other network components. For example, the agent may simulate the process whereby another network component connects to or sends data to the network component. This may allow the agent to detect faults in the network component or in the network. The agent may signal an alarm to the remote network component in the event of detection of a fault condition in the network or in the network component on which the agent is running.

Preferably, the agent further comprises means for sending a report on the simulated activity of the other network components to the remote network component. This may allow the remote network component to detect and to debug faults in the network component incorporating the agent or in the network itself.

According to a preferable embodiment, the network component is a Point-of-Presence in a broadband network.

According to a further aspect, there is also herein provided a method of monitoring and controlling network components in a broadband network, comprising:

providing an agent at each of a plurality of network components in the broadband network;

receiving data from each agent regarding the operation and status of the network component;

processing the data to determine the status and operation of the broadband network and of service provision in the broadband network.

Hence data corresponding to the network components may be sent from the agents to a central network monitoring component to allow monitoring and control of the network.

Preferably, the agent provided at each of the plurality of network component comprises an agent according to the agent aspect outlined above.

Preferably the step of processing the data comprises passing the data to a network monitoring tool and allowing access to the data at a user interface. Hence a network operator may monitor the network using the user interface and the data that has been passed to the network monitoring tool.

A further preferable feature of the provisioning aspect may be that:

At least one of the components in the broadband network incorporates an agent for passing information concerning the network component to a remote network component such that the method of provisioning a service may further comprise sending a provisioning information message to the or each agent. If the provisioning tool communicates details of any newly provisioned service to the or each agent, then the agent may begin to monitor the newly provisioned service immediately and, as a further advantage, agents associated with the newly provisioned service may be set up to monitor the service and the network components associated with it.

Preferably, the method of provisioning a service further comprises storing individual user parameters for the service, configuring the service provision based on a set of core configuration parameters and customising die service provision based on the stored individual parameters for the user. Hence the basic service may be provisioned according to a standard procedure and set of parameters and further steps may then be taken customize the service for each individual user.

Preferably, the method further comprises identifying new connections to the broadband network and automatically initiating a provisioning procedure for provisioning a service to the user device corresponding to the newly connected user. This may allow end-to-end provisioning of the user device. A user may connect a user device to the network and the new device may be provisioned automatically on connection. The provisioning of the user device should be dependent on the type of the user device, for example a cable modem or a set top box would be provisioned differently.

According to one preferable embodiment, the identifying step comprises receiving a message when the user device connects to the network.

According to a further preferable embodiment, the identifying step comprises monitoring the network to detect new connections to the network.

According to a further aspect there is provided a method of provisioning a service for a user device in a broadband network, the method comprising:

provisioning the service over the broadband network based on obtaining a physical address of the broadband access device;

storing individual service parameters for the user device from a database of service parameter information;

determining the individual service parameters for the user device and providing the service to the user device based on the determined service parameters.

This aspect may allow a service to be provisioned for a user device according to parameters defined by the user. The user may provide the desired parameter values either before or during provisioning and some parameters may be determined automatically from querying the user device itself.

Preferably, the method further comprises providing a user interface to allow a network operator or a user to access and to amend the stored service parameters for the provisioned service. This may allow the user parameters to be amended after provisioning.

According to one preferable feature, at least some of the individual service parameters may be applied to a predefined plurality of user devices. This may allow a user to set the service parameters for, for example, a whole network of user devices.

According to a further aspect, there is provided a method of provisioning a connection between a remote user device and a virtual private network of user devices comprising provisioning the connection such that: the virtual private network appears to be connected directly to the remote user device; and the remote user device appears to be connected directly to the remote user device.

Preferably, the method further comprises provisioning a service to the remote user device via the virtual private network (VPN).

According to one preferable aspect, the network is a broadband network and the provisioned service is a broadband service.

Preferably, the provisioning a service step comprises receiving a request from a user of the remote user device, which request does not include the physical address of the remote user device and provisioning a service based on obtaining the physical address of the remote user device.

Further preferably, the physical address of the remote user device is obtained by using the local address of the remote user device within the VPN.

According to an alternative preferable embodiment, the physical address of the remote user device is obtained by using an IP address of the remote user device.

The invention further provides provisioning tools, planning tools, user interfaces, methods, inventory tools, agents for devices, data packets, computer programs, computer program products, apparatus, systems, and computer implemented methods. Features and preferred features of each category may be applied to other categories unless otherwise stated. References to tools are intended to encompass without limitation applications or applets, software modules, combinations of hardware and software and to include both standalone modules, modules or code integrated into larger applications and modules which may stand alone and/or be provided as part of a suite of components. In most cases, these tools may be embodied as computer programs and computer program products and may be supplied as data packets or signals, but may include either general purpose or dedicated hardware.

A further aspect provides a provisioning tool for a broadband network comprising means for discovering information concerning a service to be provisioned based on information associated with an existing connection.

A further aspect provides a provisioning tool for provisioning a broadband service over at least one specified hardware connection, the provisioning tool comprising a module for performing an activation action and an activation script processor for processing an activation script defining a workflow sequence including at least one activation action.

Conventionally the workflow sequence would be implicit in the operation of any activation module for a particular hardware connection. However, pursuant to the invention, it has been appreciated that similar steps may be performed for different hardware connections and changes may be made dependent on the network configuration. By providing a module for performing an activation action and an activation script, definition of the necessary steps for a variety of hardware connections (cable, dsl modems of varying types, MPLS and VPN connections) may be accommodated more easily without requiring complex dedicated programming for each type of hardware; basic actions may be defined and then these may be put together using a script.

Preferably the script is user viewable and/or editable. In a highly preferred embodiment, the activation script is executed in a structured document, particularly a markup language such as SGML or most preferably XML (extensible markup language)—XML provides a readily editable and readily processed compact language having sufficient flexibility to implement an activation script. The provisioning tool may provide means for storing a plurality of activation scripts for mutually distinct hardware connections and means for selecting an executing an appropriate script for a hardware connection in response to an activation request.

Preferably the provisioning tool has means for receiving an identifier of a client device and means for selecting an activation script based on the identifier. The identifier may include an identifier of equipment type for at least some components in the network, preferably for all components. The equipment type information preferably includes manufacturer and model information—this enables different procedures for different versions of the same type of device (e.g. switch, cable modem) to be accommodated. This is particularly beneficial when scripts govern workflow as the workflow for a variety of similar devices from different manufacturers may be similar or identical but the precise activation actions may differ. Multiple devices may be catered for efficiently by essentially duplicating activation scripts but providing device specific activation modules as needed.

The identifier may be user input or may be based on information gained from a discovery process. Preferably each activation action comprises a low-level action, i.e. without complex flow control and action flow control is defined by the script. Preferably each action corresponds to a defined step or unit of time. Preferably actions correspond to verbs of the activation scripts.

Preferably the provisioning tool has means for recording transactions (with a device to be provisioned such as a modem) during activation of a service. Preferably transactions are recorded so that individual transactions can be replayed, viewed or analysed. Pursuant to the invention, it has been appreciated that this can provide a surprisingly useful insight into any network problems as compared to the conventional approach of logging internal success or error reports and may enable configuration scripts to be optimised. This feature is particularly useful when provided in conjunction with the scripting of actions but may be provided independently.

A further aspect provides a provisioning tool for a broadband network comprising means for executing a sequence of actions to activate a broadband service via a client device, the provisioning tool having means for recording transactions with the client device.

The provisioning tool may have means for receiving stored data indicative of a network configuration and client data identifying the client device to be provisioned and means for determining a sequence of actions based on the stored data and client data. This may simplify a process, as compared to a conventional process in which a user specifies network components to be configured.

A further aspect provides a provisioning tool for a broadband network comprising means for receiving stored configuration data indicative of a network configuration and client data identifying the client to be provisioned and means for determining a sequence of actions based on the stored configuration data and client data. The client data may be determined from a user interface.

The provisioning tool preferably has a graphical user interface for displaying a representation of at least a part of the network. The client data may be determined based on a user input from the graphical user interface. More preferably the provisioning tool has means for receiving an input command based on the graphical user interface and determining at least one provisioning action in response thereto based on the stored configuration data. In a preferred application, the input command may include a drag and drop command. Preferably the provisioning tool is arranged to interpret a user action based on the graphical interface and the configuration data. Advantageously the provisioning tool has means for storing at least one rule or configuration script for use in determining at least one provisioning action. The storage of rules may facilitate generation of complex sequences of action based on simple user inputs.

In a preferred embodiment, the invention provides a provisioning tool for a broadband network comprising means for storing a representation of network configuration, means for storing rules governing activation actions, a (preferably graphical) user interface for providing a user with a representation of a network configuration, means for receiving a user input to provision a service for a client, means for processing the input based on the stored representation of the network configuration and the stored rules to generate a sequence of at least one activation action. The provisioning tool typically has means for performing at least one activation action.

A further aspect provides a provisioning tool for a broadband network comprising means for storing network configuration information including information concerning network topology and information concerning configuration actions, a drag and drop graphical user interface for receiving a user command to provision a service and means for generating an activation sequence containing at least one activation action based on the received command and the stored network configuration information.

The provisioning tool may have means for communicating with an agent associated with a client device to communicate configuration information therewith. By providing an agent on the client device, greater flexibility may be achieved and enhanced functionality may be achieved as compared to communicating directly with the client device. The agent may be independently provided.

A further aspect provides an agent for a client device in a broadband network, the agent having means for communicating configuration information for the client device to a remote network configuration or management tool, advantageously from a provisioning tool.

The provisioning tool may have means for communicating with a network inventory tool for receiving network configuration information. The network inventory tool preferably has means for discovering network configuration information based on communicating with network components. The network inventory tool may (additionally, or less preferably alternatively) have means for receiving information describing network configuration via a user interface. It is a preferred feature of the provisioning tool aspects that the network configuration information includes an identifier of equipment type for at least some components in the network, preferably for all components. The equipment type information preferably includes manufacturer and model information. This greatly enhances the flexibility of the method as actions specific for a particular type of component may be correctly generated in an automated fashion. This is particularly advantageous in combination with aspects which provide for selection of activation actions. Preferably the network inventory tool has means for storing information concerning (a) equipment type identifiers for network components type and (b) interconnections between network components. Thus, as well as a user being able to view network topology and see which components may be affected by a proposed action, the configuration actions may be tailored to specific hardware equipment type. The inventory tool may be integrated with the provisioning tool or may be provided independently. The provisioning tool and inventory tool advantageously communicate by sharing a database.

A further aspect provides a network inventory tool for a broadband network comprising means for storing network configuration information including first information including an equipment type identifier for each of a plurality of network components and second information identifying interconnections between network components.

The inventory tool may be arranged to discover network configuration information by interrogating network components. The inventory tool is preferably arranged to communicate the network configuration information to at least one other tool, optionally by storing the information in a commonly accessible database. The inventory tool is preferably arranged to communicate with an agent operating on a network component to discover information about the network component. This may simplify operation of the inventory tool and/or increase the amount of information that the tool can discover and/or facilitate operation with a variety of types of hardware. Agents may be configured to operate on specific network components. The agents may be independently provided.

A further aspect provides an agent for a network component of a broadband network, the agent comprising means for passing equipment status or identification information concerning the network component to a remote network component, preferably a network inventory tool.

The agent may further comprise means for receiving a configuration instruction, optionally from a provisioning or configuration or management tool. At least a portion of the operation of the agent is preferably configurable by means of a script, preferably an XML script.

Preferably, the remote network component includes a provisioning tool incorporated into a broadband network.

Further preferably, the remote network component includes a planning tool incorporated into a broadband network.

Further preferably, the remote network component includes a network management tool.

According to a highly preferable embodiment, at least a portion of the operation of the agent is configurable to simulate user activity at the network component. Hence different situations and scenarios of user activity may be simulated on demand from an operator at a remote network component. This may allow the operator of the remote network component to de-bug a fault in the operation of the network component.

Preferably, the user activity comprises at least one of:
connecting to a broadband network;
verifying the identity of the user or the network component over the broadband network;
accessing a service via the broadband network using configured and/or preset parameters;
amending at least one preset parameter and accessing a service via the broadband network using the at least one amended parameter.

Preferably, the agent further comprises means for sending a report on the simulated user activity to the remote network component.

According to one preferable embodiment, the network component is a Set Top Box.

According to a further preferable embodiment, the network component is a Cable Modem.

Preferably, the agent further comprises means for accessing a communication service and means for signalling an alarm to a remote network component in the event oF detection of a fault condition. Hence the agent may be used to monitor access of the network component to the communication service and report any problems with access immediately. This may reduce reliance on a user to report a fault, or a central network monitoring centre to detect the fault.

A further aspect provides a method of operating a network component of a broadband network, the method comprising passing equipment status or identification information concerning the network component to a remote network component.

The method may have preferable features corresponding to the preferable features of the agent aspect described above.

The provisioning tool and/or inventory tool may operate in conjunction with a planning tool.

A further aspect provides a planning tool comprising a user interface for communicating information relating to network capacity or a planned service with a user, the planning tool characterised by means for communicating with a provisioning tool and/or inventory tool network or service configuration information.

In a preferred implementation, the planning tool may provide means for defining one or more planned services based on at least one of: location; customer profile; quality of service; network availability; availability of other services.

The provisioning tool is preferably arranged to operate in conjunction with a customer front end for communicating user information. The user information may include authentication information. The user information may include an indication or selection of one or more desired services. The provisioning tool may include means for re-provisioning a service based on information received from a user and/or may include means for communicating available services to a user, preferably by means of a customer front end tool.

A further aspect provides a customer front end tool for a client device in a broadband network, the customer front end tool having means for receiving user information and communicating the user information to a remote provisioning tool.

This may facilitate configuration. The customer front end tool may include means for communicating an identifier of the client device to the provisioning tool. The customer front end tool may operate over an internet connection and the internet connection may be used by the provisioning tool in identifying the client device. The customer front end may be arranged to enable a user to enter user authentication information in the event that a client device configuration is changed, for example in the event that one device (e.g. a cable modem) is swapped for another and/or the device is physically connected at a new location. Particularly in combination with the automatic discovery procedure mentioned, this may greatly facilitate use of a service for a user who modifies equipment as, rather than having to undergo a new manual provisioning step each time a change is made to the location of equipment or equipment hardware, the user need simply supply authentication information and the previous service can be re-provisioned to operate with the new configuration.

A further advantage of the provisioning techniques and tools is that, because provisioning is straightforward and in preferred embodiments can be performed without end user interaction, new or modified services can be delivered. In particular, a service may be dynamically altered by re-provisioning, or new services made available periodically. This may facilitate content delivery and may increase uptake of new services.

A further aspect provides a provisioning tool for provisioning a service in a broadband communications network having means for provisioning a service characterised by means for storing information relating to a service parameter which varies with time and means for altering a characteristic of the service based on the stored information.

Preferably the means for altering is arranged to re-provision the service.

A further aspect provides a method of providing a service in a broadband communication network comprising storing information relating to a service parameter which varies with time and periodically re-configuring the service based on the stored information.

A further aspect provides use of a provisioning function to effect delivery of a communication service having at least one time-varying service characteristic based on periodic re-provisioning of the service.

The time varying characteristic may include one or more of bandwidth, quality of service, access to specified services. The time varying characteristic may include variation at least once a week and preferably at least once a day. The characteristic may be varied in response to usage or based on information from a source such as a congestion detector or a billing system, in addition to or instead of in response to stored data of a time characteristic.

Additionally or alternatively, a service having a time-varying characteristic may be implemented based on reconfiguring a network component, preferably by communicating with an agent provided on the network component, particularly wherein the network component comprises a user access device.

The invention may provide a method of providing a communication service to a user via a user access device, the method comprising dynamically remotely re-configuring the user access device to modify a characteristic of the service delivered.

By dynamically is preferably meant online and/or while the service is available substantially uninterrupted and/or in response to a real time input, and most preferably without operator intervention.

Services may be provided to a plurality of users and the method may include selectively re-configuring an individual user access device to modify selectively a characteristic of service for the individual user.

Modification may be in response to stored information relating to a time varying characteristic, as aforementioned. Additionally or alternatively, modification may be in response to usage or billing system information—for example a service may be downgraded for a user who is behind with payments or who has previously exceeded a usage quota.

Another advantageous use of data captured during provisioning may be in service assurance. It can be important in offering a communications service that the ongoing quality of service provided to customers can be monitored. New customers will generally have an expectation of an acceptable quality of service and may indeed have a service level agreement with a service provider. Existing customers will not expect the quality of service to become degraded because other customers have been newly provisioned.

By sharing data, for instance by sharing a data model and access to the same data storage, a provisioning application, working in conjunction with a service assurance application, can offer a particularly efficient use of data for diagnostics. Service assurance products may for instance receive alarm signals or data arising in use of a network to provide an identified service. Since a provisioning application may gather subscriber-related address data in relation to services provisioned, the service assurance product can be enabled to relate alarm data not just to services but also to relevant service subscribers.

Further advantages of the methods and apparatus herein described lie in the fact that a service provider has the physical address of a user's access device. For instance, the service provider can also provide a measure of fraud management in that, if fraud is detected in association with an access device, the service provider can suspend or de-activate the device in relation to a service, or can downgrade the level of service to that device.

Also, prior to service provision, the service provider can identify cases where a user's situation is simply not able to support a service. For instance, where a user wants to subscribe to a Video on Demand (VoD) service over Digital Subscriber Lines (DSL), the service provider can check whether the user's access device is physically close enough to a Digital Subscriber Line Access Multiplexer (DSLAM) to have sufficient bandwidth.

Further incorporated herein are methods which correspond to the apparatus and vice versa and to computer programs and computer program products for implementing such methods. Preferred and optional features of the methods and apparatus disclosed may be applied to all other methods and apparatus unless otherwise stated or apparent from the context.

Further aspects and preferred features of the invention are described below:

A method of testing a broadband network, the network comprising a head end for receiving one or more communications services from service providers and transmitting the one or more services towards end user equipment, and comprising at least one node for receiving said one or more services from the head end and delivering the service(s) towards end user equipment, which method comprises launching a test signal to the network at said at least one node and monitoring a response by the network thereto.

The test signal may be launched by computing equipment provided at said at least one node. The test signal may be provided by an agent associated with the node. The method may further comprise receiving one or more control signals at said computing equipment (or agent), the control signals having been transmitted over the network to control said launch of a test signal. The test signal may be launched via a first signal path from the computing equipment (or agent) to the network and said one or more control signals may be received via a second signal path from the network to the computing equipment (or agent), said first and second signal paths being different. The first and second signal paths may differ at least in that said first signal path comprises transmission by a cable modem termination system. A selected one or more of a plurality of different test signals may be used. The agent or system may be programmed to launch one or more test signals at one or more predetermined times. One or more control signals may comprise means to trigger launch of one or more test signals by the computing equipment.

In one embodiment at least one node comprises a provisioning server, for dynamic assignment of addresses to end user equipment, and said test signal in use requires assignment of an address by said provisioning server and a monitored response comprises said assignment of an address.

One or more of said test signals may simulate a request received from user equipment for service delivery by means of the network.

The invention may provide a method of testing a broadband network, the network comprising a head end for receiving one or more communications services from service providers and transmitting the one or more services towards end user equipment, and comprising at least one node for receiving said one or more services from the head end and delivering the service(s) via a cable modem termination system towards end user equipment, which method comprises transmitting a control signal to an agent or other computing means at the node, said control signal comprising a rigger to launch a service request to the network via the cable modem termination system at said at least one node, said method further comprising monitoring a response by the network to the launched service request.

There may be provided a node of a broadband communications network, for receiving one or more communications services from service providers and transmitting the one or more services towards end user equipment, which node comprises an agent or other programmable end user simulation equipment for launching a service request to the network.

The node may further comprise a first signal path for delivering control signals to the simulation equipment and a second path for transmitting a launched service request from the simulation equipment to the network, said first and second paths being different. Then second path may comprise a cable modem termination system.

There may be provided a network management system comprising a fault detector and fault processor for detecting faults in the network or services provided over the network, and for analysing detected faults with the purpose of generating solutions to the faults, wherein the system further comprises context sensitive help for providing information to the user in relation to one or more faults being analysed.

The context sensitive help may comprise a knowledge management system having a search engine and the search engine runs a search on data stored for the knowledge management system, said search being based on the one or more faults being analysed.

There may be provided a communications network management system, for receiving and processing fault reports in respect of a network and/or one or more services supported by the network, the system being provided with a data store for storing data in respect of said network and/or services and processes fault reports in the light of stored data to generate corrective solutions to received fault reports, wherein the system is further provided with at least one simulator for requesting service provision over the network such that the network and one or mole services can be proactively tested. Preferably the simulator simulates user activity. The simulator may comprise an agent associated with a network component. Preferably the network is a broadband network and the simulator is provided at a node of the network.

There may be provided a communications network management system, which system comprises:
a) an input for receiving Fault reports in respect of a network and/or one or more services supported by a network,
b) a data store for storing data in respect of said network and/or services,
c) a fault processor for processing fault reports received via the input, using data stored in the data store, to generate corrective solutions, and
d) a simulator for triggering a service provision response by the network
wherein the simulator has an output to the network to trigger a service provision response, such that a fault report in respect of said response will be received at the input and processed by the fault processor.

The communications network management system may further comprise means to apply a generated corrective solution to the network and to trigger a service provision response by use of the simulator such as to validate the applied corrective solution.

The input for receiving fault reports may be adapted to receive both fault reports in respect of services provided by said network and component alarms from components of said network, and said fault processor comprises a correlation engine for correlating received fault reports in respect of one or more services with received component alarms.

The data store may be structured to hold one or more problem descriptions in addition to one or more fault reports and/or one or more component alarms, at least one stored problem description comprising data received in respect of historic component behaviour, said fault processor being adapted to access data received in respect of historic component behaviour for use in processing fault reports to generate one or more corrective solutions.

There may be provided a communications network management system, which system comprises:
a) an input for fault reports in respect of a network and/or one or more services supported by a network,
b) a data store structured to store data in respect of said network and services, and
c) a fault processor for processing fault reports received via the input to generate corrective solutions,
wherein the data store is further structured to store customer data in relation to services and the fault processor comprises a correlation engine for correlating received fault reports in respect of one or more services with customer data, and wherein the fault processor further comprises sorting apparatus for sorting fault reports in an order determined by correlated customer data.

A further aspect provides a service provisioning and assurance tool for use in the supply of one or more communications services to at least one user via a network, comprising:
i. means for provisioning a service, selected by a user or user representative, in relation to a hardware address of the user;
ii. means for storing data relating the selected service, the hardware address and the user;
iii. means for supplying the selected service to the hardware address;
iv means for receiving one or more alarms in respect of the supplied service; and
v. means for analyzing received alarms
wherein the means for analyzing is arranged to access the stored data Hence the tool can be used to provision, supply and monitor a service to a user over a network. Analysis of alarms received may incorporate an analysis of the present fault in view of previous faults at that user equipment or in view of previous similar faults in other sections of the network.

Preferably, the service provisioning and assurance tool further comprises means for obtaining information relating to the selected service, the hardware address and the user fri-om components over a network, wherein the components include at least one of:
a DHCP server;
an agent associated with user equipment, wherein the user equipment may comprise a Set Top Box or a Cable Modem;
a system database;
a Cable Modem Termination System.

Preferably, the service provisioning and assurance tool further comprises display means for displaying at least one of:
parameters corresponding to the configuration of a service for a particular user;
information regarding use of a service by a particular user or group of users;
information regarding the provisioning and performance of a particular service;
and wherein the display means further comprises means for adjusting parameters corresponding to the configuration of a service for a particular user.

Hence an operator may use the tool to analyse the setup and use of a particular item of user equipment, and may, for example by accessing a secure area of the operator interface, alter parameters corresponding to service provision for a particular user.

According to a highly preferable feature, there is further provided means for configuring an agent associated with the user equipment to test at least one aspect of service provision by simulating user activity at the user equipment.

Hence the functionality of user equipment may be tested remotely by using the tool to configure an agent associated with the user equipment. This may mean that it is not necessary for an operator or engineer to go to the user equipment in order to test it.

Preferably, there is further provided means for amending service provision parameters for a particular item of user equipment and means for configuring the agent to simulate user activity at the user equipment using the amended parameters.

The functionality of the system may also be tested with amended parameters. Hence it may be possible for a network engineer, or operator to solve problems with the users equipment remotely by changing service parameters for the user and testing the new parameters using the agent associated with the user equipment.

According to a further preferable feature, the service provisioning and assurance tool further comprises:
means for receiving information from the agent regarding the simulation of user activity at the user equipment;
in the case of successful provision of a service, means for transferring the amended service provision parameters for the user to the system database.

This may allow any successful amendment to the parameters to be detected by the tool. The amended parameters may then be saved in die system database for that user.

According to a further aspect, there is also provided a method corresponding to the service assurance tool described above with corresponding preferable features.

In accordance with its normal English usage, the phrase "and/or" is used herein to indicate that either or both of the items connected by the phrase are involved. That is, "A and/or B" means that A is involved or B is involved or both A and B are involved.

BRIEF DESCRIPTION OF DRAWINGS

The provisioning of services in a communications network and the management of such a network will now be described further, by way of example only, with reference to the accompanying drawings in which:

FIG. 13 is a schematic diagram of an example of a further Set-Top Box Manager screen display according to one embodiment of the systems and methods herein described;

FIG. 17 is a schematic diagram of a 'Forward Path' Results List Panel screen display according to one embodiment of the systems and methods herein described;

FIG. 18 is a schematic diagram of a 'Reverse Path' Results List Panel screen display according to one embodiment of the systems and methods herein described;

FIG. 22 is a schematic diagram of a one embodiment of the architecture of the Set-Top Box Manager;

Figure 39:
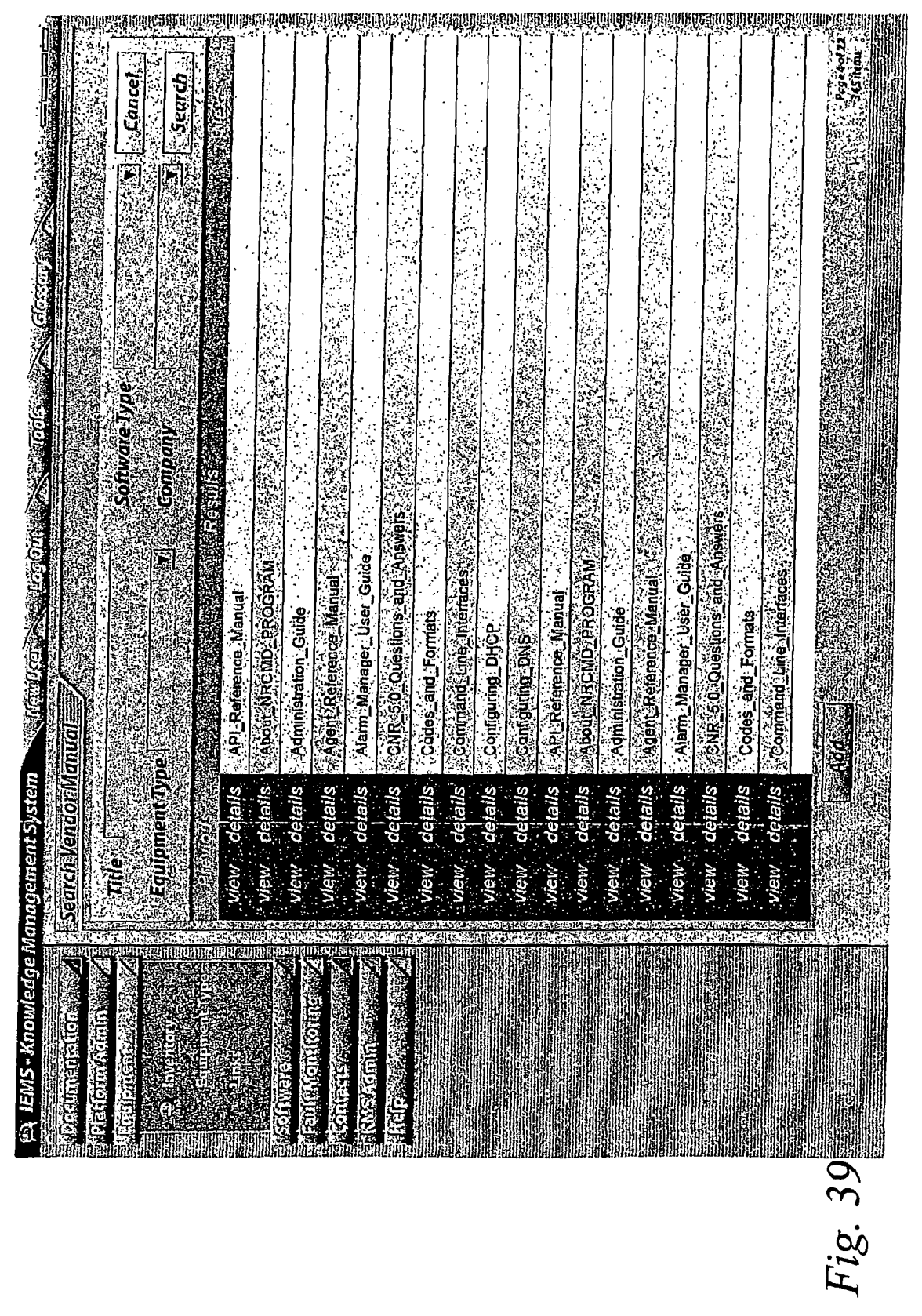

FIG. 39 shows a screen view available to a user of the knowledge management system;

Figure 40:
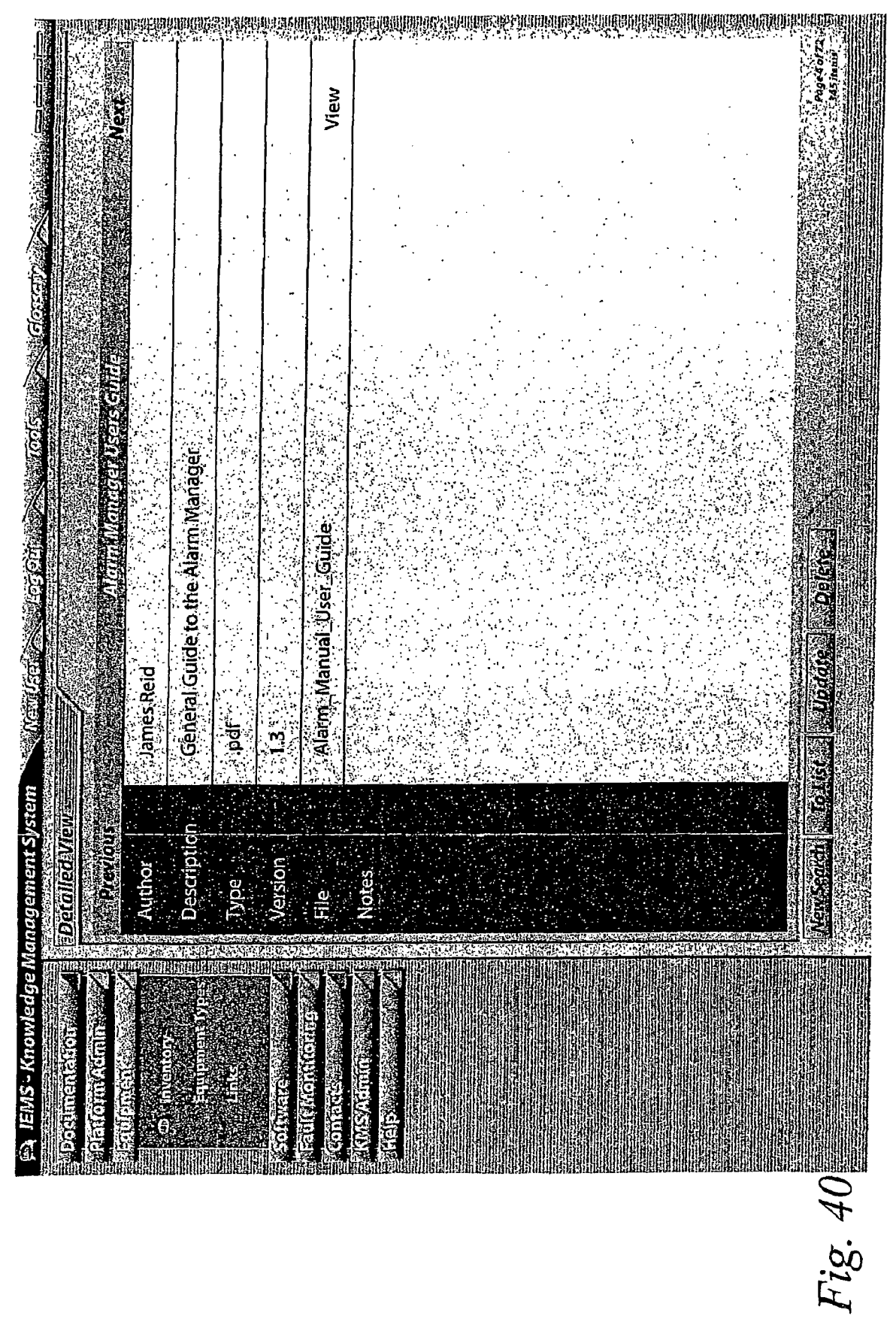

FIG. 40 shows a further screen view available to a user of the knowledge management system;

FIG. 49 is an XML section of command script for the switch configuration for use with a preferred ISEA according to one embodiment of the systems and methods described herein;

FIG. 50 is an XML section of command script for a cable modem configuration for use with a preferred ISEA according to one embodiment of the systems and methods described herein;

FIGS. 51a and 51b are an XML sections of command script for a scheduler manager configuration for use with a preferred ISEA according to one embodiment of the systems and methods described herein;

FIG. 52 is an XML section of command script for a DHCP protocol configuration for use with a preferred ISEA according to one embodiment of the systems and methods described herein;

FIGS. 53a and 53b are an XML sections of command script for use with a preferred ISEA to configure a scenario named 'Test' for one location, containing three services; provisioning, internet access, mail (ISP) according to one embodiment of the systems and methods described herein;

FIG. 54 is a continuation of the XML section of command script of FIGS. 53a and 53b according to one embodiment of the systems and methods described herein;

DETAILED DESCRIPTION OF PREFERRED EMBODIMENTS

Provisioning

Discovery of Device Details for Use in Provisioning

Figure 1:
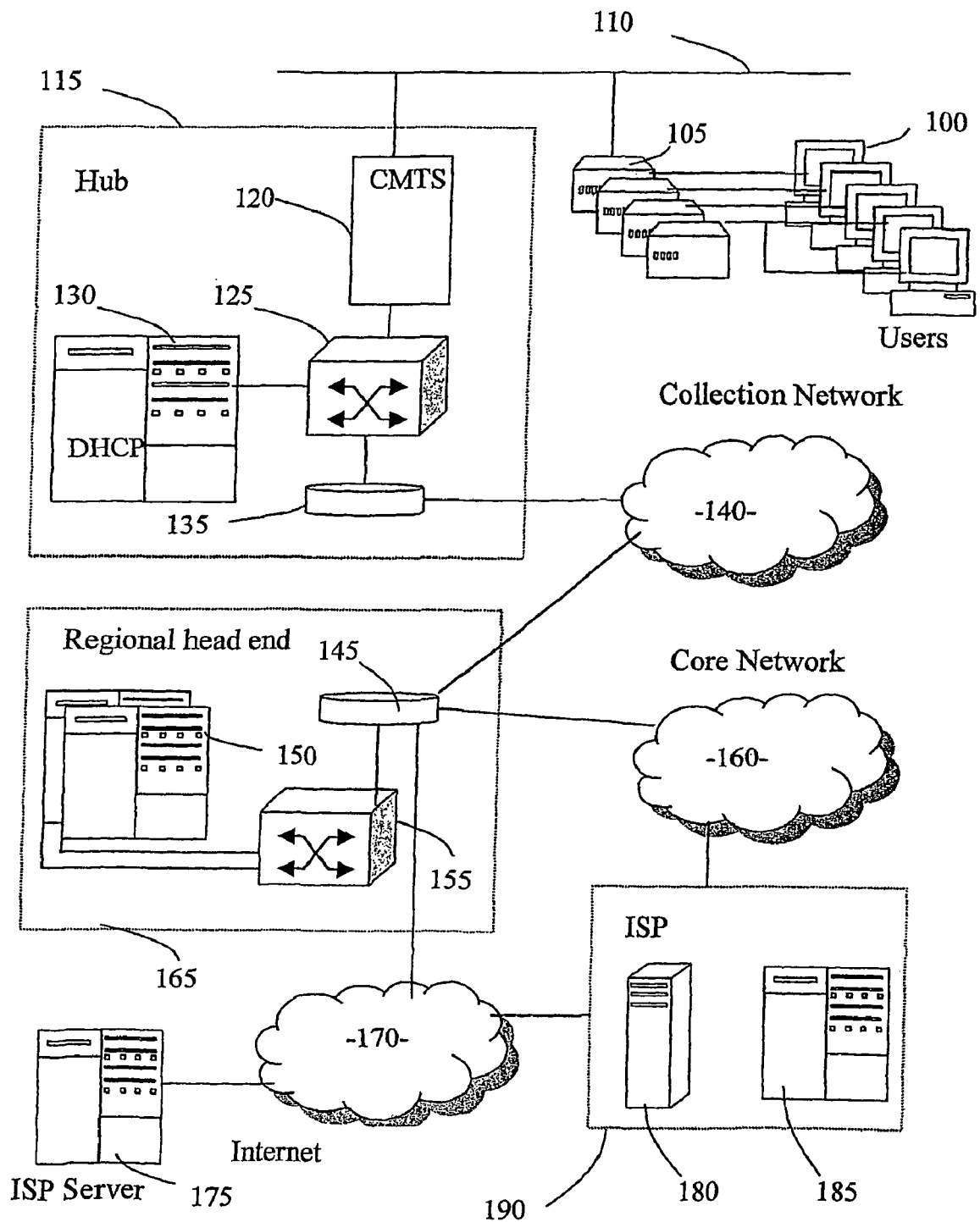
FIG. 1 is a schematic diagram of a network environment for provisioning apparatus in accordance with one example of the system and methods herein described.

Referring to FIG. 1, a network environment in which provisioning apparatus might be used is a cable network providing broadband services. User terminals 100 such as PCs are connected to a cable network via modems 105. A cable modem termination system 120 connects the modems 105 to an access concentrator 125 which in turn is connected at or via a hub 115 of the network to a DHCP server 130.

The network hub 115 is connected over a collection network 140 to a regional head end 165 for the network and an Internet Service Provider (ISP) platform 190 is connected to the regional head end 165 by a core network 160. The ISP platform 190 also has access to the Internet 170 and may provide services from an Internet-based server 175 and/or from a server 185 within its own platform 190.

Importantly, in an open access environment, there may be service provider platforms 190 which only have connection to the cable network via the Internet 170.

In a known provisioning arrangement, when a new access device 105 is added to the cable network, at a hardware address in the network, the DHCP server 130 will allocate it an Internet Protocol (IP) address. The DHCP server 130 maintains a record of the allocated 1P addresses mapped against the hardware addresses.

If a user now wishes to subscribe to a new service, using the same access device 105, the relevant service provider needs to know the hardware address in order to provision the new service to that user and the hardware address can be obtained from the DHCP server 130 using a DHCP lease query message, as long as the user's access device IP address is known.

One way of enabling service provisioning can be done in response to a user's request over the Internet. In FIG. 1, the user may use their user equipment 100, connected to an access device 105, to access an interactive Web interface of the service provider's, installed on an Internet host 175. The Web interface will automatically pick up an rP address for the user's access device 105 which the service provider can use in querying the DHCP server 130 from their ISP platform 190.

Figure 2:
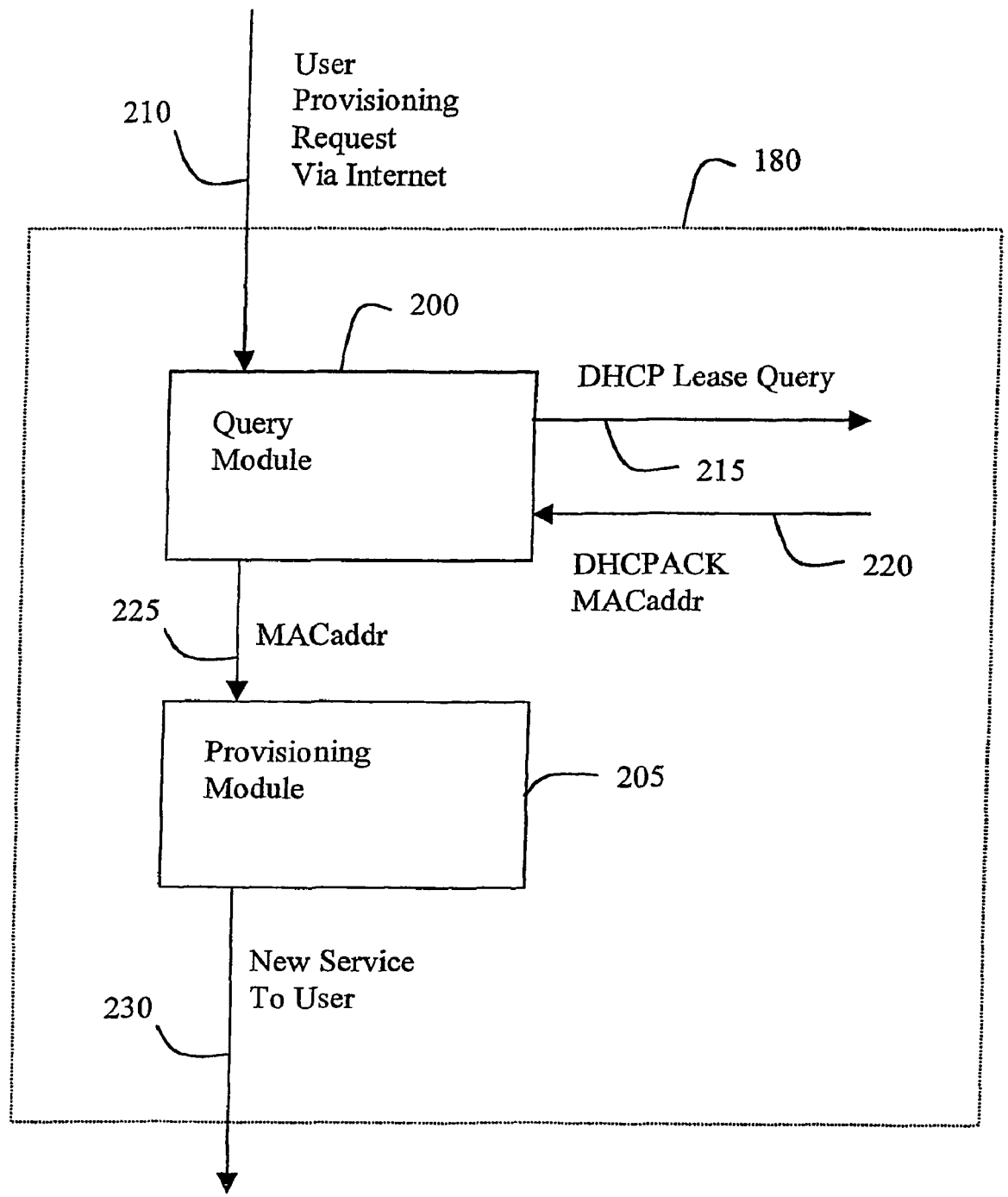
FIG. 2 is a schematic diagram of message flow in provisioning apparatus carrying out provisioning according to one example of the systems and methods herein described.

Referring to FIG. 2, in more detail, the ISP platform 190 comprises a provisioning server 180 which supports a provisioning module 205 and a query module 200. When the user interacts with the Web interface to request a new service, the query module receives (Step 210) an IP address associated with the user's access device 105 from the Web interface, for instance in the form "000.nnn.mmm. 111". The query module 200 formulates a DHCPLEASEQUERY message containing the IP address and sends it (Step 215) to the DHCP server 130 which returns (Step 220) a DHCPACK response packet from which the user's hardware address (MACaddr) is extracted by the query module 200 and passed (Step 225) to the provisioning module 205. The provisioning module, having a hardware address for the user's access device, can then perform provisioning in a conventional manner.

An exemplary method of operation will now be summarised.

(A) A user visits a website hosted on an ISP server 175 and requests a new service. This request contains the user's IP address and identifies the service requested. The request is communicated to the service provider's Web interface which communicates the request or a portion thereof to a provisioning application on a provisioning server 180. The Web interface may be a part of the provisioning application, it may be separate but run on the same server, or it may run on a separate server altogether.

(B) The provisioning application receives the request (Step 210), performs validation as required and formulates a DHCPLEASEQUERY message containing the IP address to send (Step 215) to an appropriate DHCP server 130. In FIG. 2, the query is formulated by a specific query module 200, but this may be integrated seamlessly into the provisioning application.

(C) The DHCP server 130 receives the message and returns (Step 220) the appropriate MAC address. If the DHCP server does not support DHCPLEASEQUERY or does not have the information then either no response will be sent or a null response, according to the circumstances and the DHCP protocol.

(D) The provisioning application processes the response packet, if any, and extracts a MAC address, if possible. In the event that the provisioning application cannot obtain a response from any DHCP server, then it must revert to other methods of obtaining a MAC address, for example by requesting the user to supply it. Even if it is available, the user may be requested to verify the information obtained.

(E) Provisioning is carried out as required, using the MAC address obtained to enable provision of the new service to the user (Step 230) via the relevant access device; the remainder of the provisioning process may correspond to or be based on a known provisioning process.

The DHCP Lease Query protocol will be available to those skilled in the art and so is not described in detail. A list of drafts of the Internet Society may be found at http://www.ietf.org/ietf/lid?abstracts.txt. However, the following may assist in understanding the background and explaining the novel use made of this low level query, which was intended for use by access concentrators such as routers and not previously contemplated for use in provisioning applications.

Background to DHCPLEASEQUERY

The DHCPLEASEQUERY message is a new DHCP message type transmitted from a DHCP relay agent to a DHCP server. It is intended that a DHCPLEASEQUERY-aware relay agent would send the DHCPLEASEQUERY message when it needed to know the location of an IP endpoint. The DHCPLEASEQUERY-aware DHCP server would reply with a DHCPKNOWN or DHCPUNKNOWN message. The DHCPKNOWN response to a DHCPLEASEQUERY message would allow the relay agent to determine the IP endpoint location, and the remaining duration of the IP address lease.

Query by IP Address:

The system and methods herein descried may make use of this feature, which will be summarised briefly. (Words in capital letters are keywords which can be interpreted as described in the IETFs RFC 2119.)

For this query, the client passes an IP address to the DIICP server which returns any information that it has on the most recent client to use that IP address. Any server which supports the DHCPLEASEQUERY message MUST support query by IP address. If an IP address appears in the client IP address ("ciaddr") field, then the query MUST be by IP address regardless of the contents of the MAC address or client-id option (if any).

Definition of MAC Address

In the context of a DHCP packet, a MAC (Media Access Control) address consists of the fields: hardware type "htype", hardware length "hlen", and client hardware address "chaddr".

Sending the DHCPLEASEQUERY Message

Although it is envisaged in the draft protocol that a DHCPLEASEQUERY message would typically be sent by an access concentrator, in fact, in this embodiment, the message will be sent (or caused to be sent) by a provisioning application. The DHCPLEASEQUERY message uses the DHCP message format as described in [RFC 2131], and uses message number TBD in the DHCP Message Type option (option 53). The DHCPLEASEQUERY message has the following pertinent message contents:

The gateway address (giaddr) MUST be set to the IP address of the requestor (i.e. the server running the provisioning application). The giaddr is independent of the ciaddr to be searched; it is simply the return address for the DHCPKNOWN or DHCPUNKNOWN message from the DHCP server.

The Parameter Request List SHOULD be set to the options of interest to the requestor.

The Reservation bit in the "flags" field of the DHCP packet (see [RFC 2131]) is used to specify if the response should include information encoded into reservations.

Specifically for Query by IP Address:

The values of htype, hlen, and chaddr MUST be set to 0.

The ciaddr MUST be set to the IP address of the lease to be queried.

The client-id option (option 61) MUST NOT appear in the packet.

Processing the Response

If the DHCP server has information about the most recent device associated with the IP address specified in the ciaddr, then the DHCP server MUST encode the physical address of that device in the htype, hlen, and chaddr fields. Otherwise, the values of htype, hien, and chaddr MUST be set to 0 in the DHCPKNOWN packet.

Thus, to extract the physical address, the provisioning application need simply read the htype, hlen and chaddr fields in a response packet. In the case of a cable modem, the MAC address is obtained and, in the case of a DSL modem, the PVC ID is obtained.

Figure 3:
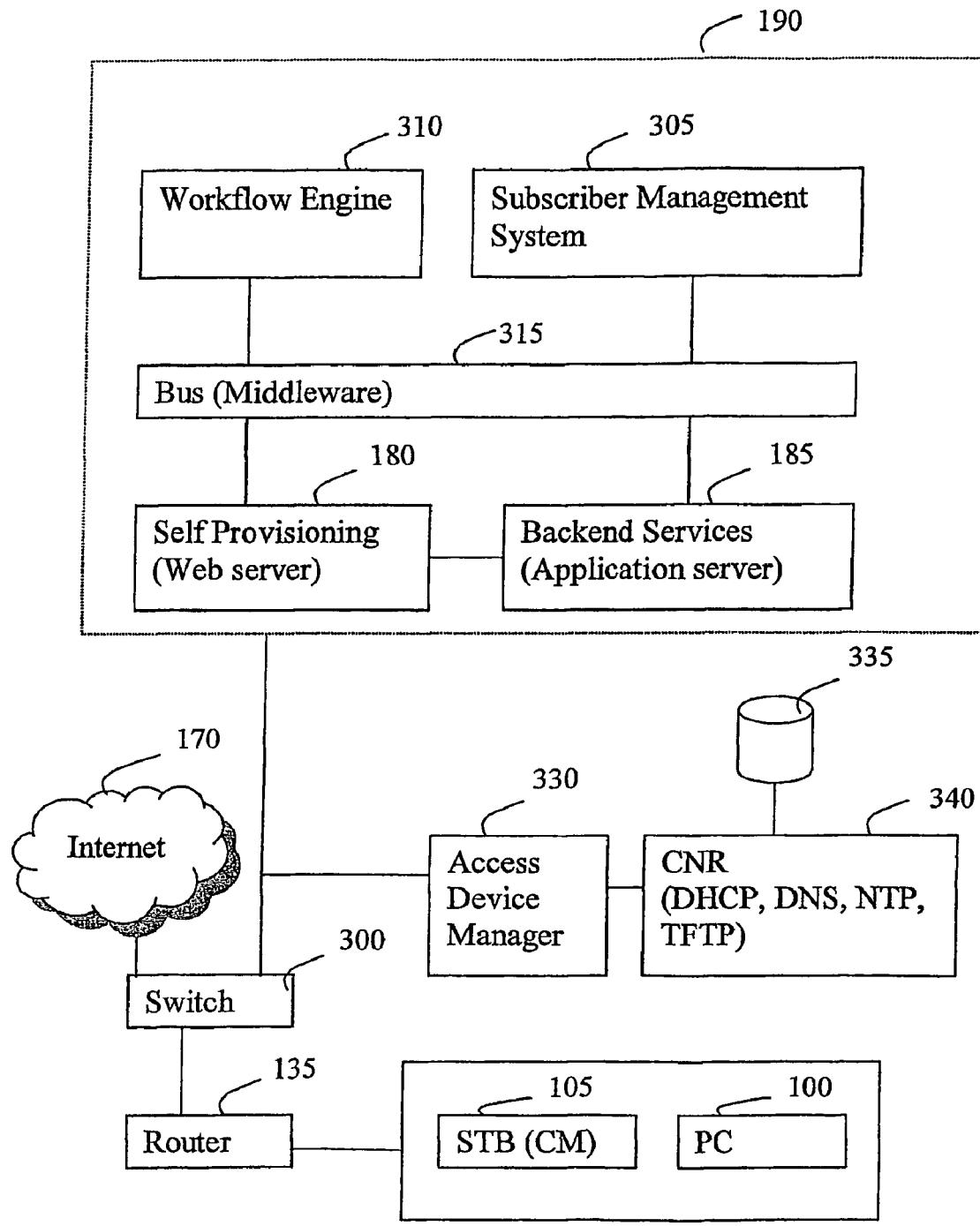
FIG. 3 is a schematic diagram of an architecture for a service management system using the provisioning apparatus of FIGS. 1 and 2.

Referring to FIG. 3, the network environment in which services are administered and delivered can be complex. It may be that the service provider's platform 190 is directly connected to the network to which the user's access device 105 is connected. In this case, the provisioning server 180 can easily send a DHCP Lease Query message to the DHCP server 130 for the relevant network. However, in an open access environment, it may be that the network is actually one of many which could be used by a service provider. In this environment, each broadband network may have an associated management platform comprising an access device manager, e.g. a cable modem manager 330 such as a cable modem termination system, and an address server of some sort which might be managed centrally for instance by a Cable Network Registrar (CNR) 340 as one of several network address servers across several networks. The CNR 340 may then have access over a core network to various address-related platforms, such as DHCP servers 130 and Domain Name Servers (DNS). The core network will also be connected to the Internet 170.

An environment of this type is described in "Integration Solutions Guide for Managed Broadband Access Using MPLS VPNs for MultiService Operators", published by Cisco on the Internet at: http://www.cisco.com/univercd/cc/td/doc/cisintwk/intsolns/mplscabl.htm.

Since multiple ISPs will have access to the same networks, a way in which such an environment might be managed is that each ISP has its own set of IP addresses and effectively its own Virtual Private Network (VPN) which may in practice be supported by several separate broadband networks. Whenever a user's access device such as a cable modem 105 is assigned an IP address belonging to a particular ISP, that cable modem along with all of the devices 100 connected to its Ethernet port are placed into that ISP's VPN. Thus, the user's PC can acquire an IP address in the ISP's address range directly from the ISP's DHCP server via the CNR 340.

It is known in an environment of this general type, providing managed broadband access via logical separation, to use tunnelling for communication between an ISP's platform and the management platform supporting the CNR 340. The use of this tunnelling may be extended to allow a provisioning server 180 of the ISP to obtain user access device hardware addresses via the CNR 340 of that management platform. The steps of FIG. 2 can be repeated but the DHCP Lease Query message will be sent (Step 215) and acknowledged (Step 220) using a tunnelling protocol over a network such as the Internet itself, or another network such a management core network using the Internet Protocol.

Referring again to FIG. 3, once a service provider can obtain an access device hardware address for a user's service provision, there are several potential benefits which the service provider can exploit in relation to individual access devices. The service provider can provide various backend services via an application server 185 and can interface via middleware 315 to a workflow engine 310 and a subscriber-management system 305. The following are examples of potential benefits:

end-to-end self provisioning for the user, including deprovisioning
using a single interface and PIN for provisioning
open access provisioning
resource management
fraud management As mentioned above, the auto-discovery by the service provider platform of the user's access-device hardware address on service provisioning removes the need for the consumer to enter the physical address of an access device manually. The use of the hardware address of the access device means that the consumer devices don't have to be provisioned individually which provides greater flexibility in handling lifetime scenarios. For example, a user can change, upgrade his/her PC without having to go through the whole provisioning process.

Further methods and apparatus herein described can also simplify de-provisioning. The consumer can self de-provision services by accessing the interactive Web interface of the relevant service providers, installed on an Internet host 175, and using substantially the same process as described above but now to de-provision the service. In this case, the Query Module 200 and Provisioning Module 205 of the ISP's provisioning server 180 will again query the relevant hardware address server, such as a DHCP server 130, but the provisioning module 205 will de-provision the service in place of provisioning it as before.

By providing a simple authentication routine in, or accessible by, the provisioning module 205, service provisioning and de-provisioning can be done through a single Web interface 175, using a PIN and thus providing again greater flexibility. The same interface and application can then be used not only to provision multiple different services, over multiple end user termination devices 100, but also for multiple subscribers and/or users.

By using a tunnelling protocol, an open access business model can be supported, which enables both a retail model (i.e. "plug and play" type provisioning of off-the-shelf access devices) and/or a wholesale business model (provision of services that are external to a management network which may again be external or independent of broadband networks used for the actual service provision). Since the service provider can auto-discover the access device identity, pre-provisioning is not required and any access device can be provisioned, whatever its origin. This tunnelling feature for provisioning means that service providers external to the broadband network itself can host their own service-provisioning in-house but through the operators network.

Through integration with a capacity management, or service assurance product, for instance accessible via the middleware 315 of the service provider's platform, the service provider can check that the relevant network resources are capable of handling the quality of service requested by the customer. To do this, the service provider needs to keep track of all the potential services to be delivered so as to aggregate at least loosely all impacted service levels and thus determine the potential risk and probability of resource congestion at peak time.

For example, if network equipment X serves 10,000 users with a back-plane capacity of 2 GB, then the service provider should only sell 80% of the equipment capabilities and only through a mix of various of qualities of service (QoS). A Gold service could be based on a capacity of 2 Mbps, a Silver service would be 1 Mbps, a Bronze service would be 512 Kbs and a standard service would be 256 Kbps. Then the service provider needs to aggregate the content of all the service agreements entered into so as not to exceed the utilisation threshold decided by the operator. This will generally need to be adjusted to reflect peak usage time and other relevant factors.

When a customer uses self-provisioning, this aggregation may remain important. Although the service provider may not control every new instance of service provision, it remains important (or indeed is more so) that the service provider maintains a database and software to monitor service provision. Means to maintain such a database and software are already known. However, another aspect which arises with self-provisioning is ongoing service monitoring.

New customers will generally have an expectation of an acceptable quality of service and will often have a form of service level agreement with a service provider. Existing customers will not expect the quality of service to become degraded because other customers have been newly provisioned.

By sharing data, for instance by sharing a data model and access to common data storage, a provisioning application working in conjunction with a service assurance application may offer a particularly efficient use of data for diagnostics. The invention independently provides a method comprising sharing a data model between a provisioning application and a service assurance application, preferably dynamically, and further independently provides use of a common data model in a plurality of communications applications including at least two of: provisioning, service assurance, planning, inventory management, and network management. Service assurance products may for instance receive alarm signals or data arising in use of a network to provide an identified service. Since a provisioning application may gather subscriber-related address data in relation to services provisioned, by sharing access to that data the service assurance product can be enabled to relate alarm data not just to services but also to relevant service subscribers.

Referring further to FIG. 3, the service provider's platform 190 may be provided with a database accessible to several applications including backend services 185 and subscriber management 305 via the middleware 315. Except perhaps for services paid in advance, when a subscriber triggers provisioning of a new service for instance by means of a self-provisioning module 180, it is usually necessary that the subscriber provides identification, at least in the form of a billable account number, as well as identifying the service to be provided. If the provisioning module 180 writes this information to the database, it is relatively simple to give access to the same information for a service assurance application, particularly if they share the same data model. This represents a very convenient way to support analysis of service problems during use of a network in relation to individual customer accounts.

Tools for monitoring performance of networks and services in use are known, such as the Micromuse Netcool products.

An advantage of the service provider having knowledge of the access device address is that the service provider can determine the serviceability of the customer before trying to provide a service. This step can be used to ensure that the operator infrastructure can physically deliver services to the client since the service provider will be able to detect at least some shortcomings in the customers arrangement. For instance, if a customer wishes to subscribe to a VoD over DSL service, the service provider is enabled to check whether the customer's access device is actually physically close enough to a DSL Access Multiplexer (DSLAM) and that there is therefore enough bandwidth. The MAC address contains information on hardware type and this information is also therefore available to the service provider for use in checking serviceability.

The use of a limited IP scope at initial activation time limits greatly fraud by preventing an un-authorised access modem to access services. However, through management of the IP address scheme and physical address of the access devices, whether based on the MAC address of a cable modem or management of the PVC in the case of a DSL modem, it is possible for the service provider to detect the origination of fraudulent activity and to take action to avert the fraud for instance by suspending or de-activating service provision to the offender, or by downgrading level of service.

The methods and apparatus herein described can be used in relation to many different services, access networks and CPE types. For instance, the following can be supported:
IP Data Access
Service on Demand (video or games, i.e., any pay-per-use services . . . )
TV broadcast
Voice over IP
Cable networks (DOCSIS and DAVIC)
XDSL
Wireless Local Loop (WLL)
Fibre-to-the-Home (FITH)
Personal Computers
Set Top Boxes (STBs)
Personal Digital Assistants (PDAs)
mobile phones.

Figure 4:
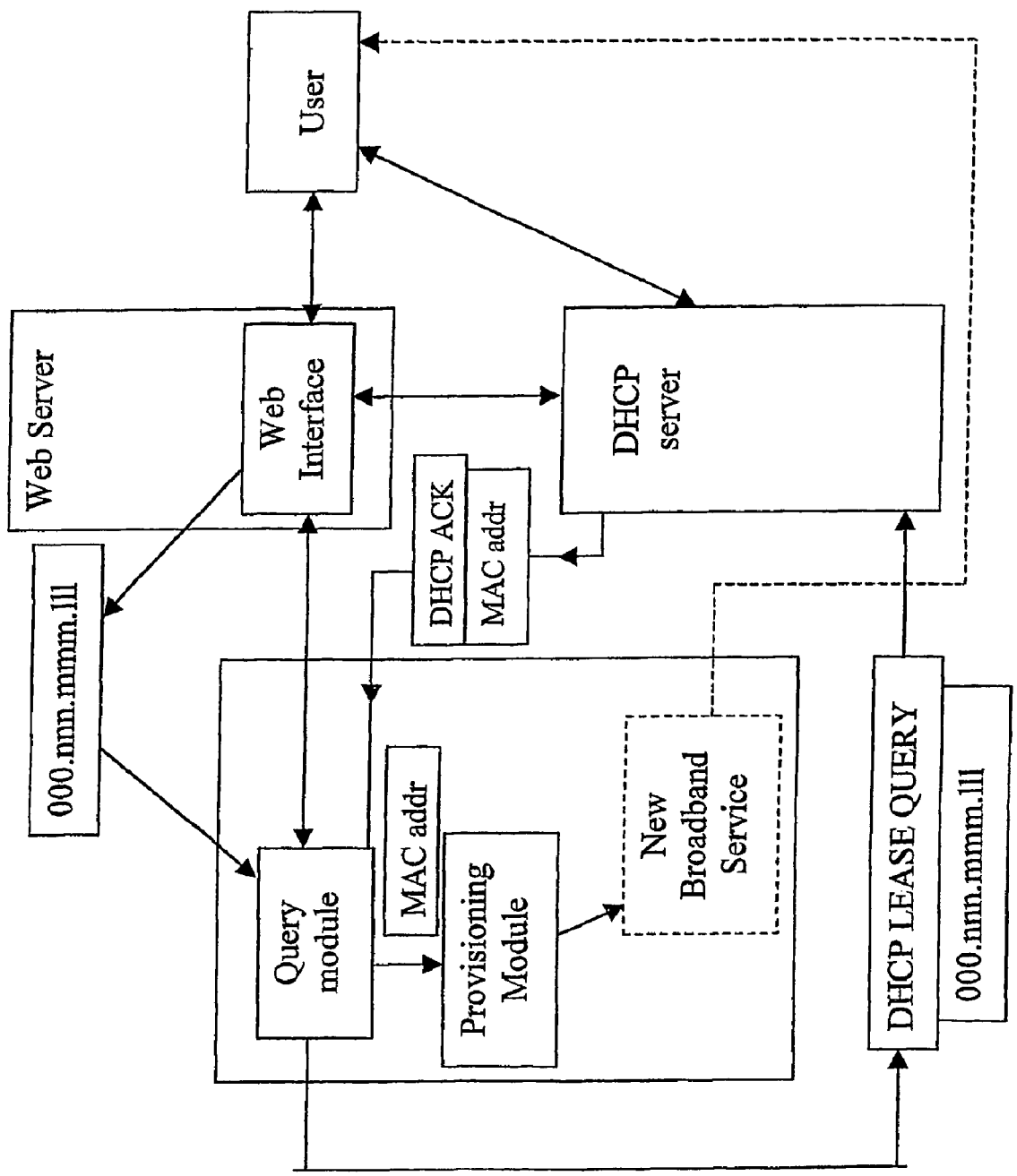
FIG. 4 is a schematic diagram of message flow in provisioning apparatus carrying out provisioning according to a further example of the systems and methods herein described.

FIG. 4 illustrates a further example of message flow in provisioning apparatus carrying out provisioning according to an embodiment of the systems and methods herein described.

Each feature disclosed may be provided independently, unless otherwise stated. In summary, the provisioning of communications services may be facilitated by a self-provisioning application which, in preferred applications, can operate with off the shelf access devices, such as cable modems, is disclosed; this makes use of an existing IP address to discover a unique "physical" address (e.g. MAC address for a cable modem or PVC ID for a DSL modem) thereby avoiding the need for a user or specialised user software to communicate the physical address of the access device prior to provisioning. A low level command, particularly DHCP lease query, is preferably used to obtain a hardware address for use in provisioning of a new broadband service based on a user's existing IP address. Provisioning may be based on the access device physical address. The provisioning application may communicate with a capacity management application. It may also, or instead, share a data model and data storage with a service assurance application to enable data captured during service provision to be used in alarm analysis after a service has been provisioned and is in use.

Application to VPN MPLS

The systems and methods of the provisioning system and methods described herein will now be illustrated further by the following description of an Internet Infrastructure Provider (IIP) specific Virtual Private Network (VPN) Multiprotocol Label Switching (MPLS) provisioning system. This system is described by way of example only and the description is not intended to be limiting in any way. The terms "subscriber" and "customer" may be used in the following description to denote potential users of the system.

The test set up described below uses a plurality of simulated customers at geographically distinct sites and demonstrates many of the advantageous features which may be achievable in a typical implementation.

Figure 5:
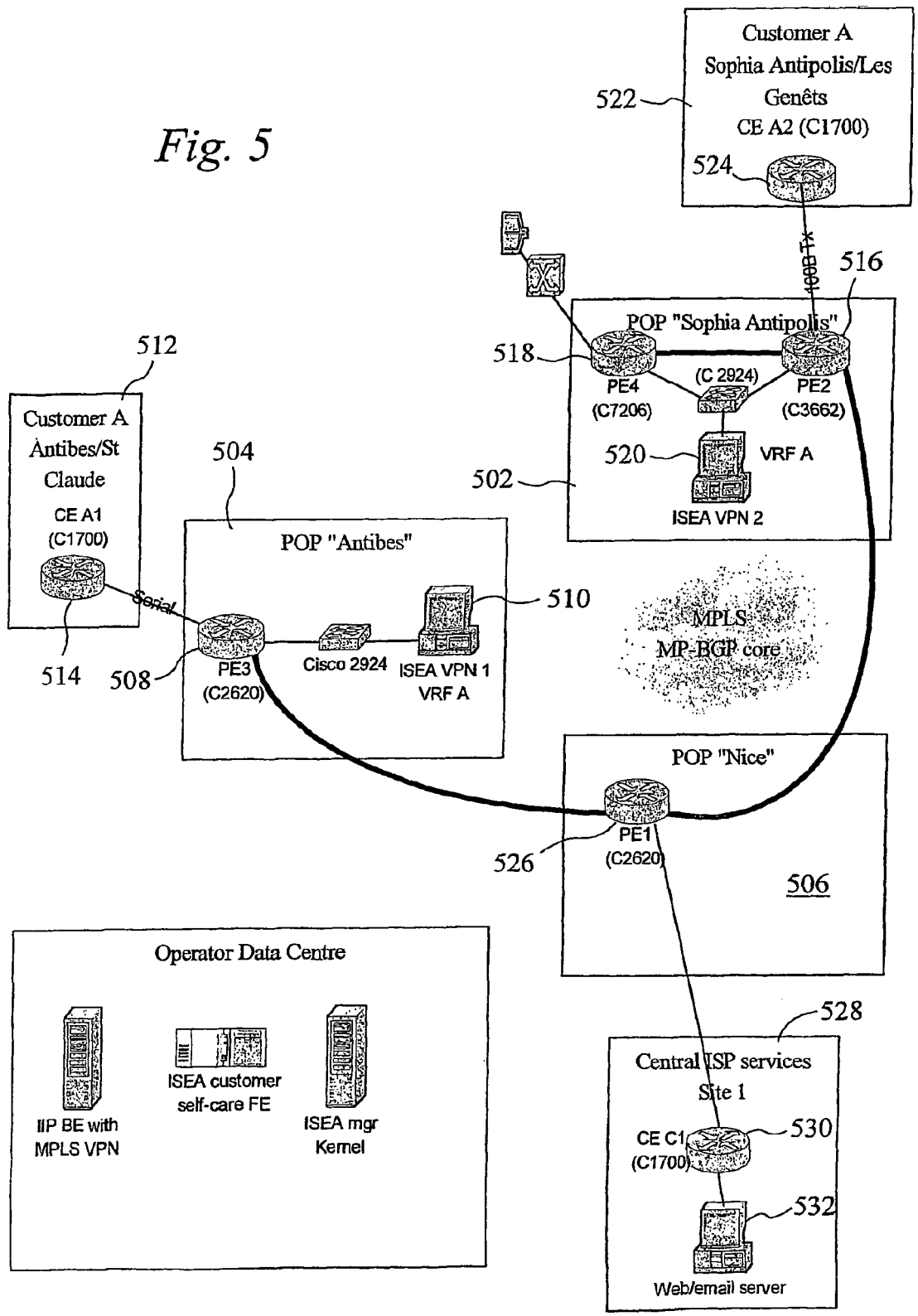
FIG. 5 is a schematic diagram of an initial set-up of a network environment for provisioning apparatus in accordance with a further example of the system and methods herein described.

In the initial scenario for this example system, illustrated in
FIG. 5, the core MPLS network has been set-up with 3 Points of Presence (POPs) 502, 504, 506:Antibes POP 504 has one Provider Edge (PE) router 508 with an ISEA VPN 510.
PE3 508 has a VRF (a VPN Routing and Forwarding device) for Customer A's Antibes/St Claude site 512 connected via serial interface to a C1700 Customer Edge (CE) router 514.
Sophia Antipolis POP 502 has 2 PE routers 516, 518. ISEA 520 is connected to both PE routers.
PE2 516 has a VRF for Customer A's Sophia Antipolis/ Les Genets site 522 connected via Fast Ethernet to a C1700 CE router 524.
PE4 518 is connected to an ATM switch and to a DSLAM (Digital Subscriber Line Access Multiplexer). There are no VPN customers yet.
Nice POP 506 has one PE router 526 with no ISEA MPLS.
PE1 526 has a VRF for Central ISP services site 528 connected via Fast Ethernet to a C1700 CE router 530. A web/email server 532 is located behind the CE router.

Customer A has already been provisioned using IIP VPN. Customer A has 2 sites
- A primary CE A1 site located in Antibes/St Claude 512 connected to Antibes POP 504.
- A secondary CE A2 site located in Sophia Antipolis/Les Genets 522 connected to Sophia Antipolis POP 502.

Figure 6:
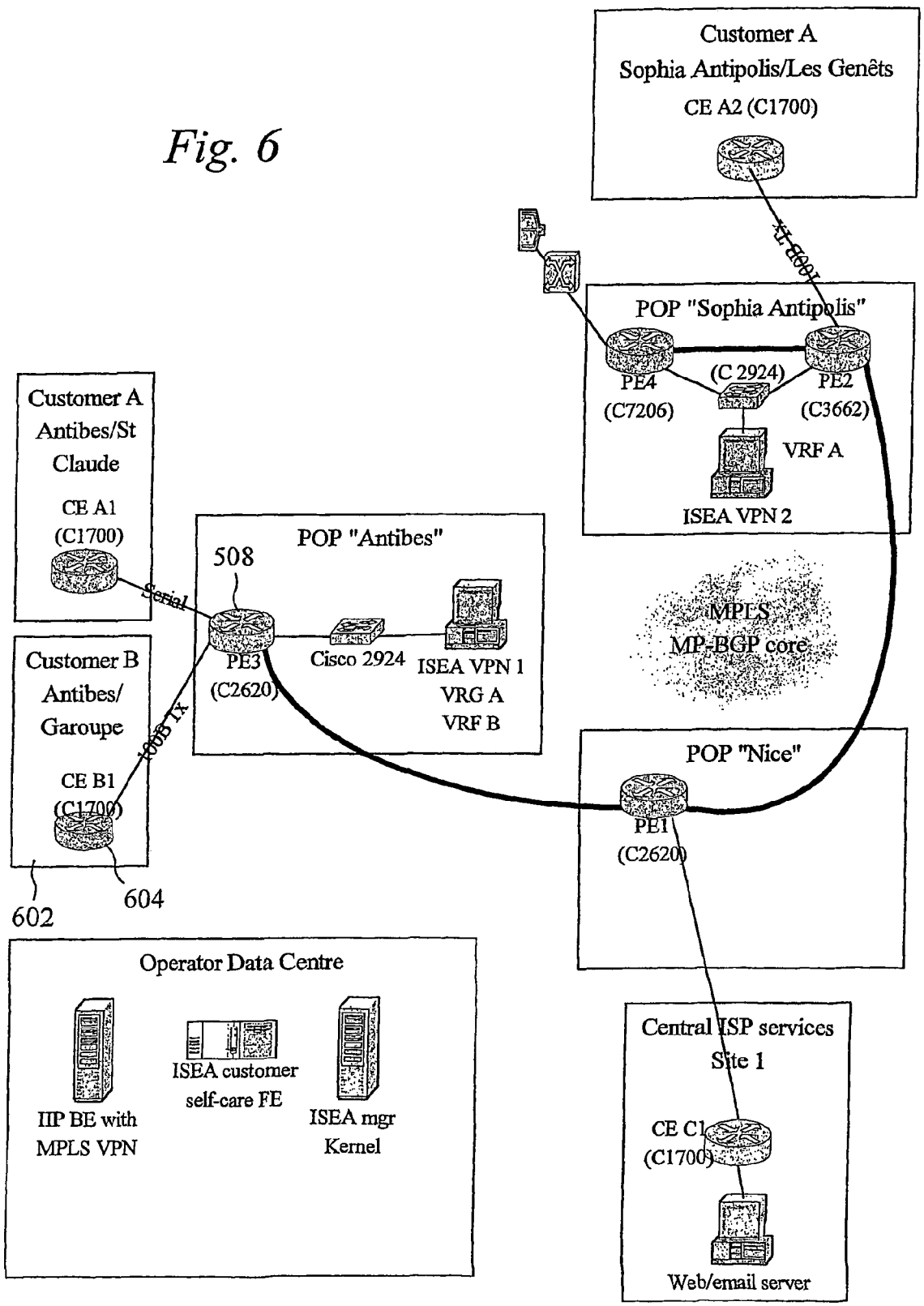
FIG. 6 is a schematic diagram of a network environment for provisioning apparatus in accordance with the example illustrated in FIG. 5 after a new customer edge router has been added to the network according to an example process.

An example of the process of connecting a new CE router to the network in a new VPN with access to the centralised services web server and management VPN will now be described with reference to FIG. 6, which summarises an example network topology. In this example, all actions are carried out through the MPLS console/Graphical User Interface (GUI).

1. A new customer called "Customer B" is created using the console.
2. A new VPN is created for "Customer B" using the console
3. A new primary CE site called "Antibes Garoupe" 602 is added for Customer B with ISEA monitoring (Ethernet 802.1Q sub-interface).
4. An interface is provisioned on the PE router 508 for the PE-CE link
5. A minimal "IP only" configuration file is created for the CE router 604.
6. The configuration file is manually loaded onto the CE router 604 and it is plugged in.
7. When IP connectivity is established to the CE 604 the VPN/routing/CoS config file is downloaded to the router. This demonstrates the advantageous feature of the provisioning system in preparing configuration files.
8. Customer B may then connect a PC behind CE router 604 and access centralised services.

Figure 7:
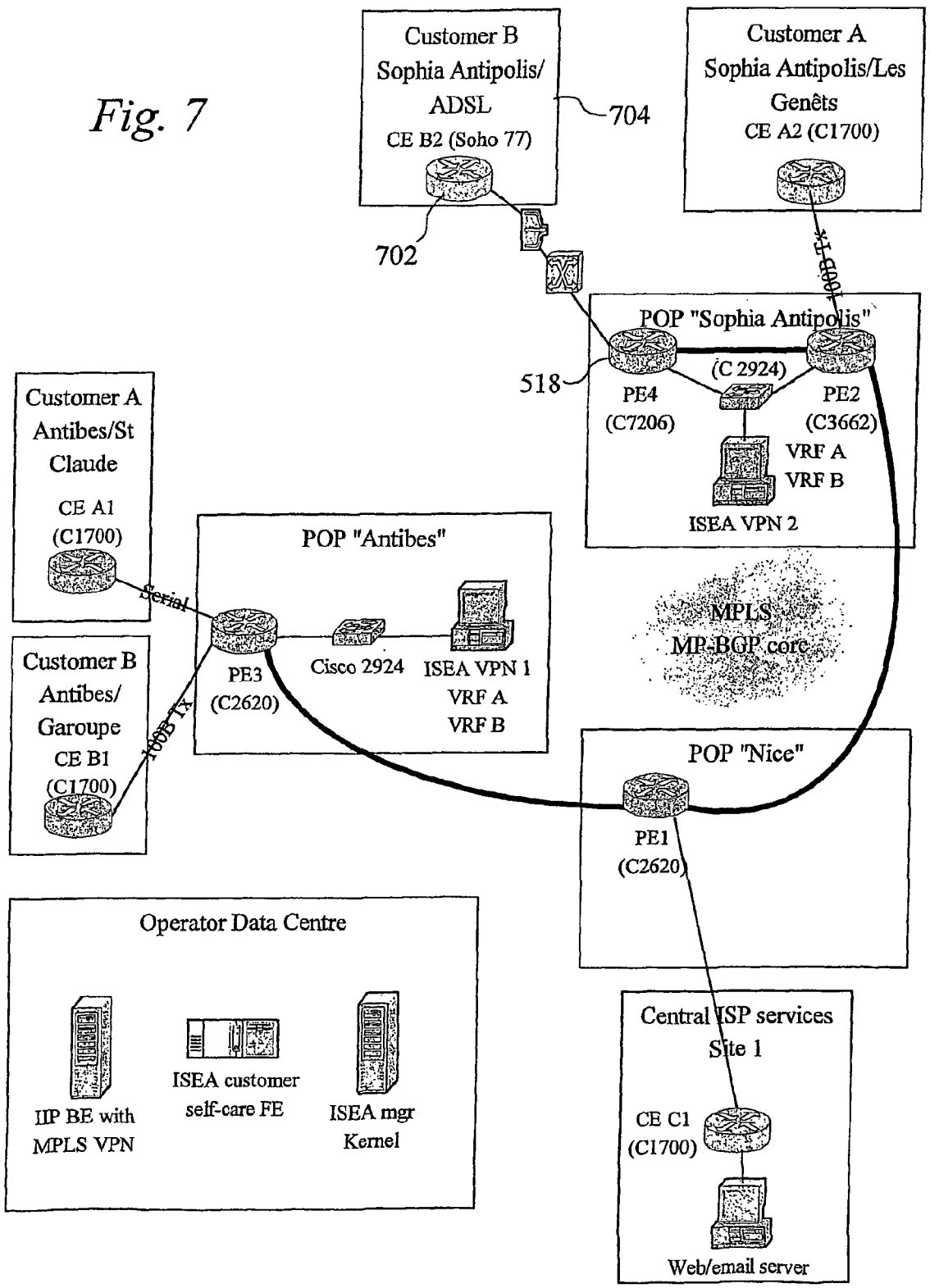
FIG. 7 is a schematic diagram of a network environment for provisioning apparatus in accordance with the example illustrated in FIG. 5 or 6 after a new customer edge router has been added to the network according to a further example process.

By way of example, FIG. 7 summarises the VPN topology and illustrates the process of connecting a new CE router 702 to the network in a new VPN with access to the centralised services web server and management VPN. In this example, all actions can be carried out through the MPLS console/GUI.

1. A new secondary site called "Sophia Antipolis ADSL" 704 is added for Customer B (where ADSL indicates an Asynchronous Digital Subscriber Line).
2. An interface (ATM sub interface) in a VRF is provisioned on the PE router 518 for the PE-CE link with ISEA monitoring (Ethernet 802.1 Q sub-interface).
3. The full CE router configuration is provided to the customer via a File Transfer Protocol (FIP) download.
4. The configuration file is manually loaded to the CE ADSL router 702 and it is rebooted.
5. Customer connects a PC behind ADSL CE router and accesses centralised services.

Figure 8:
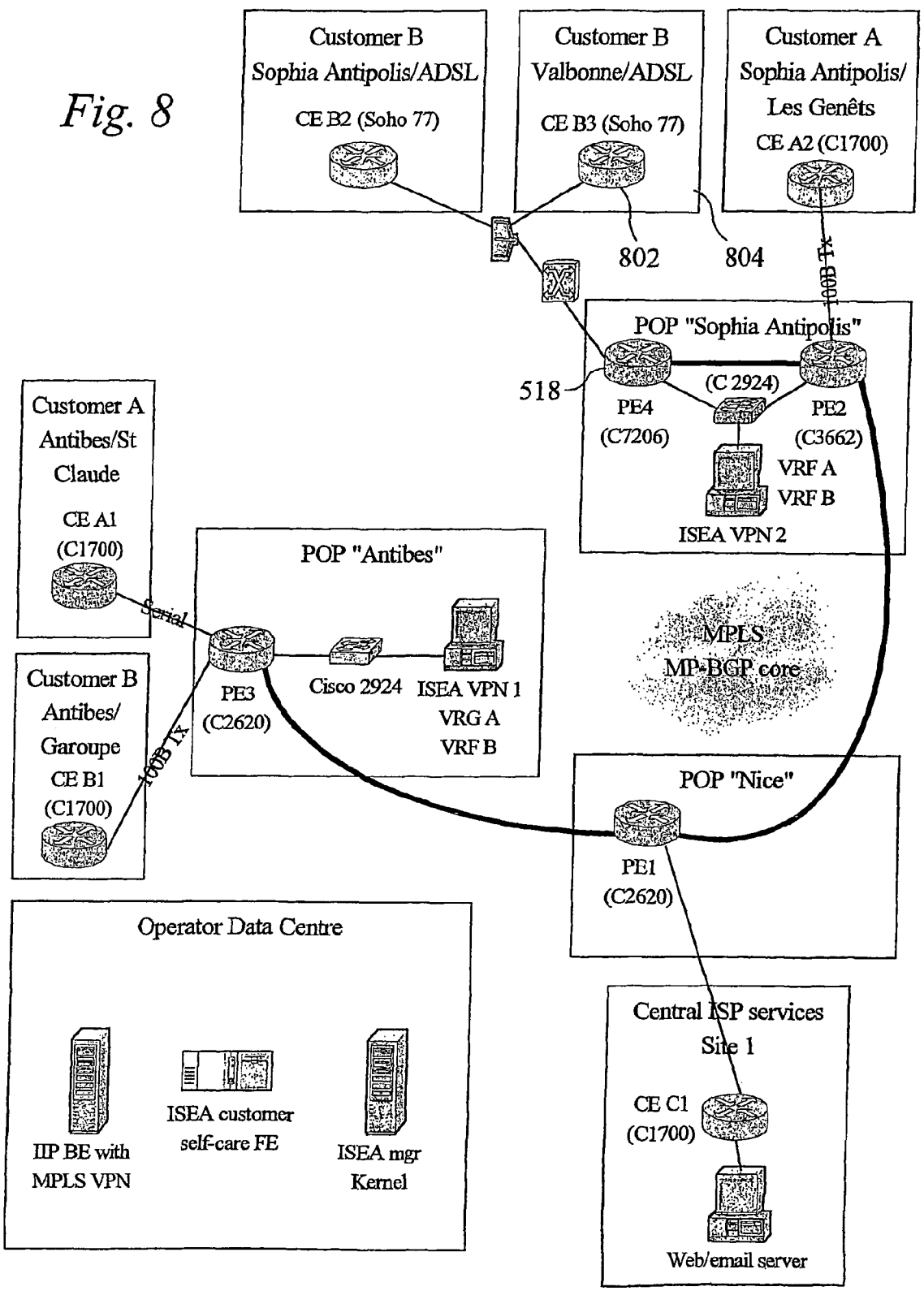
FIG. 8 is a schematic diagram of a network environment for provisioning apparatus in accordance with the example illustrated in FIG. 5, 6 or 7 after a new customer edge router has been added to the network according to a further example process.

The phase PE-CE link parameters for the CE router 702 added in above may be modified according to the following example procedure:

1. In the MPLS console/GUI, browse to the PE-CE link edition screen.
2. Edit the Class of Service (CoS) of the Ethernet PEACE link by choosing a Diffserv class and sub class and applying this to the Ethernet interface
3. Deploy the configuration to the PE4 518 and CE B2 702 routers FIG. 8 illustrates an example of a VPN physical topology in which a new CE router 802 may be connected to the network in a new VPN with access to the centralised services web server. In this example, all actions may be carried out through a batch file using the VEA.

1. A new secondary site called "Valbonne ADSL" 804 is added for Customer B.
2. An interface (ATM sub interface) in a VRF is provisioned on the PE router 518 for the PE-CE link with ISEA monitoring (Ethernet 802.1 Q sub-interface).
3. The full CE router configuration is provided to the customer via FTP download.
4. The configuration file is manually loaded to the CE ADSL router 802 and it is rebooted.
5. Customer connects a PC behind ADSL CE router 802 and accesses centralised services.

Figure 9:
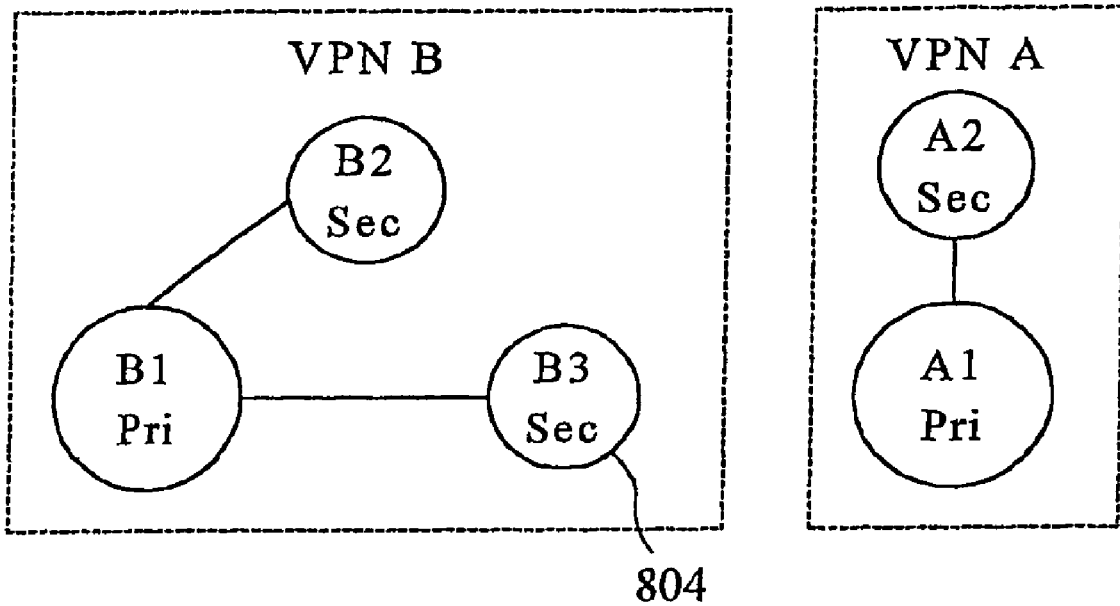
FIG. 9 is a schematic diagram of an initial topology of the network environment for provisioning apparatus, before modification has taken place, according to an example of the system and methods herein described.

VPN topology may also be modified. An example of a process in which VPN B's topology is modified will be described below. FIG. 9 summarises the VPN logical topology of the present example before the modification.

By way of example, Customer B has expressed a requirement that site B3 804 (currently secondary) is now becoming one of his major offices/data centres and it must be able to communicate with all primary and secondary sites in the network. In order to modify the topology accordingly, the following process may be implemented:

1. In VPN console/GUI go to the properties of site B3 804.
2. Change the status of site B3 from secondary to primary.
3. The topology change is applied to the network elements.
4. With a PC connected behind B3 804 show that all sites (B1 602, B2 704) can be pinged.

Figure 10:
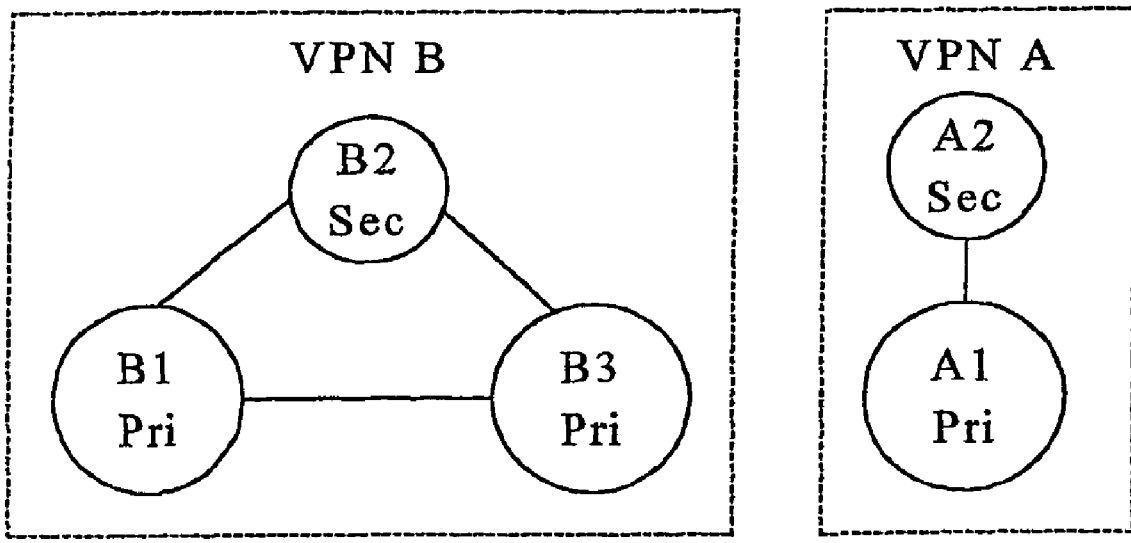
FIG. 10 is a schematic diagram of a final topology of the network environment for provisioning apparatus, after modification has taken place, according to an example of the system and methods herein described.

FIG. 10 summarises the VPN logical topology after the modification.

Communications Network Management System

The provisioning system and methods described above may also be implemented in conjunction with a communications network management system, which may find particular but not exclusive application in management of systems supporting broadband services.

With the advent of higher transmission capacity networks, and particularly for instance broadband networks, network operators have to manage more and more complex infrastructure and to keep an always-increasing number of services up and running. As a result, subscriber satisfaction can drop if they perceive deficient service management and there is more subscriber "churn". Meanwhile, the operators already have to invest more in their operation support teams, taking on more people and/or improving the skills their people have. Hence it is a challenge to be able to provide cost effective management of complex services.

The sort of complexity involved is demonstrated by the services it may be important to support. For instance, these may include digital multiplexes of entertainment video, high speed connections with the Internet and local servers via cable modems, commercial enterprise Local Area Networks and Wide Area Networks, personal communication services over cable and telemetry, as well as traditional analogue TV.

The supporting "cable" network technology may also be complex, based partially on fibre as well as on coaxial cable. A typical architecture for a network operator might be a hybrid fibre coaxial (HFC) architecture in which there is a head end, where all the signal sources are collected and processed, connected for distribution over a fibre backbone to primary hubs, comprising switches or routers, which in turn distribute to secondary hubs which in turn distribute to fibre nodes. The fibre nodes convert the communications to radio frequency and use coaxial cable to reach the end-users who may be corporate or private. The head ends and hubs will also distribute to their local vicinities.

In the broadband domain, Such as services offered over cable networks, there are characteristics which differentiate today's services from those traditionally offered over telephone networks. For instance high speed data is often transmitted over always-on connections to customer personal computers (PCs) using cable modems (CMs). This means that cable operators need to provide a network which is working correctly throughout every day of every week to meet performance requirements compatible with service level agreements with customers. The always-on connection is vulnerable to non-subscribers trying to get free connections and the computer access is vulnerable to hackers.

Automated fault management tools are known but tend to be focused on equipment, tools and mechanical problems rather than trying to solve problems at other levels of customer service. Meanwhile, as customer expectation and competition in the market increase, operators are under pressure to offer not just consistent and high quality services to many customers using different types of customer equipment but also to take into account fraud and security management.

According to an aspect of the present invention, there is provided a communications network management system, which system comprises:
a) an input for fault reports in respect of a network and/or one or more services supported by a network,
b) a data store for storing data in respect of said network, and/or services,
c) a fault processor for processing fault reports received via the input, using data stored in the data store, to generate corrective solutions, and
d) a simulation engine for simulating one or more service instances wherein the simulation engine has an output to the network to trigger provision of said one or more service instances, such that a fault report in respect of said provision will be received at the input and processed by the fault processor.

The simulation engine can be used in embodiments of the present invention in providing service assurance to the end user by intelligent monitoring of complex platforms. In particular, the simulation engine could be used either proactively, to run test service instances, or to validate the result of applying a corrective solution which has been generated by the fault processor. The simulation engine may be implemented by one or more agents running on a network component, for example a user access device such as a cable modem, or a switch or router or access concentrator.

The manner in which corrective solutions are generated is of course important, particularly in respect of the level at which they are targeted. It could be easy to meet the requirements of a received fault report but to fail to diagnose a more widespread problem that might continue to mean service failures.

According to a further aspect of the present invention, there is provided a communications network management system, which system comprises:
b) an input for receiving fault reports in respect of one or more services supported by a network, and for receiving component alarms from components of said network;
b) a data store for storing data in respect of said network and/or services; and
c) a fault processor for processing fault reports received via the input, using data stored in the data store, to generate corrective solutions,
wherein the fault processor comprises a correlation engine for correlating received fault reports in respect of one or more services with received component alarms.

Embodiments of the present invention including the correlation engine can provide improved fault processing in that they may be able to identify a root cause of faults which can affect more than one service, or service to more than one customer.

Preferably, the data store is structured to support fault processing of this type. For instance it may be structured to hold data relating a problem description to one or more fault reports and to corresponding one or more component alarms. A problem description may include data describing component behaviour and, preferably, data received in respect of historic component behaviour. In the relatively simple network and service provision of the past, historic behaviour is likely to reproduce predicted behaviour for a component However, in the much more complex networks and services being provided today, embodiments of the present invention recognise that component behaviour may no longer be fully predictable. Thus embodiments of the present invention which support fault processing in relation to historic component behaviour may be very valuable in providing a learning mechanism in fault processing.

Alternatively, the fault reports generated by problems with component behaviour might be unpredictable. Hence a problem description may instead or as well contain data defining fault reports in respect of past system behaviour, related to successful corrective solutions.

Known fault management systems for communication systems have relied principally on fault reports by end-users to locate faults and trigger a fault management process. Fault management has been done largely at the network level, with the aim of keeping a network fully functional. However, this means there will often be delays between identification of a fault and its correction. As mentioned above, embodiments of the present invention may use proactive simulation of service instances to trigger faults latent in the network but not yet exposed by customer requirements. A further improvement which can be provided by embodiments of the present invention is to relate fault processing to both service and customer data.

According to a further aspect of the present invention, there is provided a communications network management system, which system comprises:
c) an input for fault reports in respect of a network and/or one or more services supported by a network,
b) a data store structured to store data in respect of said network and services, and
c) a fault processor for processing fault reports received via the input to generate corrective solutions;
wherein the data store is further structured to store customer data in relation to services and the fault processor comprises a correlation engine for correlating received fault reports in respect of one or more services with customer data.

Preferably, the fault processor further comprises sorting apparatus for sorting fault reports in an order determined by correlated customer data. This could be very important in prioritising fault reports and thus the manner in which a network is repaired in order to restore services of highest priority for instance because they have an impact on a large number of customers or customers with stringent service levels agreed.

In practice, the correlation engine may combine the attributes of the correlation engines of the previous two aspects of the present invention and thus provide a two stage correlation mechanism, including both correlation of fault reports to component alarms and correlation of component alarms to customer data.

Advantageously, the customer data includes a measure or priority of service provision in relation to an identified customer and an identified service. This enables a further level of flexibility for the manner in which the network is repaired which might be inherited from priority values in contractual data for the respective customer.

In an alternative to the previous aspect of the present invention, the data store may be further structured to store not necessarily customer data but a priority parameter in respect of at least one identified service and the fault processor may comprise a correlation engine for correlating received fault reports in respect of one or more services with the respective priority parameter(s). In this alternative, there is no need to rely on customer data to identify important services and thus to be able to prioritise fault reports or component alarms for repair.

It is intended in embodiments of the present invention that a network operator, such as a cable operator, should be able to deal efficiently, and preferably proactively, with problems relating to access loss, performance, fraud and security. Further, it is intended that the operator should be able to analyse the impact of a problem in more than one context, including preferably the impact on a service in relation to the location in a network, the subscribers (customers) affected and the nature of the impact such as lost access or limited performance. Then the operator should preferably be able to identify the equipment generating a problem, current or pending, fix the problem at the equipment level and log it for future analysis. This last may be particularly useful if the operator can use past problems in diagnosing future ones.

Embodiments of the present invention may take advantage of a particularly advantageous arrangement for launching test signals into the network. According to a further aspect of the present invention, there is provided a method of testing a broadband network, the network comprising a head end for receiving one or more communications services from service providers and transmitting the one or more services towards end user equipment, and comprising at least one node for receiving said one or more services from the head end and delivering the service(s) towards end user equipment, which method comprises launching a test signal to the network at said at least one node and monitoring a response by the network thereto.

A way of doing this is to install a personal computer, or like computing platform, in the node. The personal computer could be pre-programmed, or controlled from elsewhere, to launch the test signals. For instance, it could be controlled via the head end relevant to the node. In order to test the response of the network to something as close as possible to user signals, if the node is a node in which optical to electrical signal conversion takes place, at a cable modem termination system, the personal computer can be arranged to launch the test signals via the cable modem termination.

If there is a significant problem in the signal path used to launch one or more test signals, the same problem could affect incoming control signals to the personal computer. It is therefore particularly advantageous if the signal path used to carry control signals to the personal computer is different from the signal path used to launch one or more test signals from the personal computer. A way of providing these different paths is to launch the test signals via the cable modem termination system, which also means that the test signals closely emulate user signals such as service requests, but to carry the control signals to the personal computer without going through the cable modem termination system. Alternatively or as well, out of band signalling can be used for the control signals.

A network management system according to an embodiment of the present invention will now be described, by way of example only, with reference to the accompanying drawings (FIGS. 26 to 43):

Glossary (The following will not necessarily be the only expansions or explanations relevant and are here to give at least one option rather than to be taken as limiting the meaning of an acronym, word or phrase in any way.)

ACL: Access Control List
CM: cable modem
CMTS: Cable Modem Termination System
CRM: Customer Relationship Management
DHCP: Dynamic Host Configuration Protocol
DLC: Data Link Control. A service provided by the Data Link Layer of a function defined in the Open Systems Interconnection (OSI) Model for network communications. The Data Link Layer has two types of sublayer, a MAC sublayer for each physical device type and a Logical Link Control sublayer.
DSL: digital subscriber loop
DTV: Digital TV
EMS: element management system
FTTH: Fibre to the Home
HFC: Hybrid Fibre Coaxial network for carrying broadband (video, data and voice). The CATV company installs fibre from the Cable Head End (distribution centre) to serving nodes near the uses, then coaxial cable to the customer premises.
HSD: high speed data
Hub (See Regional networks and Hubs below) data can come in/go out in many directions. Usually includes a router, bridge or switch. May include modem cards for dial-in users, a gateway card to a LAN, and a line connection.
HTTP: HyperText Transfer Protocol
IDS: Intrusion Detection System
IDSL: Integrated Digital Subscriber Line. Can be flat rate without usage charges. It bypasses the voice network by plugging into a special router at the phone company end.
IEMS: Intelligent Element Management System
MAP: Internet Message Access Protocol. For accessing e/mail from a local server. The user can decide when and what should be downloaded. Cf POP3 (Post Office Protocol) in which everything is downloaded at once.
IP: Internet Protocol
ISM: Internet Service Monitor by Netcool
KMS: knowledge management system
LDAP: Lightweight Directory Access Protocol. Enables anyone to locate organisations, files, devices etc in a network.
MAC address: Media Access Control address. The unique hardware number of a device. In an Ethernet, it is the Ethernet address. In the Internet, a correspondence table relates the IP (Internet Protocol) address to a physical device address on a LAN.
MOM: Manager of Managers
MRTG: Multi Router Traffic Grapher. A tool which monitors traffic load on network links. It generates live representation by means of HTML pages containing GIF images. Available under GNU public licence.
NHE: Network Head End
PCS: Personal Communications Services
Regional networks and Hubs: these can carry digital multiplexes of entertainment video, high speed connections with the Internet and local servers via cable modems, commercial enterprise LANs/WANs, PCS over cable and telemetry, as well as traditional analogue TV. Typical architecture is the head end, where all the signal sources are collected and processed, distributing over a backbone to primary hubs which in turn distribute to secondary hubs which in turn distribute to fibre nodes. Everything between the head end and the fibre node is carried on fibre. The fibre nodes convert to RF and send signals onto coaxial cable to the users. The head ends and hubs will also distribute to their local vicinities.

Scope: in DHCP, a pool of IP addresses which the DHCP server can assign or lease to clients.

Segmentation: a network design approach using routers, switches and bridges to keep traffic levels down in a network. A router, switch or bridge provides an access point controlling traffic into and out of a segment of network. Traffic is only sent into the segment containing the destination of the traffic and won't be sent out of a segment if it is already in the segment containing its destination. Broadcast traffic may be blocked from a segment as a default behaviour of a router unless the router has for instance explicit instruction to pass broadcast traffic into the segment. Traffic in practice tends to be locally addressed. With segmentation, less traffic goes out onto the backbone and thus collisions are reduced. Segmentation reduces the number of users sharing the bandwidth since, within a segment, all users share the bandwidth and the smaller the segment the fewer the users sharing. It therefore increases available bandwidth to each user. It can also extend Ethernet cabling distances because the beginning point for the maximum cabling distance is reestablished.

SMTP: Simple Mail Transfer Protocol

STB: Set Top Box

Telnet: user command and underlying TCP/IP protocol for accessing remote computers with permission. HTTP and FTP can be used to request files but not to logon. With Telnet, a user can log on like a regular user with privileges of the relevant application and data on that computer.

UBR: unspecified bit rate? For efficient, shared use of capacity.

VOD: Video on Demand

WLL: Wireless Local Loop

Figure 26:
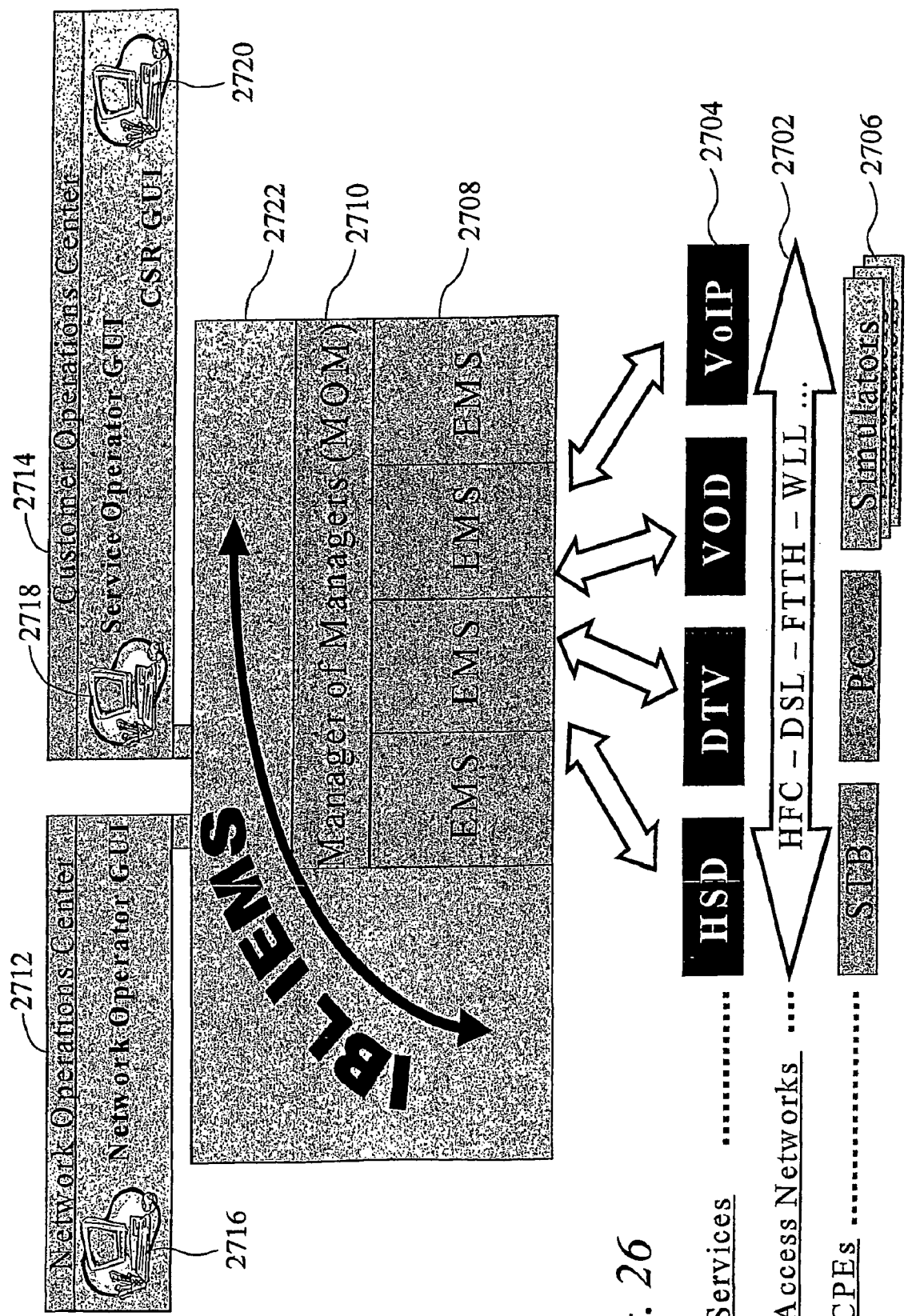
FIG. 26 shows a schematic view of where the network management system sits in relation to interfaces for use by users, including customers, service operators and network operators, and the services and network elements being managed.

Referring to FIG. 26, a cable network operator may use several different access networks 2702 to support multiple services 2704 for delivery to multiple types of Customer Premises Equipment (CPE) 2706. To do that, it is necessary to manage behaviour of the components of the network, particularly to monitor for alarms, and it is known to run an Element Management System (EMS) 2708 to do that, such as Hewlett Packard's OpenView or BMC Patrol. At this level, it is also known to run an intrusion detection system and a network performance monitoring system such as Multi Router Traffic Grapher, available under GNU public licence.

All the data output from the EMS is collected for processing by a Manager of Managers (MOM) 2710 such as Micromuse Netcool and aspects of the processed data may be made available to various users of the system who may be in the Network Operations Centre 2712 or the Customer Operations Centre 2714. There will usually be two types of user in the Customer Operations Centre 2714, a service operator and a customer service manager. Hence overall, aspects of the processed data may be required for presentation at three different Graphical User Interfaces (GUIs), a network operator GUI 2716, a service operator GUT 2718 and a customer services GUT 2720.

Importantly in embodiments of die present invention there is also an Intelligent Element Management System (IEMS) 2722 and it is this which provides a fully integrated management system which has powerful analysis capabilities across all levels of service provision to the end user, for use at three different levels, the network, the services and the customer interface. That is, the IEMS 2722 provides in a unique package the complete set of functionalities which are needed to manage a full network.

Figure 27:
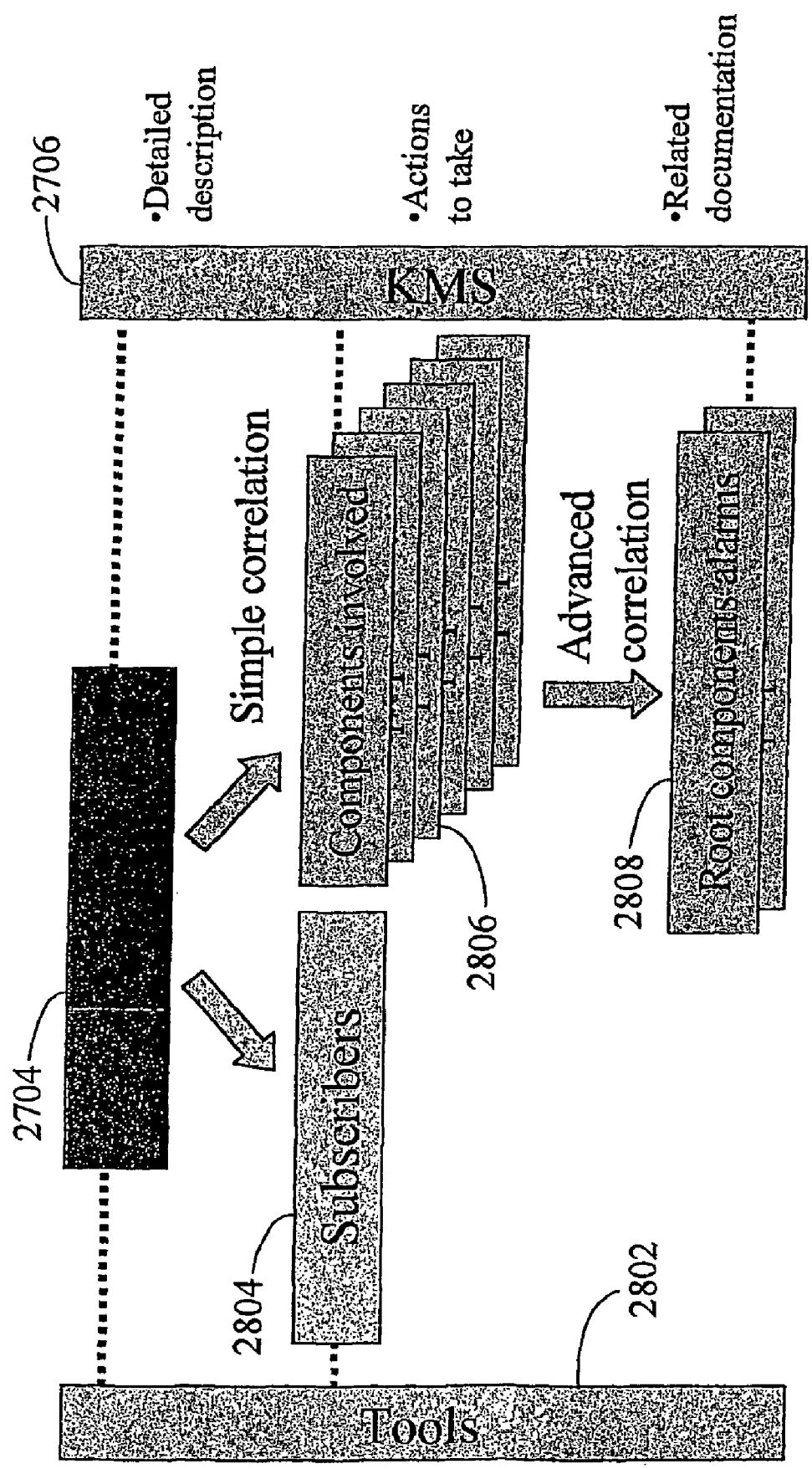
FIG. 27 shows a schematic view of the primary components of the network management system.

Referring to FIGS. 26 and 27, the IEMS 2722 provides the following aspects:

fault processing based on the services 2704 supported so that subscribed services can be kept up and running subscriber oriented information processing and provision, which is obviously important since subscriber satisfaction is always a major priority of the service provider all-in-one product supporting the complete set of functionalities which are needed to manage a full network an integrated and powerful knowledge management system 2706, which can be provided with a complete set of relevant content a multi-use/multi-purpose GUI, remotely accessible over low bandwidth links and offering relevant views for the Network Operator Console 2716, the Service Operator Console 2718 and the Customer Operator Console 2720 powerful correlation which can be used to analyse service failure to provide an impacted subscribers list and details, information on the network components involved in the failure and, due to a second level of correlation, to extract the root component alarm(s)

a complete set of tools 2802, adapted to user type and including service, customer and network related tools adaptation to multiple services 2704 and multiple access networks 2702

The example of an embodiment of the present invention described below is designed particularly to support high speed data services on a HFC network. For the cable operator, this means providing always-on connection with performance parameters to meet the contractual aspects signed with the subscriber. Because of the always-on connection, it is also particularly important to prevent fraud, such as a non-subscriber trying to get a free connection, and security violations such as hacking. It is intended in embodiments of the present invention to support the cable operator to do at least one and preferably all of the following in the event of a problem:

Identify the global impact on Service in terms of

Where (which segment, which hub, which regional head end, . . . )

Who are the subscribers impacted (list)

What is the detailed impact (no access, limited performance, . . . )

Identify the equipment(s) (hardware, software, link) which has generated the service problem (current or predicted)

Find and validate a solution to the problem

Log the problem for further analysis

Figure 28:
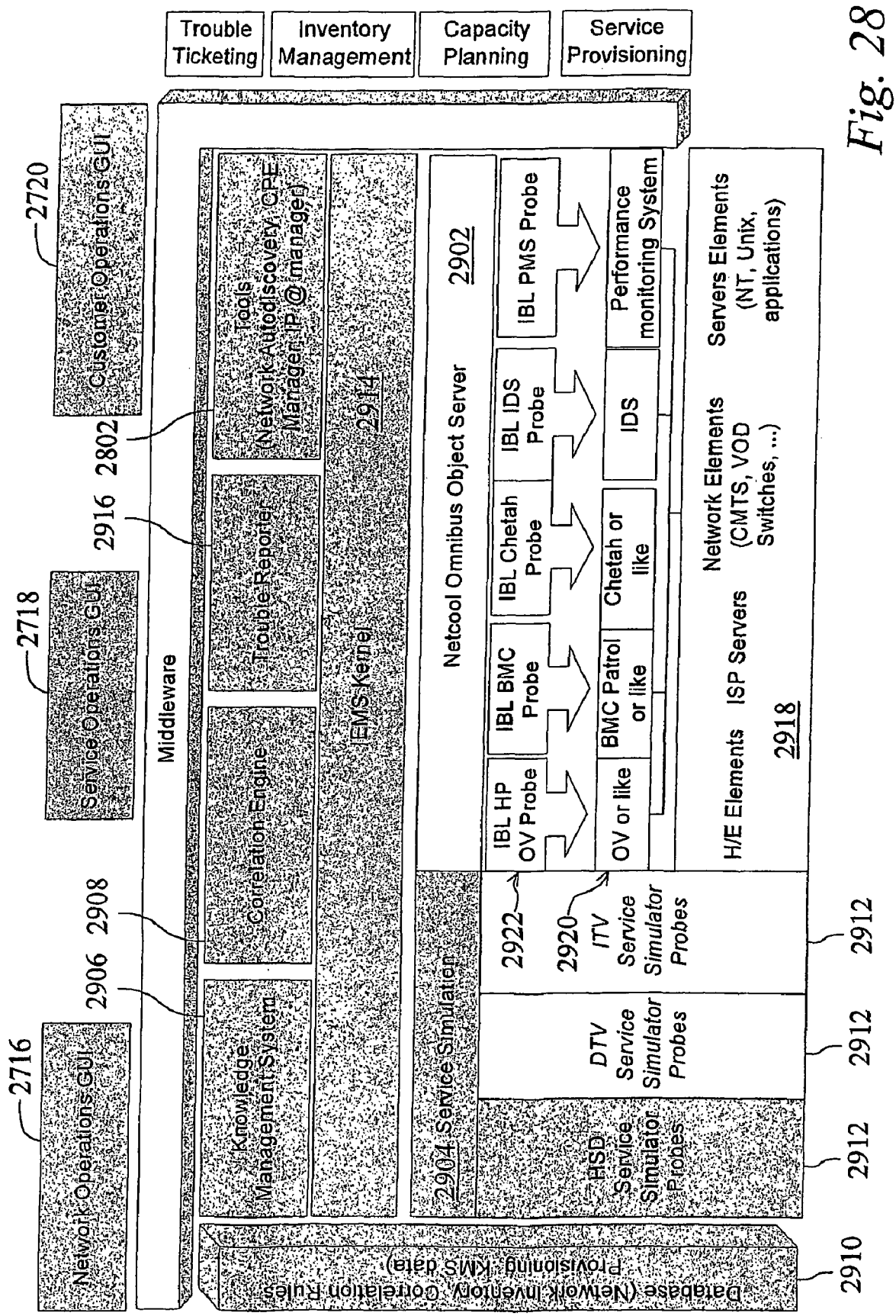
FIG. 28 shows a more detailed view of components of the network management system together with tools and other systems with which it interacts.

Referring to FIG. 28, the IEMS comprises inputs for network alarm data via a database 2902 and more service-specific monitoring data via service simulation data processing software 2904, a powerful knowledge management system 2906 for use in generating corrective solutions to problems and a correlation engine 2908 for analysing alarms to the root component level. Supporting these is a database 2910 holding for example the rules for the correlation engine 2908 and data supporting the knowledge management system 2906. The service simulation data processing software 2904, receiving service data via probes 2912 in response to service activity triggered by simulators embedded in the equipment being monitored is particularly powerful in that it can be used to test services proactively, and to validate corrective solutions, by simulating instances of services, as a user might trigger in normal use, and detecting service level responses via the probes 2912. Use of the simulators can also produce network alarm data in the same manner as normal use of the network and services.

The following description firstly describes a network environment for providing High Speed Data services to an end user, to put embodiments of the present invention into a working context, and then takes the above areas and describes them in more detail.

Network Environment as Working Context

Figure 42:
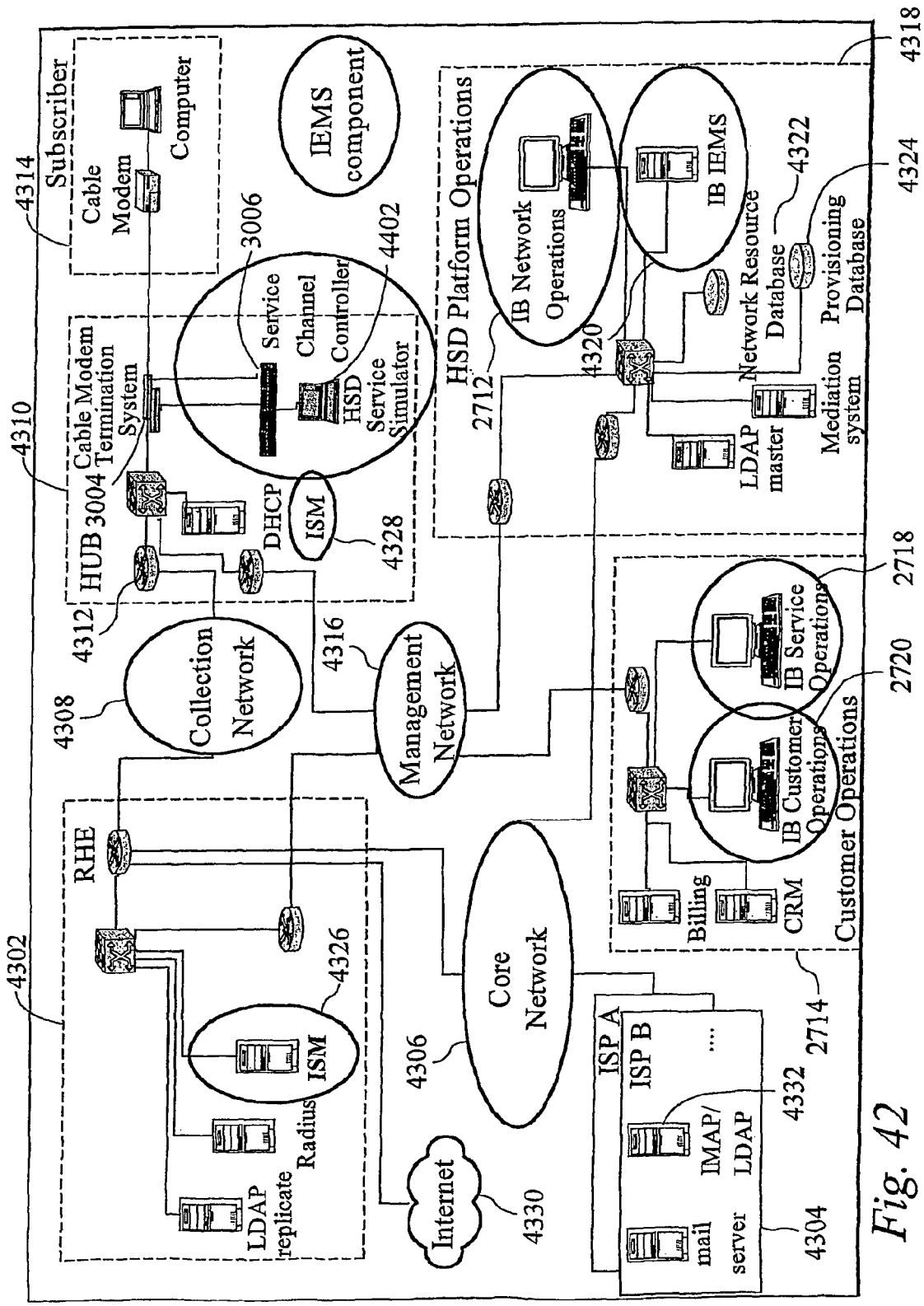
FIG. 42 shows a network context for the network management system in which a global infrastructure provider controls the end-to-end network.

Referring to FIG. 42, a typical regional network for providing broadband services will comprise a regional head end 4302 which receives services from Internet Service Provider equipment 4304 over a core network 4306. The regional head end 4302 transmits services in connection with identified locations in its regional network over a collection network 4308 to a plurality of hubs 4310. These hubs 4310 contain routing devices 4312 which route the services towards the end user equipment 4314.

A management network 4316 is provided for monitoring and controlling the network and service platform used to support service provision. The management network 4316 is used in particular to pick up alarms and event data in respect of the network and services and to transport it to an operations centre, in the case shown in FIG. 42 to the High Speed Data service and network operations centre 4318. In the operations centre 4318, it is input to an intelligent management system 4320 where it is processed in the light of network and service data, and in particular with reference to the knowledge management system 2906 and the correlation engine 2908. Once the alarm and event data has been processed, the results can be stored in a database of the management system 2902 and viewed via Graphical User Interfaces (GUIs) by users of different categories. In particular these GUIs will be dedicated to a network operator 2716, a service operator 2718 and a customer relations operator 2720.

The intelligent management system 4320 primarily comprises the software processes needed to process the incoming alarm and service data. It needs to call on data such as correlation rules for the correlation engine 2908, and data to support the knowledge management system 2706. This data can be stored on any accessible database, preferably local, and can conveniently be stored on the network resource database 4322 and/or the provisioning database 4324 of the operation centre 4318.

Network Alarm Data

Referring to FIG. 28, looking first at the collection and processing of network alarm data, the Netcool ObjectServer 2902 integrates and consolidates alarms coming from network equipment 2918 via a set of probes 2922. For each piece of network equipment 2918, including servers, the tools from the EMS layer 2708 will detect a range of alarms. For the purpose of the IEMS, particular data content of these alarms is appropriate. The probes 2922 are used here effectively as filters which select the types of alarms which are appropriate to the IEMS and input them to the Netcool ObjectServer 2902.

At least the following pieces of network equipment 2918 can be monitored:
  CMTS (MC16 card)
  Unspecified Bit Rate (UBR) Router
  Catalyst™ (Cisco router)
  NT Operating System
  Solaris Operating System
  DHCP servers (CNR)
  LDAP servers
  Oracle Database Server
  Back-end Provisioning Server The network monitors 2920 are of known type and may comprise for instance the following:
Hewlett-Packard OpenView: a set of products such as a Network Node Manager which provide event correlation, thresholding and alarming;
BMC Patrol: a set of products by BMC Software which include for instance a central point of control for applications, computers, LANs, WANs and communications devices;
Chetah: a network management tool for HFC networks
Intrusion Detection Systems: these are systems which run continuously on a network and produce alerts for system and network administrators of potential illegal access to the network or host;
SATAN and SAINT tools: a Security Administrator's Tool for Analysing Networks and the Security Administrator's Integrated Network Tool which improve the security of a network by trying to break into it, available under a GNU public licence;
Performance monitoring tools; these measure performance in terms of response times or loading. An example of a performance monitoring tool is the Multi-Router Traffic Grapher, available under a GNU public licence, which monitors traffic load on network links and generates HTML pages containing GIF images to give live representation.

Alarms detected by the tools 2920 are selected by the probes 2922 for input to the Netcool ObjectServer 2902. The particular alarm types may be in relation to the following:
  Availability (hardware or software)
  Servers (including operating system processes, application processes and the like)
  Network devices
  Security
  Some critical servers are security hardened so that some services such as Telnet for instance are not available, and alarms arise if security is not maintained
  Access Control Layer (ACL) violation
  Firewall down
  Performance
  Central processing Units (CPU)
  Random Access Memory (RAM)
  Bandwidth and traffic
  Cable Modem Terination System
  Fraud
  The MAC addresses of Customer Premises Equipment (CPE) for invalid (unsubscribed) users are identified. A "diff-file" between LDAP repository and SMS database is built, and an appropriate alarm is generated for invalid Mac-addresses
  Change configuration
  In network equipment
  In servers
  The network alarm data is stored for the IEMS in a database 2902 which does some processing of received alarm data. The database 2902 used in this embodiment is the Micromuse Netcool ObjectServer which maintains an overview of events and processes them to the extent that they can be grouped according to the services they potentially impact.

Service Monitoring Data

Figure 29:
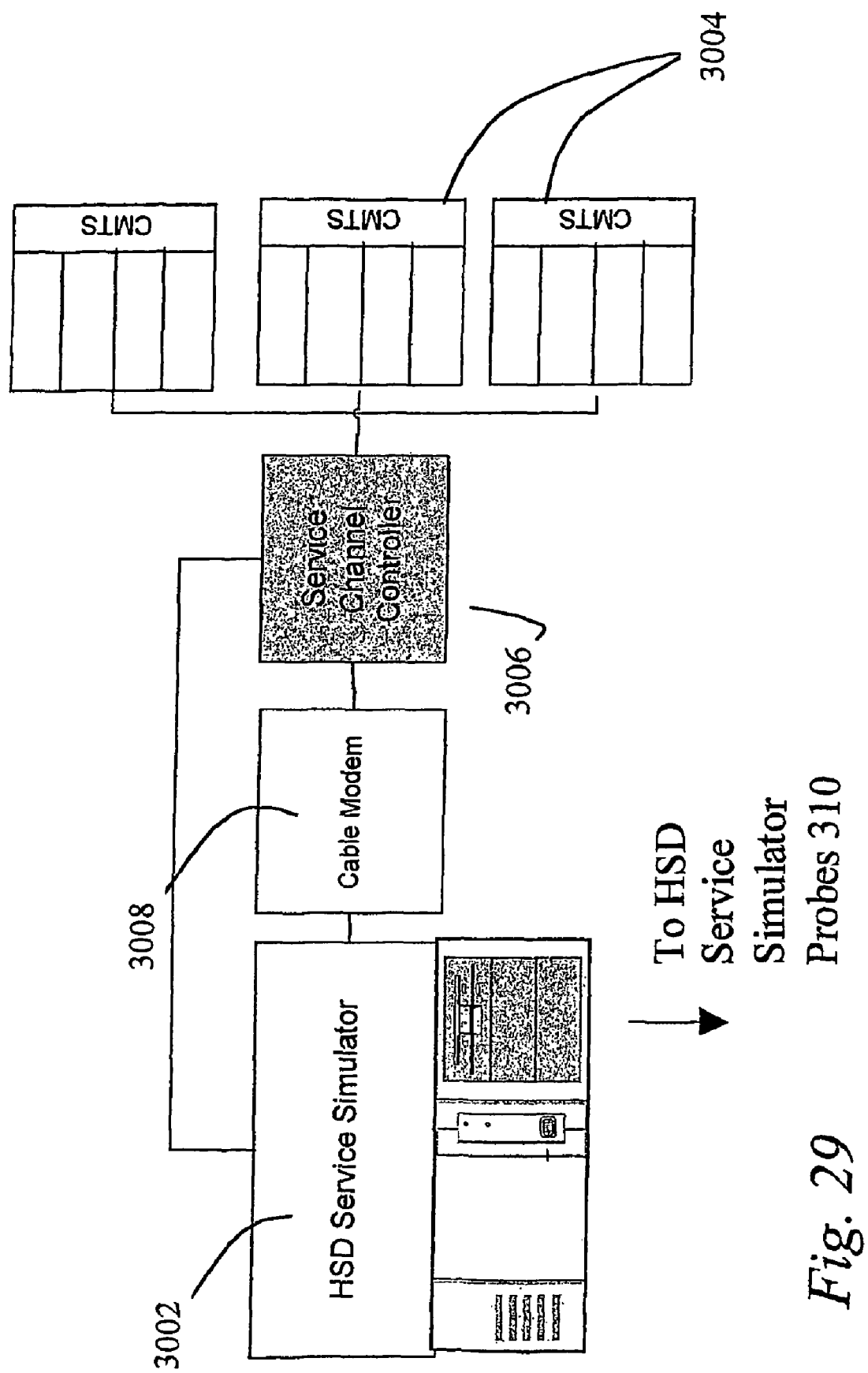
FIG. 29 shows a simulator for use in the network management system of FIG. 26 and its connection into a network to be tested.

Referring to FIGS. 28, 29 and 42, as well as the collection of network alarm data, service-specific data is collected for each service type. Importantly, service data is picked up by the service simulator probes 2912 in response to activity triggered by service simulators 3002, 4326, 4328 which are installed at relevant sites in a network environment. The data collected is then processed and stored by service simulation data processing software 2904 for the IEMS system.

To put the use of service simulators 3002, 4326, 4328 and monitors into context, the following describes the collection of data for a High Speed Data (HSD) service run over a regional network as shown in FIG. 42.

There are three types of simulator 3002, 4326, 4328 in the embodiment presently described, installed in different locations of the HSD network.

A first type of simulator 4326 is provided by the known Internet Service Monitor (ISM) produced by Micromuse Netcool, in the regional head end 4302 to monitor links for the ten most popular Web sites (to be defined in setup), the IMAP and LDAP based services, and POP3/SMTP e-mail services, and in the hub 4310 to monitor DHCP based services.

A second type of simulator 3002, the HSD service simulator, is installed using a personal computer (PC) in the hub 4310 to test the "last mile" on all segments of the hub 4310. This PC is connected on the cable side of a cable modem termination system 3004 in the manner of end user equipment. The PC is operated periodically to check a set of functionalities. The operations carried out by means of this PC include at least:

Reboot the PC and test provisioning access
Send an HTTP request to the provisioning server
Send HTTP requests to some popular Web servers to test access and response times
Attempt to use Telnet access to hardened servers A third type of simulator 4328 is used specifically to test Telnet responses. It will launch Telnet commands to different pieces of service equipment in order to test critical links. For instance, it will "ping" a DHCP server or a Web site from an unspecified bit rate connection. That is, it will issue an echo request. All Internet hosts are required to send echo replies in response to an echo request and this is a simple way of finding out if a host can be reached.

A powerful aspect of embodiments of the present invention is the link that can be made between alarms detected by the various probes 2922, 2912 and other information such as services and customers affected and root component alarms. The data content of the alarms collected by the probes 2922, 2912 is of course important in this. This data content can be used in conjunction with the knowledge management system 2906 to produce the necessary links.

IEMS Database
Component Alarm Information Database
Each alarm generated has the following attributes:
  IP Address
  Equipment/module/port
  Date/time of occurrence
  Location, in particular where physically in the network (NHE, RHE, HUB)
  Detailed description (in an "operator" comprehensive text)
  Severity
  Type of alarm (fault, performance, security, fraud, configuration change, . . . )
  Actions to Lake/recommendations to fix the problem, for instance this might be in the form of a direct link to the right page and the right alarm in the trouble-shooting guide or the right procedure
  Additional links to useful documentation
  Procedures, docs, troubleshooting guide, install ation guide, . . .
  Engineering documentation (technical architecture, detailed design)
  Operational procedures
  Configuration files
  Vendor's documents
  Link to vendor's Web site
  Status, such as new, deleted (TBC)

Service Alarm Information Database
  Each alarm generated has the following attributes:
  Type of service
  Internet Access
  Service Provisioning
  ISP Services (such as Email . . . )
  Security/fraud
  Performance
  Management (i.e. part of IEMS tool, like ISM, PC Simulator, . . . )
  Location
  Detailed description
  Alarm management
  New, acknowledge, update, close, delete, assign to (whom)
  When the status changes, store and display dale/time, name of the operator and comment KMS
KMS Tool
KMS tool is a Web-based application allowing operators to:
  Browse content
  Add/Modify/Update content (according to access profile)
  Search documents with a textual search engine
The KMS tool is accessible from all screens of IEMS, and also directly from a browser by typing the right URL.

KMS Content
  The content of KMS is as exhaustive as possible; this is one of the major values of the IMS product. The following lists the different sources of information available for all equipment of the HSD network:
  Installation procedure
  Configuration guide/files
  Troubleshooting guide
  Maintenance manual
  User manual
  Operations Manuals
  Engineering documents
  End To End Architecture
  FAQ
  Glossaries
  Contact lists
  Vendor's URL GUI
Functional Role As mentioned above, there are different categories of people who are going to use IEMS and who are therefore provided with GUIs, these being users responsible for network, service and customer operations. For each type of user, there are different levels of access defined, such as basic and advanced. For instance, a skilled operator's user should be able to create rules. Navigation within the different screens is designed to be intuitive, in order to minimize the technical skills needed by users.

Service Operations GUI 2718

Figure 30:
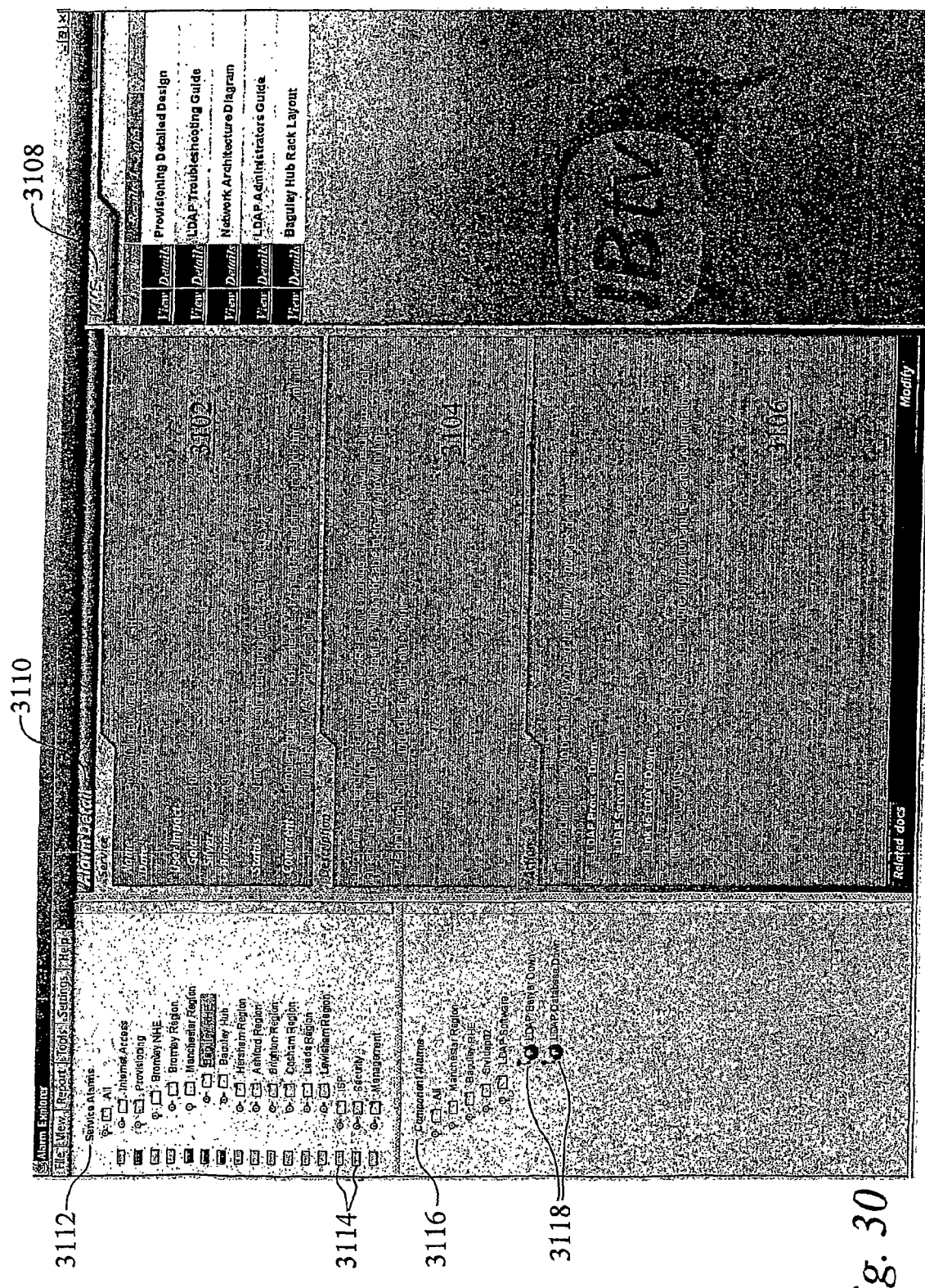
FIG. 30 shows a screen view from a graphical user interface reviewing an alarm by means of the network management system, with access available to a knowledge management system for further analysis.
Figure 31:
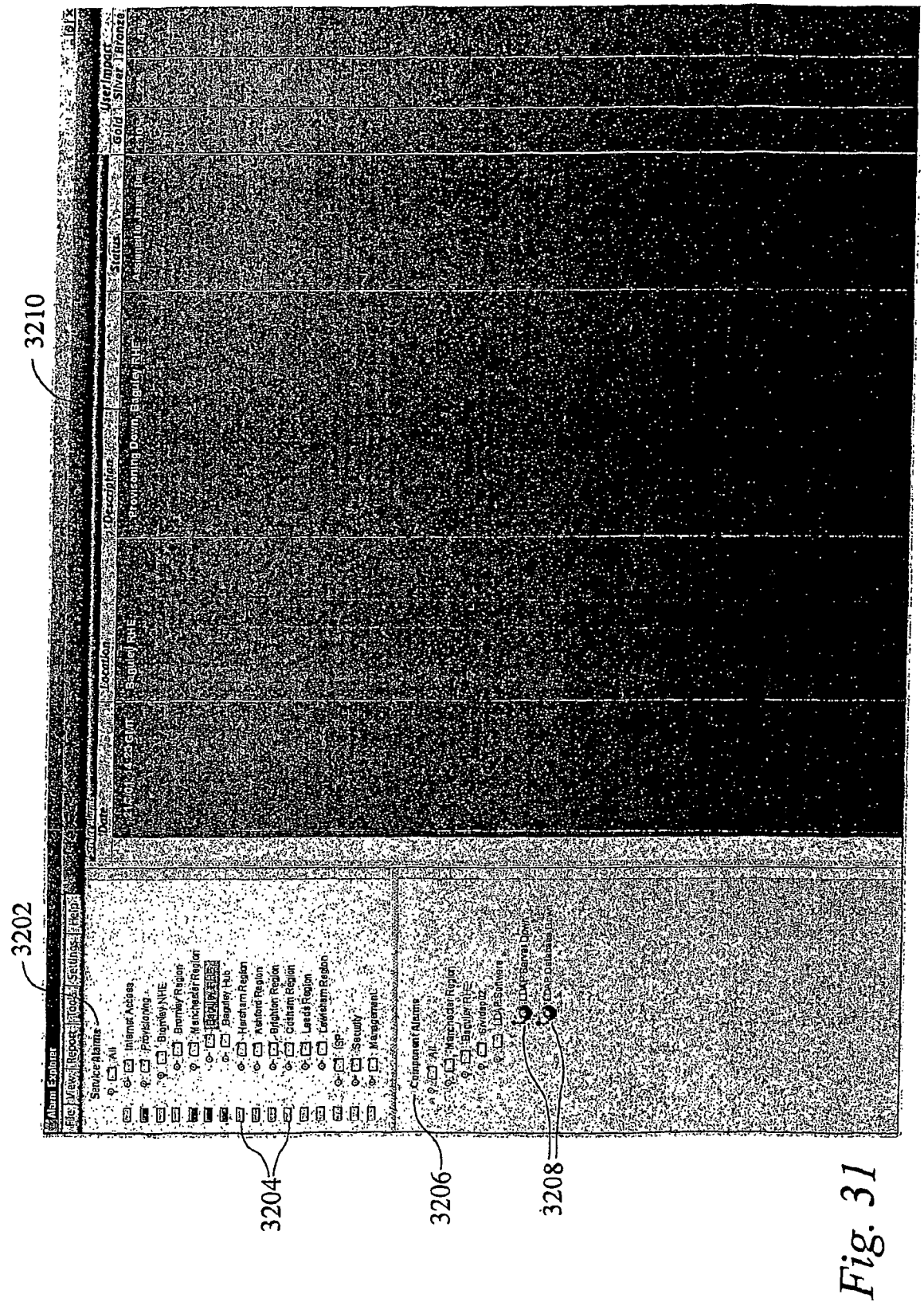
FIG. 31 shows a screen view from a graphical user interface reviewing an alarm in terms of user impact.

This GUI is fully Web-based and should be accessible through a low bandwidth link (typically 56 kbs). It shows:
Service status per service type/per location
Service outage list with % of users impacted/type of users impacted
Statistics of service outage per location/per type of service/per type of user
Planning (network bandwidth, IP Scope, System resources, . . . )
KMS: service related information
Information on location: postal address, manager's name/phone/email Customer Operations GUI Referring to FIGS. 30 and 31, the information that embodiments of the present invention can make available to a user in a customer operations centre 2714 clearly links problems arising at the network level with the impact on customers. Further, it links service alarms with component alarms in relation to the same part of the network. FIG. 30 shows a screen available to a service operator in the customer operations centre 2714 and FIG. 31 shows a screen available to a customer operator. FIG. 31 is simpler and has been taken first in the description below.

FIG. 31 shows a menu of potential service alarms 3202 together with indicators 3204 as to whether there is an alarm of that type ongoing. The potential service alarms 3202 include five categories of service alarm which are being monitored:

Internet access
Provisioning
ISP
Security
Management

An indicator 3204 for the provisioning service alarm is darkened, indicating a current provisioning service alarm. A user has clicked on the "Provisioning" box which has had the effect of drilling down to location information in respect of the ongoing alarm. The location information shows that there is a problem in the Manchester region of the Bromley NHE. Clicking on the Manchester region has opened up the Baguley regional head end and the Baguley hub locations as having problems in provisioning. The user has selected the Baguley regional head end in order to get further information.

Below the Service Alarms 3202 section of the screen, there is a Component Alarms section. This shows the user has drilled down to expose two component alarms 3208 relevant to the Baguley provisioning problem in the regional head end, and gives the diagnosis that the LDAP server and database are down.

The main portion 3210 of the screen is given to a "Service Alarms" screen showing management information in respect of the alarm in the Baguley regional head end for which the user has selected to drill down to the component alarms. This management information shows date, location, description, status and user impact. Importantly, the status data shows how the problem is being dealt with (it has been assigned to James Reid) and the user impact data shows what category of customer is hit by the problem. In this case 10% of gold customers, 22% of silver customers and 43% of bronze customers are affected.

Referring to FIG. 30, the service operator has access to much more detailed information by pulling in data using the KMS 2906. Here, the user has selected an "Alarm Detail" screen in place of the "Service Alarms" screen. This has three sections. Firstly, in a "Service" 3102 section of the screen, there is similar information to that shown to the customer operator on the "Service Alarms" screen described above, except that there is also now an estimated correction time of 25 minutes. Secondly, in a "Description" 3104 section of the screen, there is information about the impact and importance of the problem. In the example in FIG. 30, customers are unable to do any provisioning and the problem is said to be critical with immediate action required. Thirdly and importantly, in an "Action" 3106 section of the screen, the identified component alarms likely to be causing the problem are offered as links to a search engine for searching for information using the knowledge management system 2906 about these component alarms.

It can be seen from the right hand section 3108 of this screen, dedicated to the KMS 2906, that the search engine has already been launched in respect of the component alarms listed in the "Action" 3106 section of the screen to offer five sources of information relevant to correcting the problems, from the provisioning detailed design through to the Baguley Hub Rack layout. This is a powerful aspect of embodiments of the present invention in that targeted data from so many sources can be accessed.

This GUI is Web-based and therefore accessible through a low bandwidth link.

The primary types of information given which are accessible via the Customer Operations Centre 2714 are:
Service status per service type/per location
Service outage list with % of users impacted/type of users impacted
Statistics of service outage per location/per type of service/ per type of user
KMS with custom operations information, such as FAQ, etc.
CPE manager (see "Tools")
Network Operations GUI 2716

Figure 32:
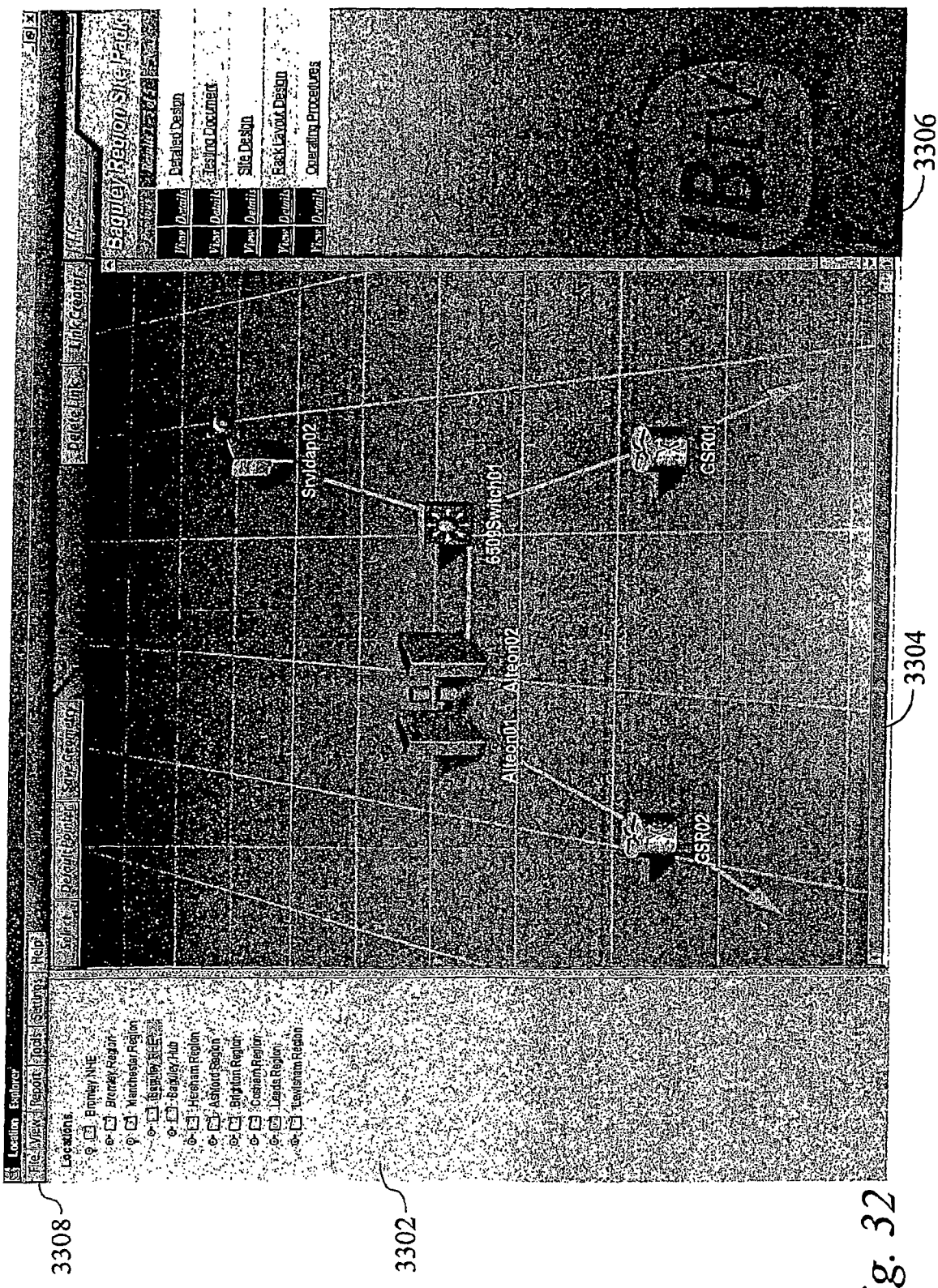
FIG. 32 shows a screen view from a graphical user interface reviewing an alarm with reference to its network location, with access available to the knowledge management system for further analysis.
Figure 33:
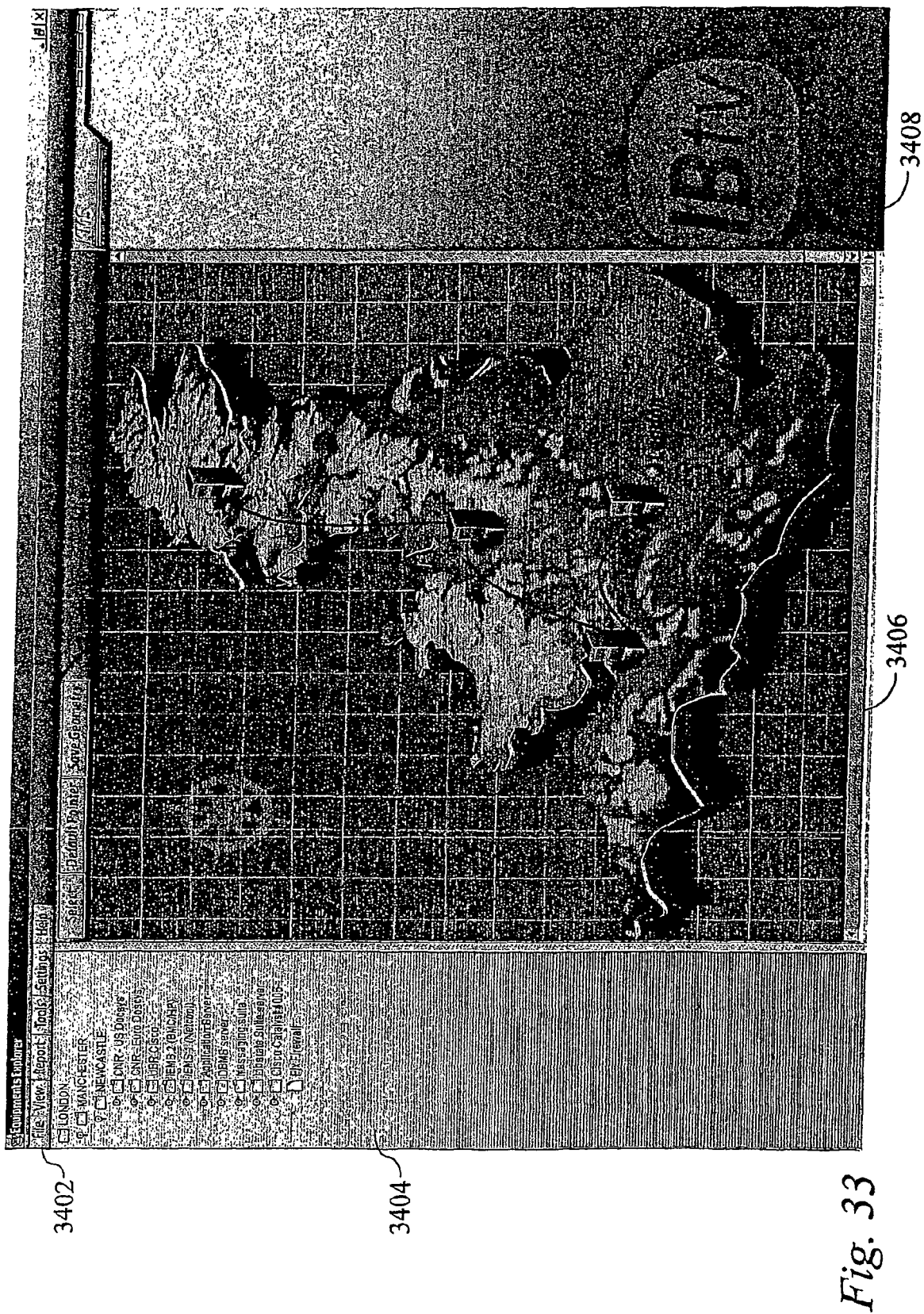
FIG. 33 shows a screen view from a graphical user interface providing equipment information, with access available to a knowledge management system for further analysis.
Figure 34:
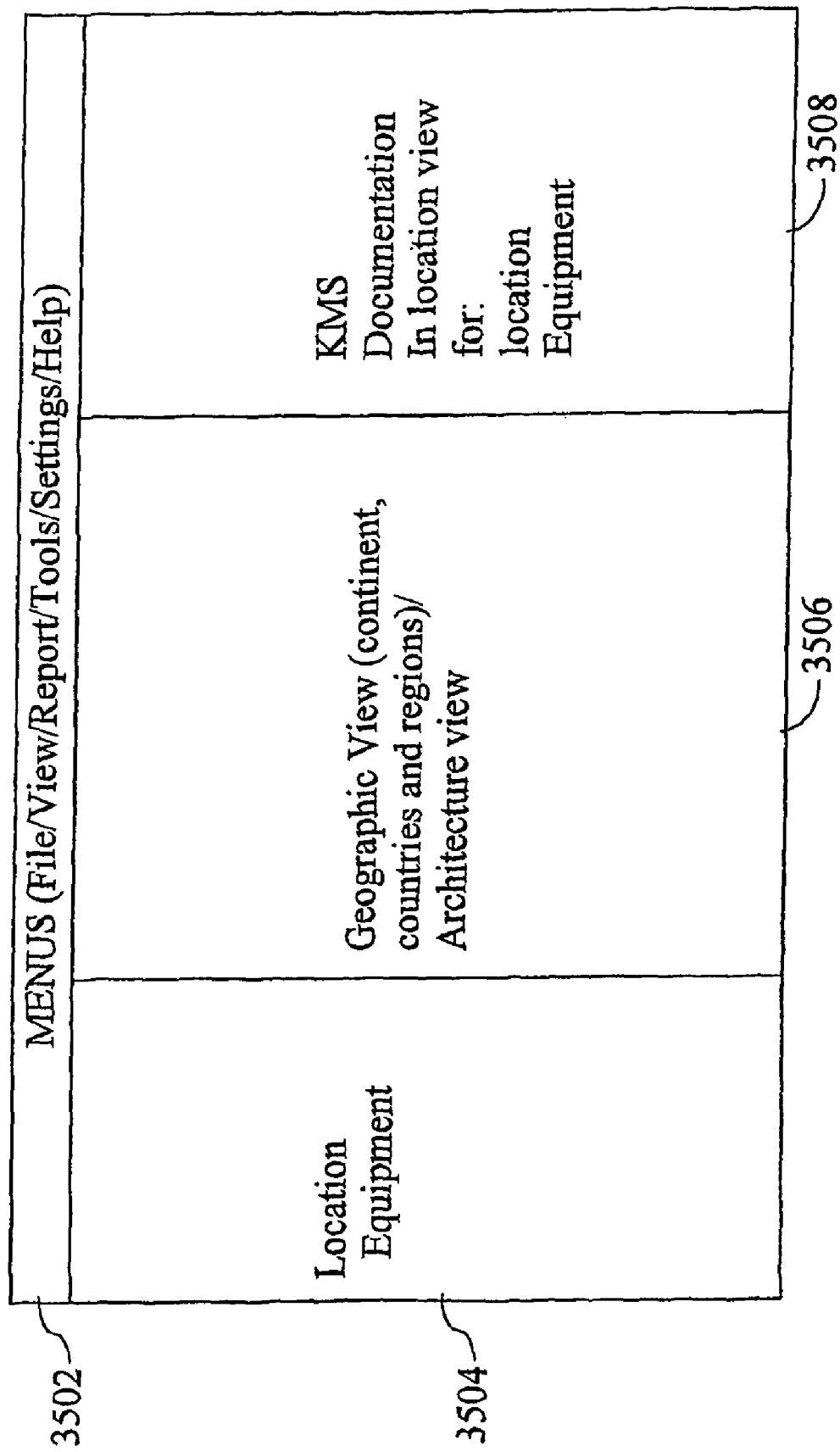
FIG. 34 shows the options available for a screen view layout as shown in FIG. 33.

Referring to FIGS. 32, 33 and 34, a network operator, usually working in the network operations centre 2712, has access to the full set of functionalities described above in relation to FIGS. 30 and 31 together with additional capabilities. These are accessible via the following:
Location explorer
Alarm explorer
Full KMS access (service and component related information)
Full set of tools
Rules editor This GUI 2716 is not necessarily fully Web-based.

FIGS. 32 and 33 show two screens in particular giving the network operator information on equipment at two different levels. FIG. 32 shows the Location Explorer screen for equipment located at the Baguley regional head end and FIG. 33 shows the Equipment Explorer screen for a route connecting London to Newcastle. FIG. 34 shows the overall layout of the Location and Equipment screens. This is that the user has a selectable list 3302 of Locations and/or Equipment to the left, a central view of the relevant geographic or architectural layout 3304 of network equipment and KMS access 3306 to the right. A way the user can interact with these views is via a set of pulldown menus 3308 at the top and further detail of these pulldown menus is as follows:
Menu detail:
File
  Login
  Logout
  Quit
View
  Alarm Explorer
  KMS (y/n)
  Location
  All
  Regional
  Report
  Summary
  By location
  By service
  By users
Tools
  Telnet
  MRTG
  KMS
  IP Address management
  IP provisioning query
  DHCP LOG BMC Patrol
HP OpenView
Settings
  KMS setup
  Inventory setup
  Correlation setup
  Graphics setup
  Select Mode
  Create Link Mode
  Save Geometry
Help
  About
  Location Explorer Help The Alarm Explorer screens available to service and customer operatoins in the Customer Operations Centre 2714 are described with reference to FIGS. 30 and 31 above. However, the Alarm Explorer screens available to the network operator in the Network Operations Centre 2712 and their associated navigation menus give access to different content.

Figure 35:
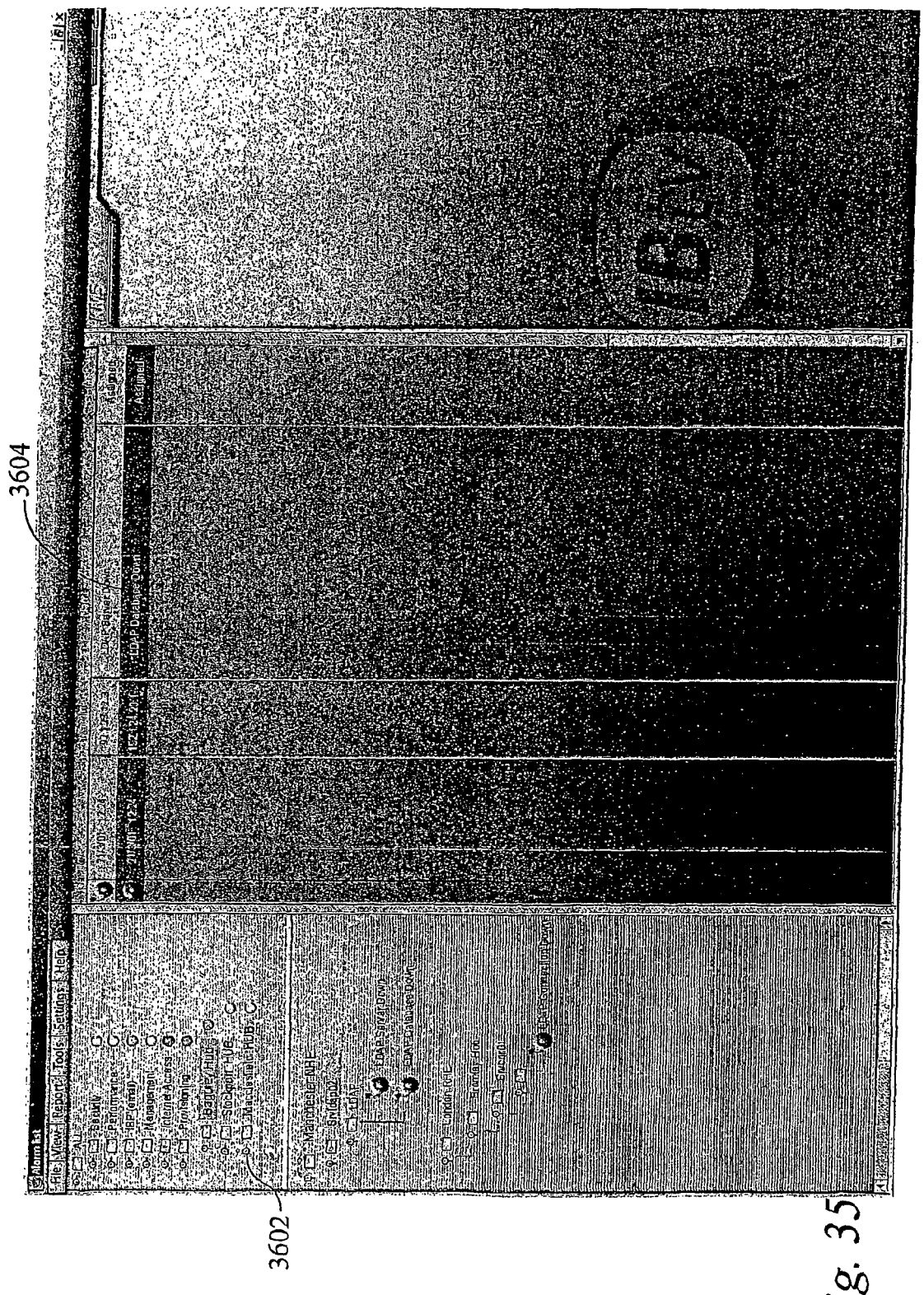
FIG. 35 shows a screen view from a graphical user interface providing an alarm list with access to the knowledge management system for further analysis of selected alarms.

FIG. 35 shows an alarm list for a user selection from a list of all alarm types 3602. The user has selected to get further information on ongoing alarms associated with the Baguley hub and status information 3604 is shown for two alarms affecting the hub, "LDAP server down" and "LDAP database down". The status information is that both of these have been assigned.

Figure 36:
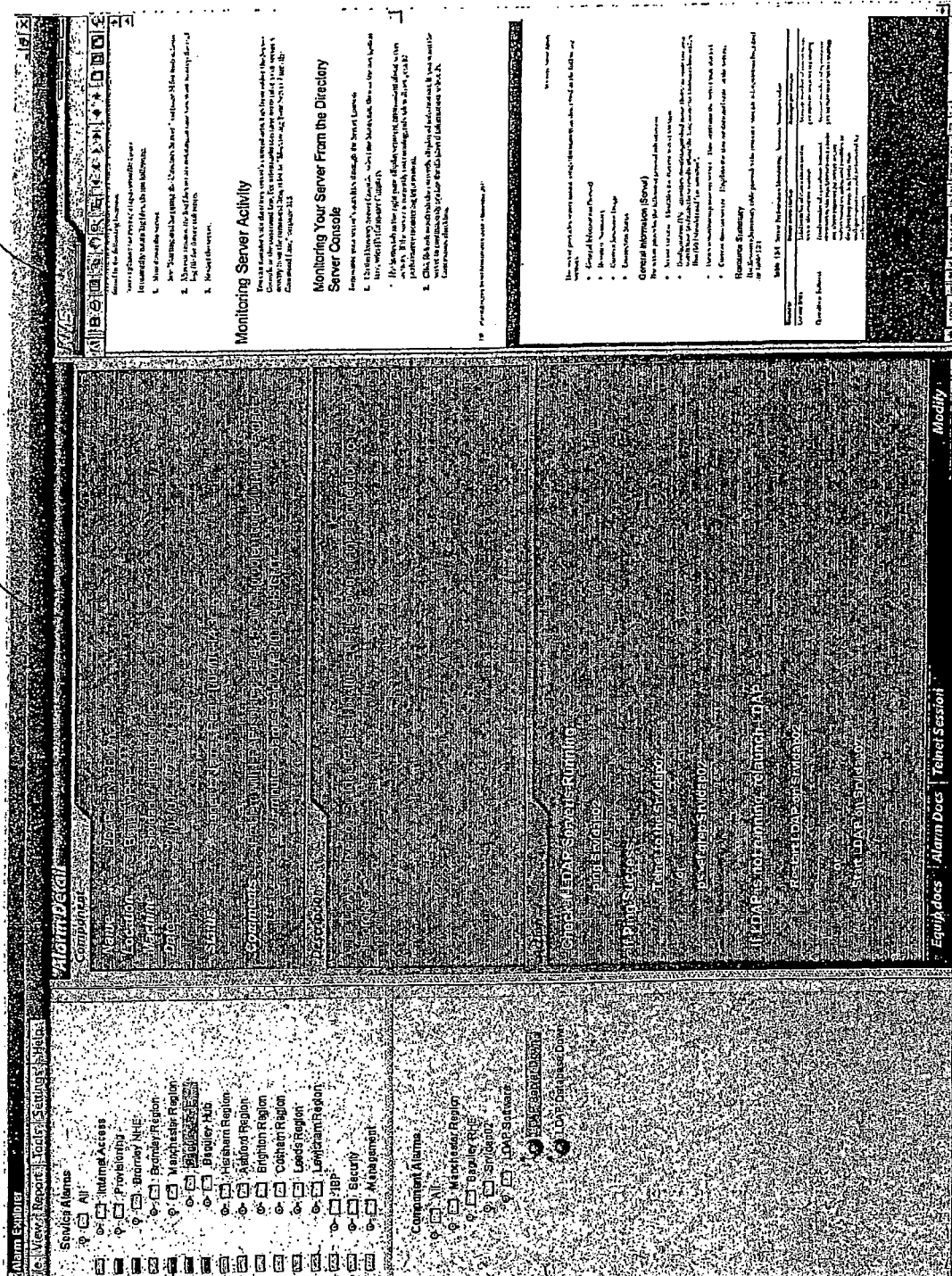
FIG. 36 shows a screen view similar to that of FIG. 30 in which the knowledge management system has been accessed for further relevant information.

FIG. 36 shows the Alarm Explorer screen for tracing component alarms 3702 relevant to ongoing service alarms 3704. In this case, the network operator has selected the Baguley regional head end and the service alarm associated with the Baguley regional head end is shown to be related-to the same two component alarms as the Baguley hub, "LDAP server down" and "IDAP database down". The network operator has selected one of these, "LDAP server down", for Alarm Detail. In a manner equivalent to the Alarm Explorer capability for the service operator, shown in FIG. 30, the Alarm Detail section 3706 has brought up comments on the component involved, a description of the problem and action to take. A search has been run using the KMS 2906 to bring up related documentation in the KMS portion 3708 of the screen.

Figure 37:
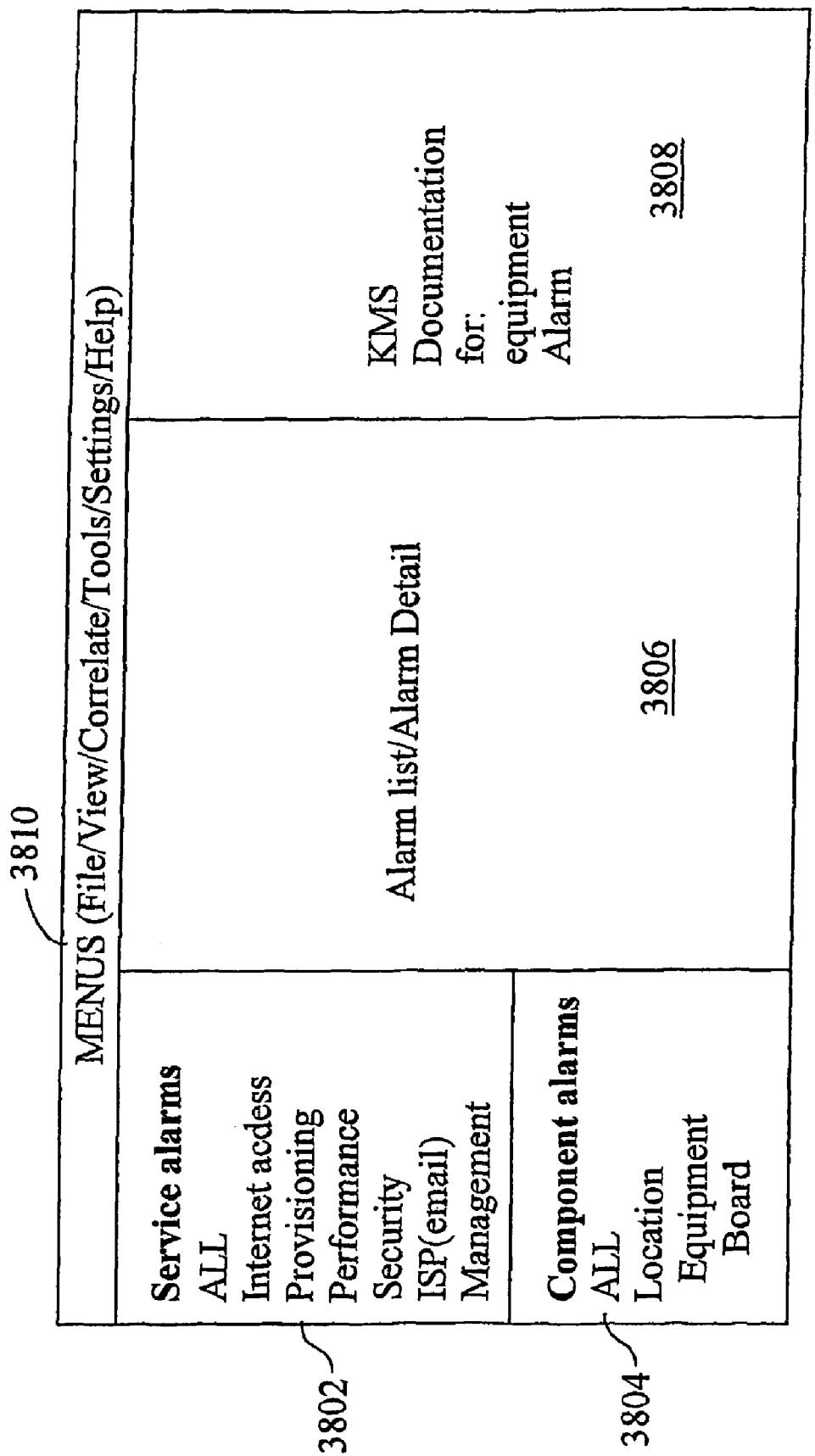
FIG. 37 shows the options available for a screen view layout as shown in FIG. 36.
Figure 38:
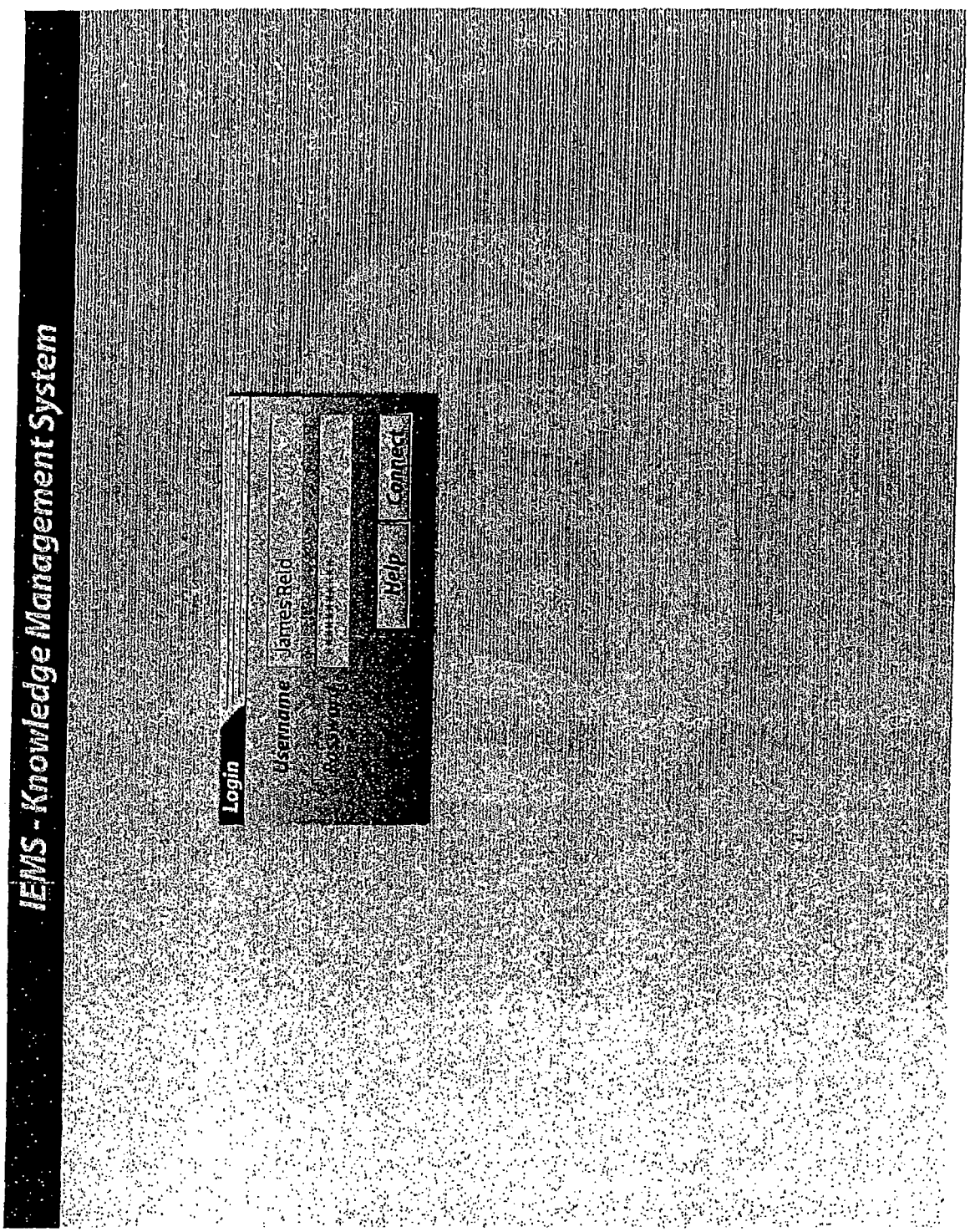
FIG. 38 shows a login screen for a user accessing the knowledge management system.
Figure 41:
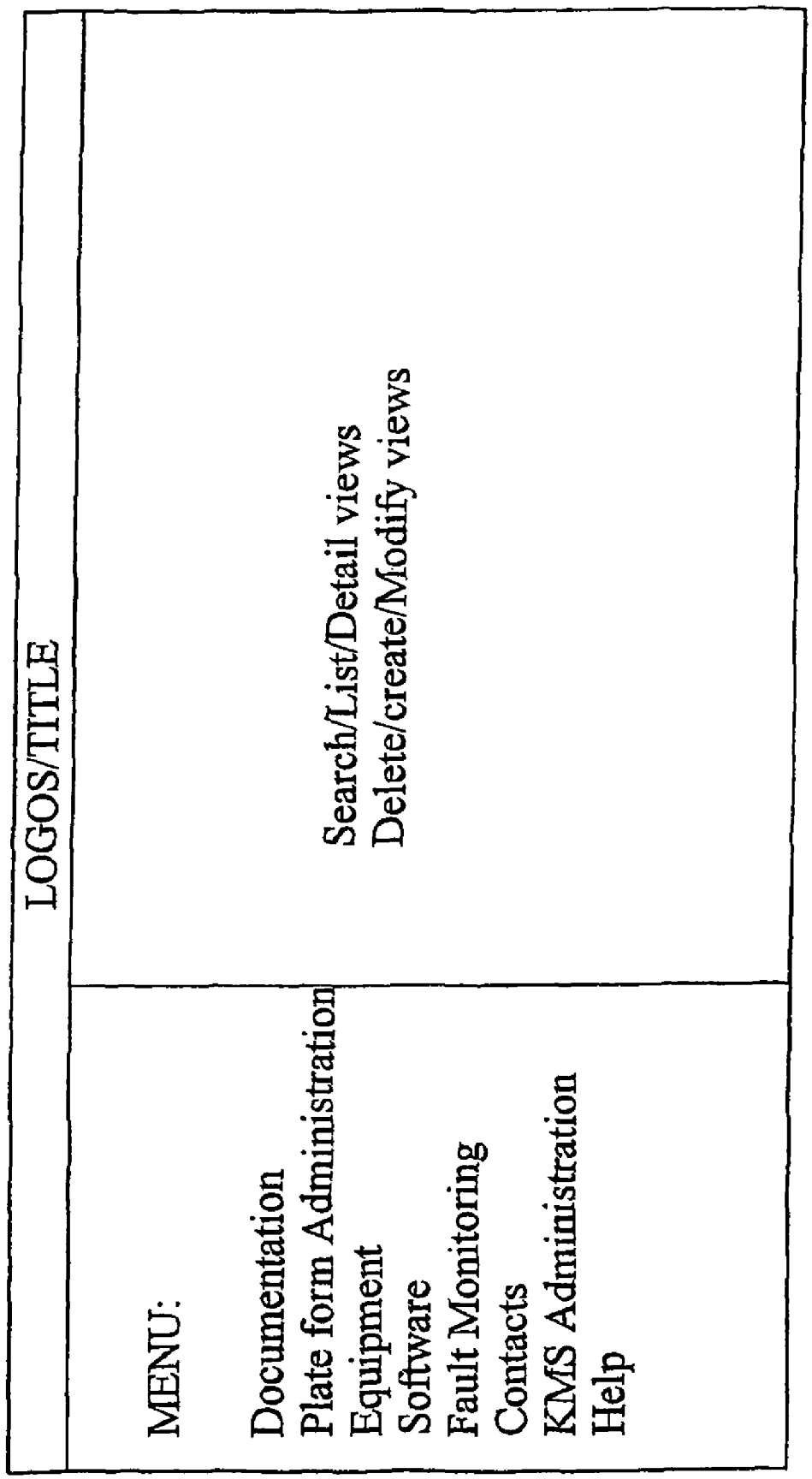
FIG. 41 shows the options available for a screen view layout as shown in FIG. 39 or 40.

FIG. 37 shows the overall layout of the Alarm screens of FIGS. 35 and 36. This is that the user has a selectable list of Service Alarms 3802 and a selectable list of Component Alarms 3804 to the left, a central view of the relevant Alarm List or Alarm Detail 3806 and KMS access 3808 to the right. A way the user can interact with these views is again via a set of pulldown menus 3810 at the top and further detail of these pulldown menus is as follows:

Menu detail:
File
  Login
  Logout
  Quit
View
  Location Explorer
  KMS (y/n)
  Sort alarm list
  By nb user impacted
  By service impacted
  By location
Correlate
  Find root alarms
Tools
  Telnet
  MRTG
  KMS
  Re-segmentation
  IP Address management
  IP provisioning query
  DHCP LOG
  BMC Patrol
  HP OpenView
Settings
  KMS setup
  Inventory setup
  Correlation setup
  Others
Help
  About
  Alarm Explorer Help In the above, correlation and sorting mechanisms are mentioned. These are both further discussed below.

It is possible for a user to run the KMS 2906 directly to locate information in the documentation available to the KMS. FIGS. 38 to 41 show example screens and the content of the navigation menus in this respect.

Menu detail:
Documentation
  Vendor manual
  Engineering documents
  Platform Administration
  Procedures
  Configuration files
  Equipment
  Inventory
  Equipment types
  Links
  Software
  Inventory
  Software types
  Links
Fault Monitoring
  Component alarm classes
  Service alarm classes
  Services
  Impact
  Contacts
  People
  Sites
  Companies
KMS Administration
  Users administration
  Other tables
  SQL requests
HELP
  About
  KMS Help Correlation and Sorting From the Alarm Explorer screen, and referring back to FIG. 28, a user can launch a correlation engine 2908 by choosing an appropriate menu. The goals of correlation in embodiments of the present invention are (depending on the user) to link a service alarm or a location either to impacted subscribers or to associated components. Linking to impacted subscribers can be used to give a measure of the importance of the problem and linking it to associated components can be used to put the problem right. The identification of impacted subscribers might be done in more than one way. Three examples are to:

select all subscribers associated with a location by reviewing a list of customer premises equipment MAC addresses mapped to the location
  select some of the above subscribers according to a further selection criterion run an IP address management application which provides details on subscribers impacted The identification of associated components might also be done in more than one way. Two examples are to:
    generate a full list
    use correlation rules to find and display only root component alarms Once the impacted subscribers and the associated components have been identified, it is possible to sort them in various ways. For instance, the type of service affected can be sorted against location, against the number of subscribers impacted or against the type of subscribers impacted. For instance the types of subscribers might be coded as VIP, gold and the like.

Defining Rules

The rules for reporting are preferably stored in a database and preferably viewable and modifiable by means of a graphical user interface. A conventional expert system may be employed to manage and update the rules. Some rules may be general rules and others may be tailored to a particular environment.

Trouble Reporter

Referring again to FIG. 28, another Web-based application which can be provided in embodiments of the present invention, and will be accessible to users via the network operations GUI 2716 and the service operations GUI 2718, is a trouble reporter 2916. This can provide service-related statistics for use for example in managing service level agreements. Useful data in this respect can be accumulated by day, week or month on the following:
    service impacted
    number of alarms
    localisation
    severity
    subscribers impacted in terms of number and/or type
    start/end date/time Other statistics which might be desirable via the trouble reporter 2916 are the identification of recurring failures, mean time to repair, percentage availability and the like.

A series of tools 2802 may be supplied in embodiments of the present invention which can be run separately by means of the GUIs but which might also support the main functions concerned with alarm and service analysis. These tools can provide a very rounded and flexible approach to service management in a complex network environment.

A first of these tools 2802 for instance might be an IP address management tool which allows a number of address aspects to be reviewed as follows:
    Checking an IP address by selecting a subscriber's IP address and then—
        the MAC address of the subscriber's device
        MAC address and IP address of associated cable modem (if MAC address is different)
        Associated DHCP server IP address
        Associated CMTS IP address
        Associated LDAP IP address
        Subscriber's details (i.e., name, address, credit status . . . )
        List of services used (HSD Gold, . . . )
    Checking an IP address by selecting an infrastructure IP address and then—
        Equipment name
        Equipment location
        List of software running on it (if appropriate)
        (Optional) Details of software (e.g., login, password, . . . )
        (Optional) List of related equipments (if appropriate—e.g., CMTS-uBR)
Additionally, this tool can be used to return statistics on the utilisation of IP address scopes on a DHCP server basis. For each server the application returns the list of managed scopes. For each scope the application returns:
    Scope name
    Scope range
    Private/public
    Scope utilisation
    Associated DHCP server IP address
    Associated CMTS IP address
    Time of last update (i.e., the last time the statistics were gathered)

Lastly, this tool can be used to display a list of equipment, in terms of name, type and IP address, sorted by location.

Another of the tools 2802 might be used to launch a Telnet session with specified equipment.

A DHCP server tool can be arranged to parse the DHCP log file from CNR servers in order to extract useful information such as failure of a cable modem provisioning process, and/or to automate a progressive re-provisioning process in case of outage of a complete part of the network in order to avoid flooding the DHCP servers.

A CPE manager tool can be dedicated to address a specific subscriber or end-user request:
    Find out the status of a cable modem, from an IP address or a subscriber ID (in relation with the IP Provisioning Database)
    Check status of the associated HSD Service Simulator (same HUB/same segment as the subscriber), and compare it to the subscriber's problem
    Associate subscriber with a current service outage
    Reboot subscriber's cable modem, change/update service class (gold/Silver/Bronze), IP filters
    Monitor performance A maintenance forecast tool can be dedicated to send messages/postal mails/ . . . to customers when a forecasted maintenance operation will have an impact on a specific service impacting them.

A resegmentation tool can process performance warnings (e.g. available bandwidth in a CMTS card) to propose resegmentation options.

Figure 43:
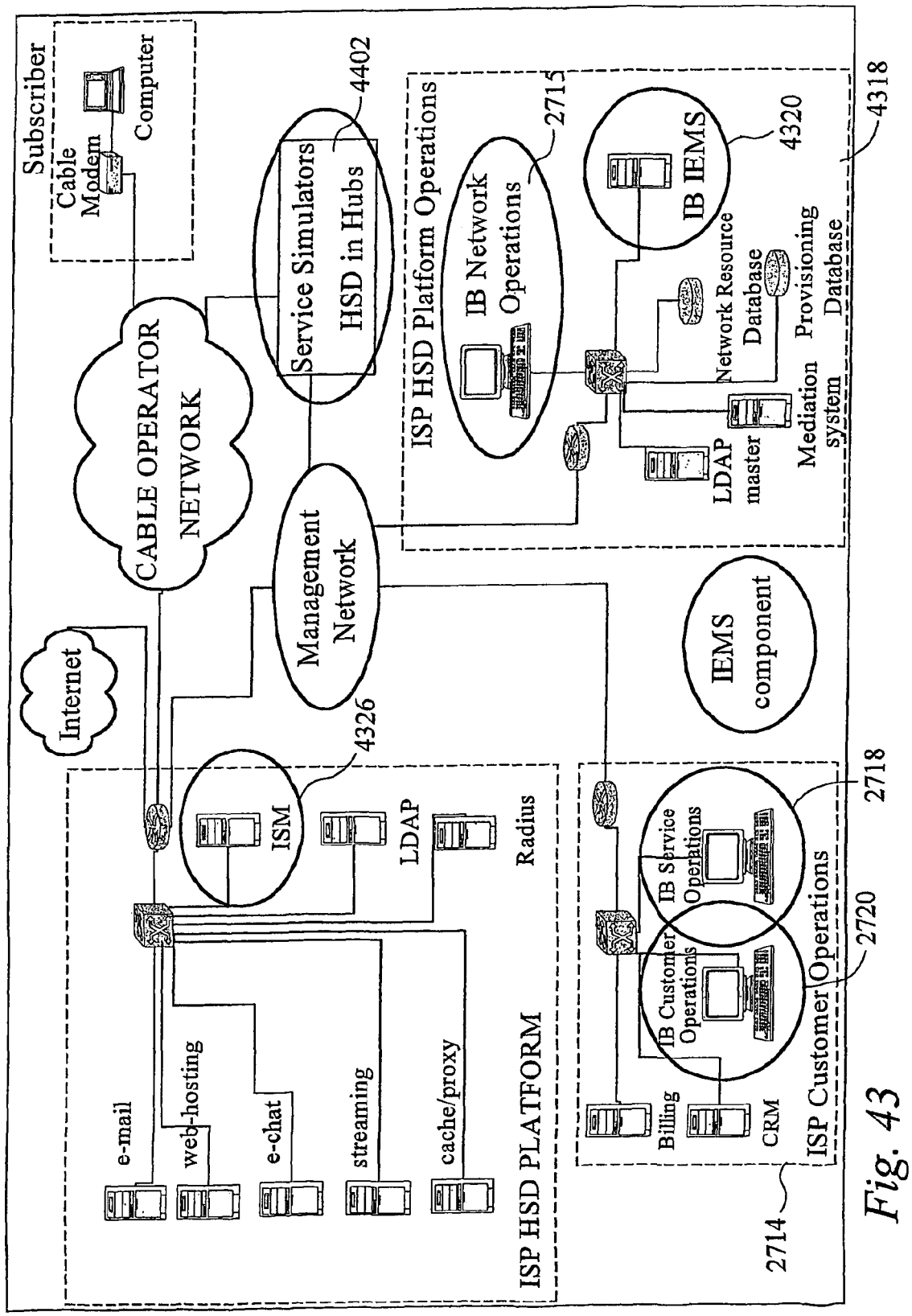
FIG. 43 shows a network context for the network management system in which a service provider uses the network management system to control the service provider's part of the network.

In FIG. 42 described above, an embodiment of the present invention is shown for the environment in which a global infrastructure provider controls the end to end network, up to the Internet Service Provider's platform. In FIG. 43, the equivalent arrangement is shown where the service provider uses an embodiment of the present invention to control the ISP part of network, but is also able to use the HSD simulator 4402 installed within the hubs of the infrastructure provider.

In summary, the communications network management system is herein disclosed which can assist identification and rectification of faults on a network, particularly a broadband access network, leading to more effective service provision.

Further Details of a Knowledge Management System

As discussed above, the CNMS may be implemented in conjunction with a Knowledge Management System (KMS). Further details of one embodiment of a KMS which may be implemented in conjunction with the methods and systems described herein, or as an independent entity, are outlined below. This embodiment is described by way of example only and is not intended to be limiting in any way.

The KMS tool may be implemented as a web-based application that allows you to instantly access a variety of documents pertaining to your network equipment and to retrieve context sensitive help relating to component and service alarms.

Figure 47:
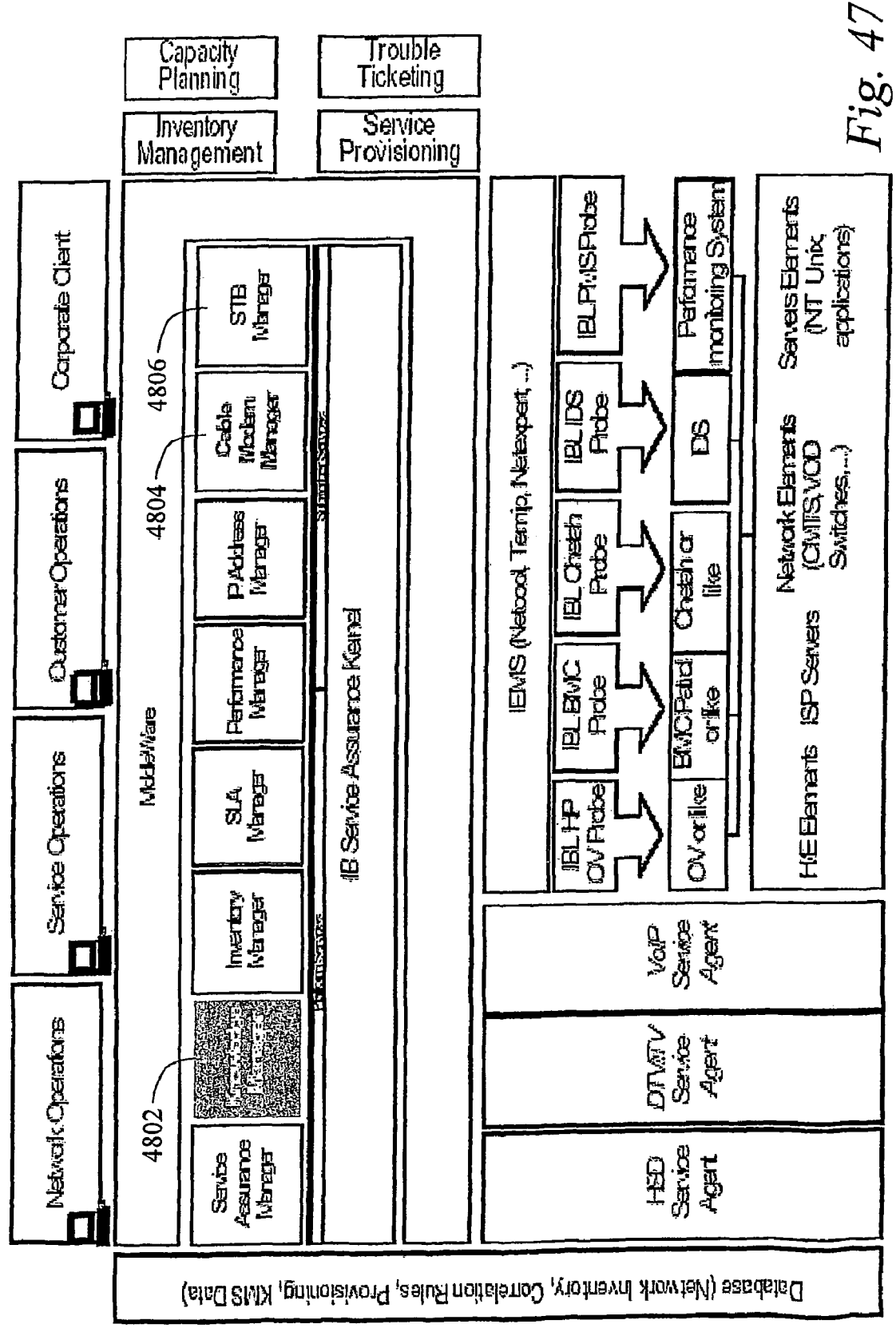
FIG. 47 illustrates a Knowledge Management System integrated with Imagine Service Emulation Agent modules according to one embodiment of the systems and methods described herein.

The Knowledge Management System 4802 can be integrated with Imagine Service Emulation Agent (ISEA) modules, such as the Cable Modem Manager 4804 and Set Top Box Manager 4806, embodiments of which are described in more detail below, in a distributed system to simulate a subscriber access to Internet Service as shown in FIG. 47.

The following are non-limiting examples of functions and associated method steps which may be performed using a KMS application:

The Knowledge Management System may display a list of documents based on user input. This may be implemented as described below:

After selecting the type of document from the available options, for example vendor manual, engineering documents or procedures, a Document Selection display mode allows a user input corresponding to that type of document. Search criteria to apply can be chosen by selecting items from list boxes. If it is not desired to specify a particular type of equipment, type of software, or company name, then "All" can be chosen from the menu. This choice indicates that no specific selection has been made and provides a view of all documents corresponding to the remaining search criteria for all available types of equipment, software and company names. If the exact reference for the document required is not known, it is possible to look for information according to subject. The following common information fields may be used:

Title
Author
Description
Equipment Type
Software Type
Company

The KMS screen may display a list of candidate documents from which a user can select.

The Knowledge Management System may also display detailed information for a selected document. Detailed information about all the documents found that correspond to inputted search criteria may be displayed. Each document may be viewed in turn. Details may include the author of the document, a description of the document, file format, version, and the document URL The Knowledge Management System further allows the management of documents according to user rights. User rights may be used to define what actions a user will be able to take within the KMS tool. Possible actions include:

Adding a new document.
Updating the detailed information for a document
Deleting a document.

The KMS may further allow the contents of a document to be viewed. It may be possible to view the contents of a document from the Document Details display mode by clicking on the document URL.

Figure 48:
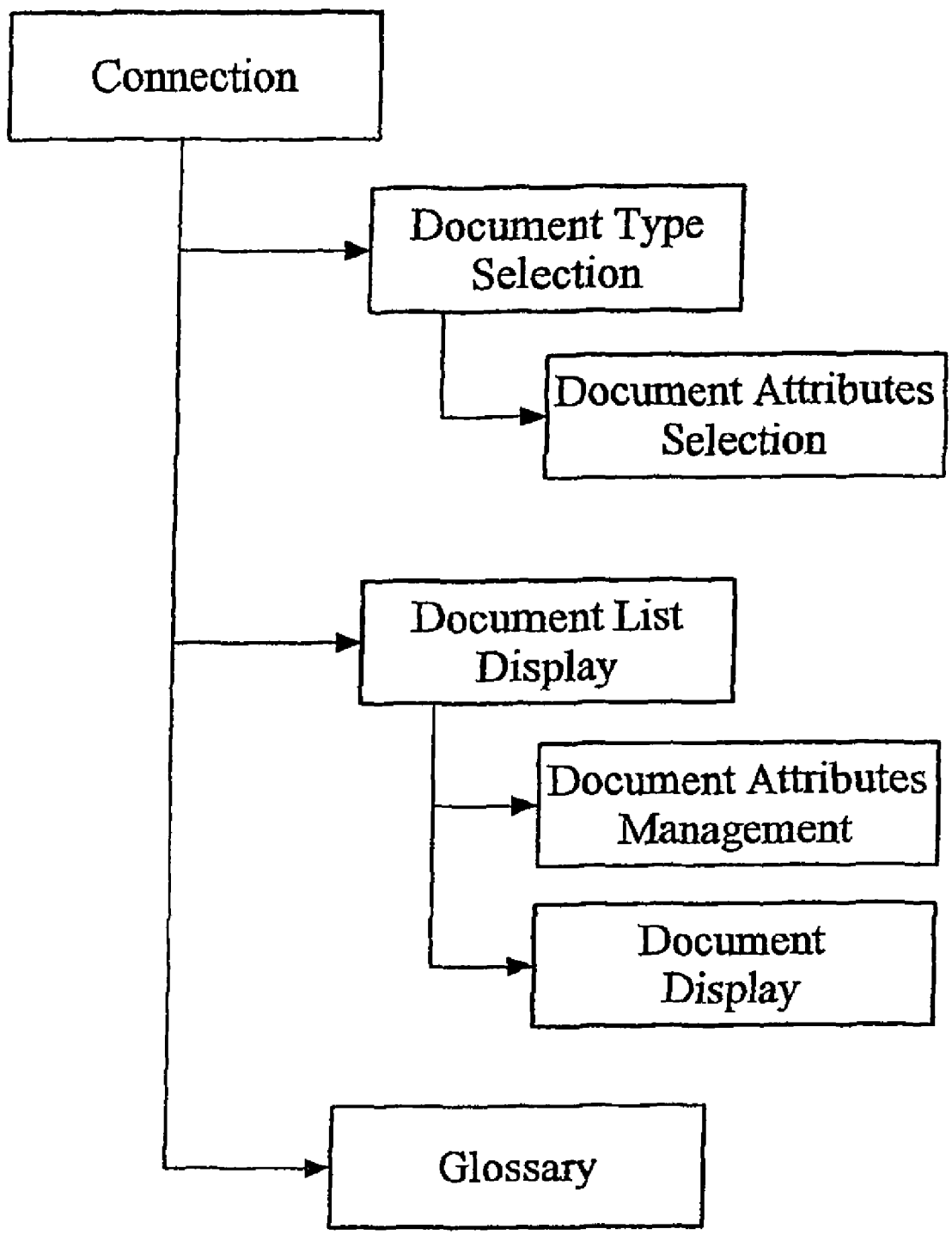
FIG. 48 illustrates a graphical User Interface structure for a preferred Knowledge Management System according to one embodiment of the systems and methods described herein.

The KMS may be operated via a Graphical User Interface architecture as shown in FIG. 48.

An Imagine Service Emulation Agent (ISEA)

The principles and methods described herein may be implemented in conjunction with a Imagine Service Emulation Agent (ISEA). An ISEA for a High Speed Data (HSD) service system may be implemented as a standalone system and may be dedicated to monitor end-user High Speed Data Services, enabling remote diagnosis and reducing lead-time for problem resolution. This application is described by way of example only and is not intended to be limiting in any way.

According to the present embodiment, the ISEA is located on the "last-mile" access network (typically one agent per HUB). Features provided may include some or all of the following:

Sophisticated, permanently-running scenarios to simulate extensive HSD end user activity:
Provisioning process
Internet access
ISP access
Security checks
Configuration of scenarios through scripting language (e.g. XML).
Logging of service outages to local files.
Integrated Web Server for Service Alarms Monitoring.
Specific check on request (Dynamic Check), to provide help on failure diagnostics.
SNMP interface to an external SNMP manager (for example, HP OV, or Spectrum)
Reporting of Service Alarms to Service Manager, part of Service Assurance Product Suite.

The emulation of services may be used to test the provisioning and quality of a number of services offered over the Communications network. Emulated services may include some or all of those listed below:

Emulation of the provisioning process may allow a number of the following features to be assessed:
Response time to get a new IP Address
DHCP renew
Alarm on timeout
Emulation of Internet access may test:
Response time to access some (e.g. 20) popular web sites
Alarm on timeout
ISP Access (E-mail, Chat, News, etc.) simulation may also be provided to test:
Simulation of Mail Send and Receive
POP/SMTP protocols
Chat/news simulation (IRC or equivalent protocols)
Response time
Alarm on timeout
Security Check
Simulation of hacker attacks may be used to test security holes, for instance:
Ping on secured servers
Open UDP/TCP sockets on secured server ports
Alarm if successful The ISEA may perform permanent monitoring and/or may implement dynamic checks on request, for example by activation through an integrated web-server.

Figure 55:
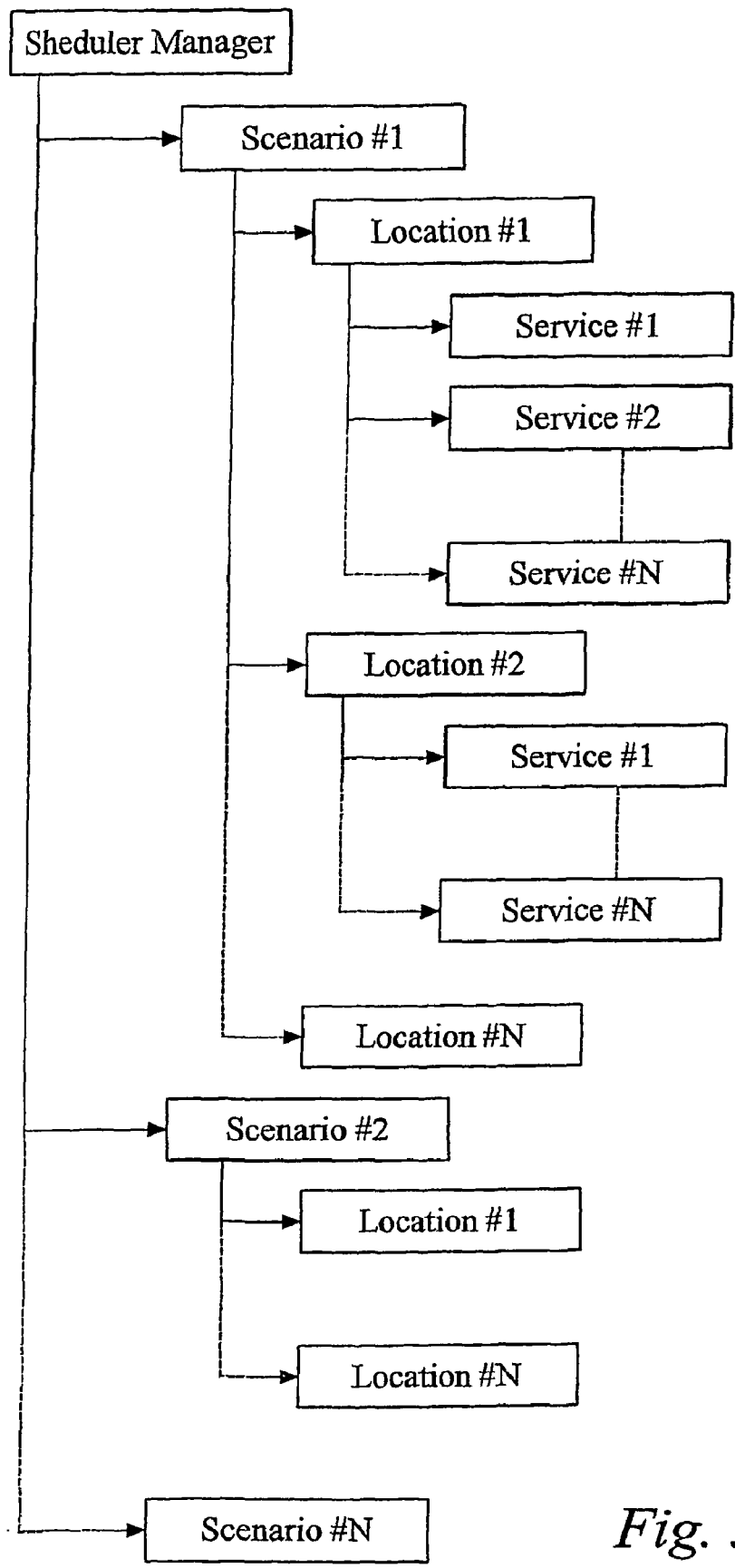
FIG. 55 illustrates scenario organization for an ISEA according to one embodiment of the systems and methods described herein.

A scenario may be defined by a number of different parameters and conditions. These may include the scenario name and/or the different locations and services with which the scenario is concerned. FIG. 55 illustrates one embodiment of scenario organization.

Figure 56:
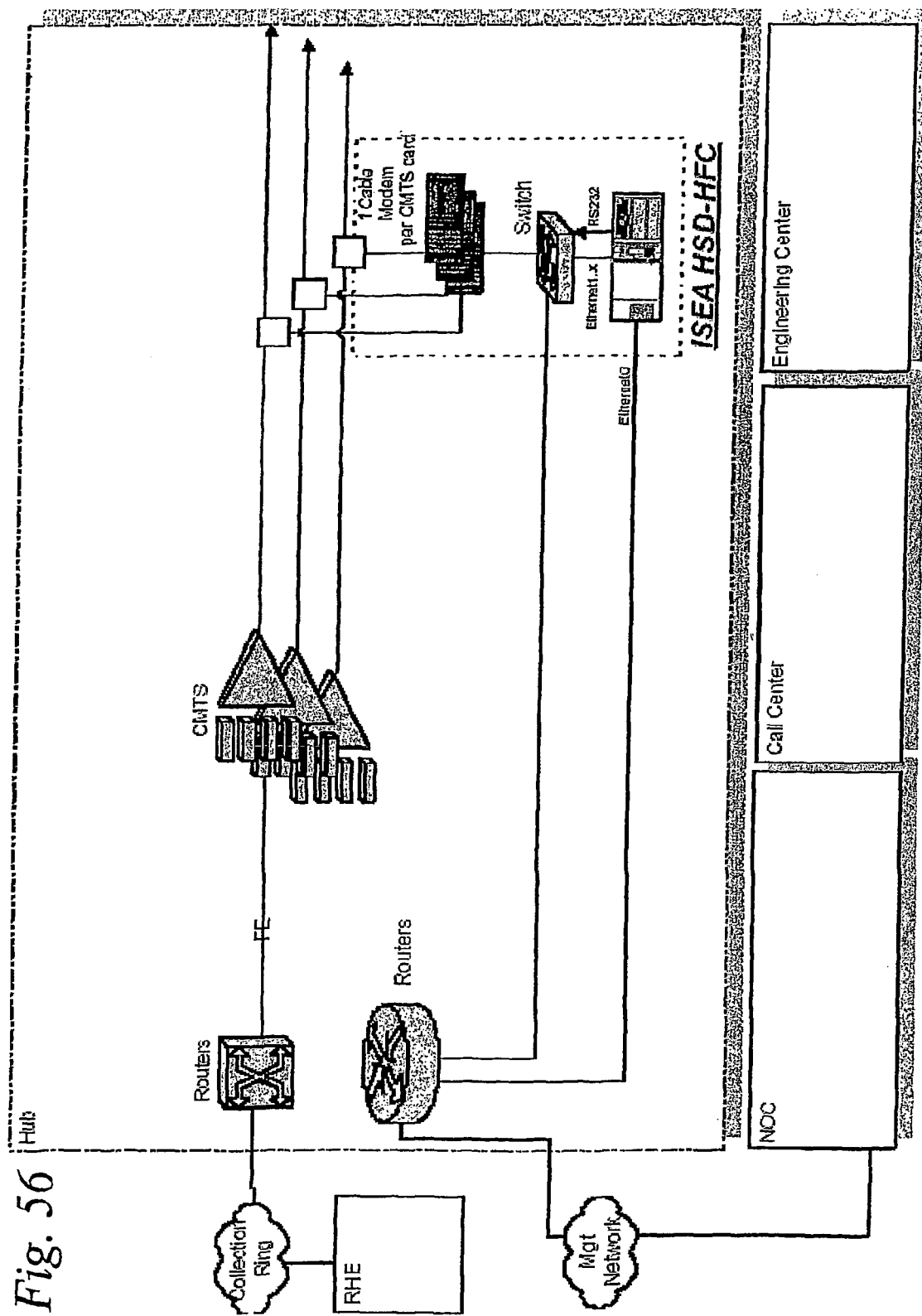
FIG. 56 shows a preferred hardware architecture for an ISEA according to one embodiment of the systems and methods described herein.

The ISEA may be implemented as a Java application designed to run on a Linux box. Other equivalent scripting or programming languages may also be used and may be implemented within other operating environments. In term of hardware, in this embodiment, the box must have at least 2 NIC cards, the first one dedicated to the management (eth0) and the second one (eth1) dedicated to perform all the required tests as shown in FIG. 56.

Figure 57:
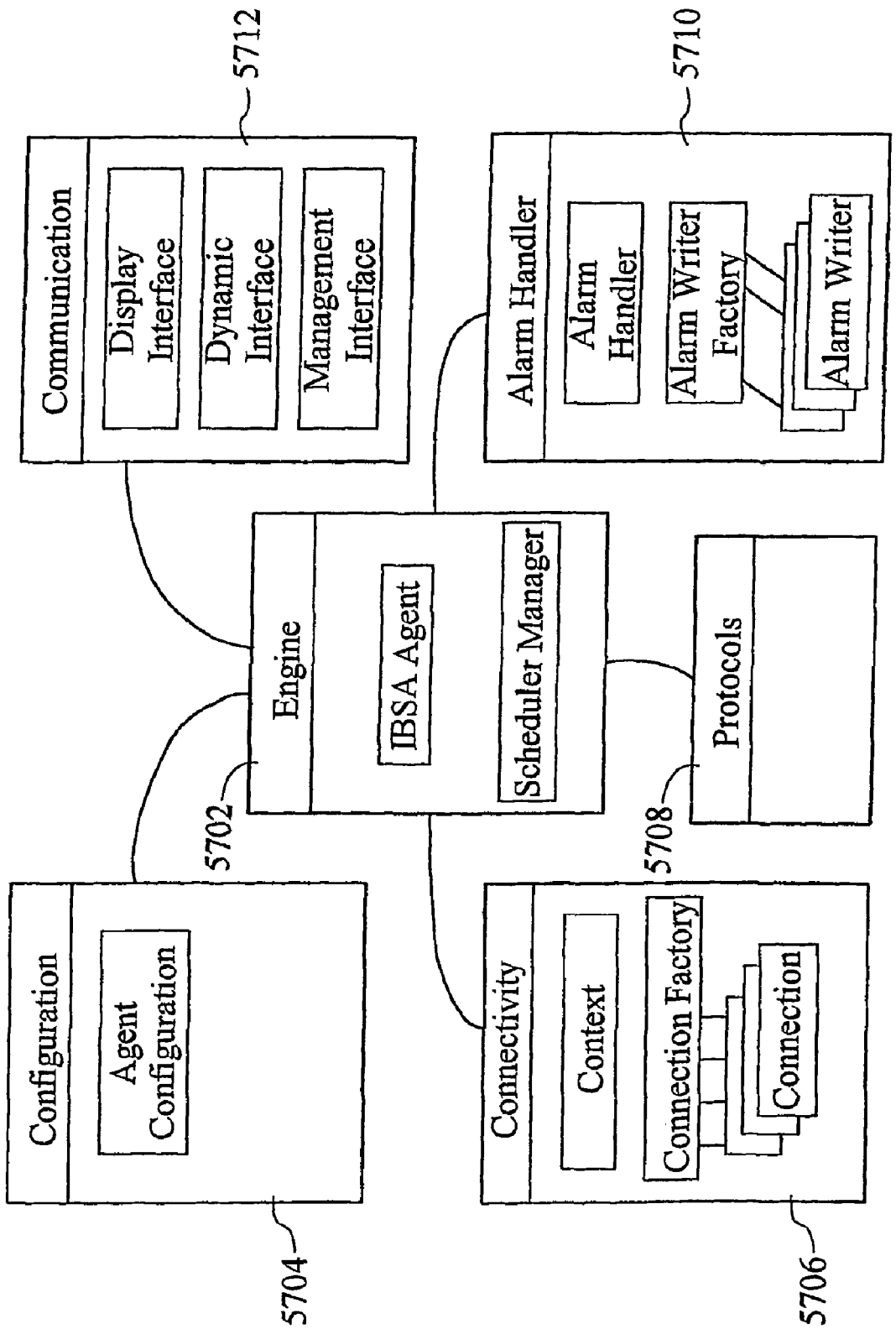
FIG. 57 illustrates the six key components comprising a preferred ISEA architecture according to one embodiment of the systems and methods described herein.

The ISEA Architecture of the present embodiment is composed of six key components, as shown in FIG. 57:

The Imagine Service Emulator Agent Engine 5702
The Configuration 5704
The Connectivity 5706
The Protocol 5708
The Alarm Handler 5710

Communication 5712

Each of these components may be configured in two files:
The Agent file that contains:
The Agent Configuration
The Communication Configuration
The Connectivity Configuration
The Scheduler Manager Configuration
The scheduler manager file that contains:
The Alarm Handler Configuration
The Protocols Configuration
The Service Configuration
The Scenarios Configuration
The Scheduler Configuration Configuration of the Agent may be provided by a number of modular commands, and these are typically in the form of an activation script. Preferably this script is a markup language, and more preferably XML (extensible markup language) is used. A number of XML configuration sections are shown by way of example in FIGS. 49 to 54.

With reference to FIG. 51, it should be recognized that often the protocols section must only contain protocols that will be used. It is however possible to add protocols by concatenation of the protocol section into one XML file.

A Hybrid Fiber-Coax Manager

The systems and methods described above may further be implemented in conjunction with a Hybrid Fiber-Coax Manager, a description of one embodiment of which follows below. This application is described by way of example only and is not intended to be limiting in any way.

The Imagine HFC Manager (HFC-MGR) tool may be used to provide the customer service operator with different views of the HFC network to enable remote diagnosis and to reduce lead-time for problem resolution. The resulting remote operations may increase call centre efficiency and reduce manual transfers and interventions. The Imagine HFC Manager tool may be used to help customer service operators and network operators by offering visibility of various aspects of the platform from allocation of the bandwidth and packet loss, monitoring of network interfaces such as HUB and CMTS CARD, and HFC segmentation.

Figure 44:
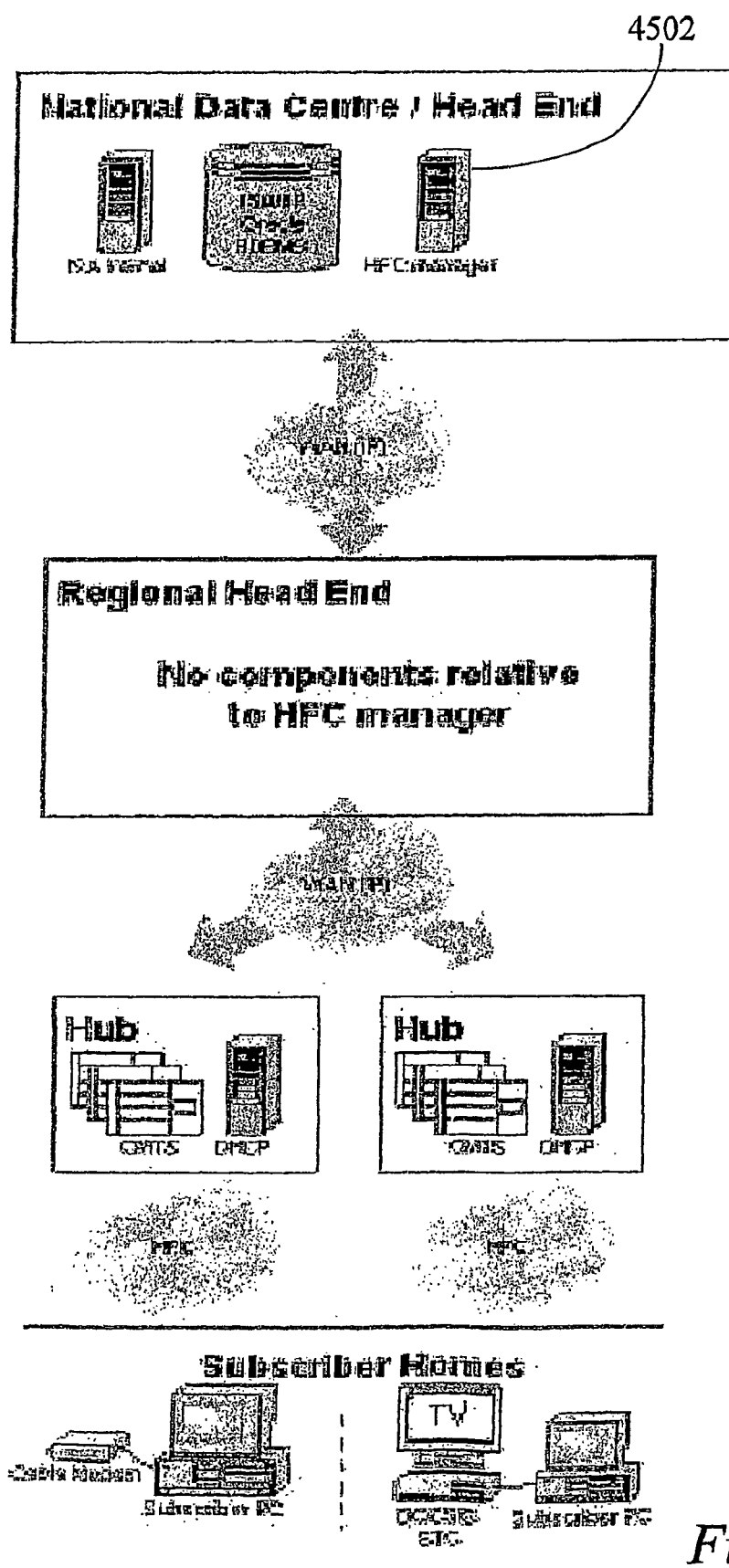
FIG. 44 shows a sample Hybrid Fibre-Coax manager deployment according to one embodiment of the systems and methods described herein.

FIG. 44 shows a sample HFC manager deployment. In this embodiment, the HFC manager 4502 is installed in a national data centre near a Provisioning Database. Only infrastructure elements relative to HFC Manager are shown According to one embodiment, the HFC Manager application can be broken down into four main functional areas:
Location/Equipment tree.
CMTS Router Management.
CMTS Card Management.
Segmentation Management.

Figure 45:
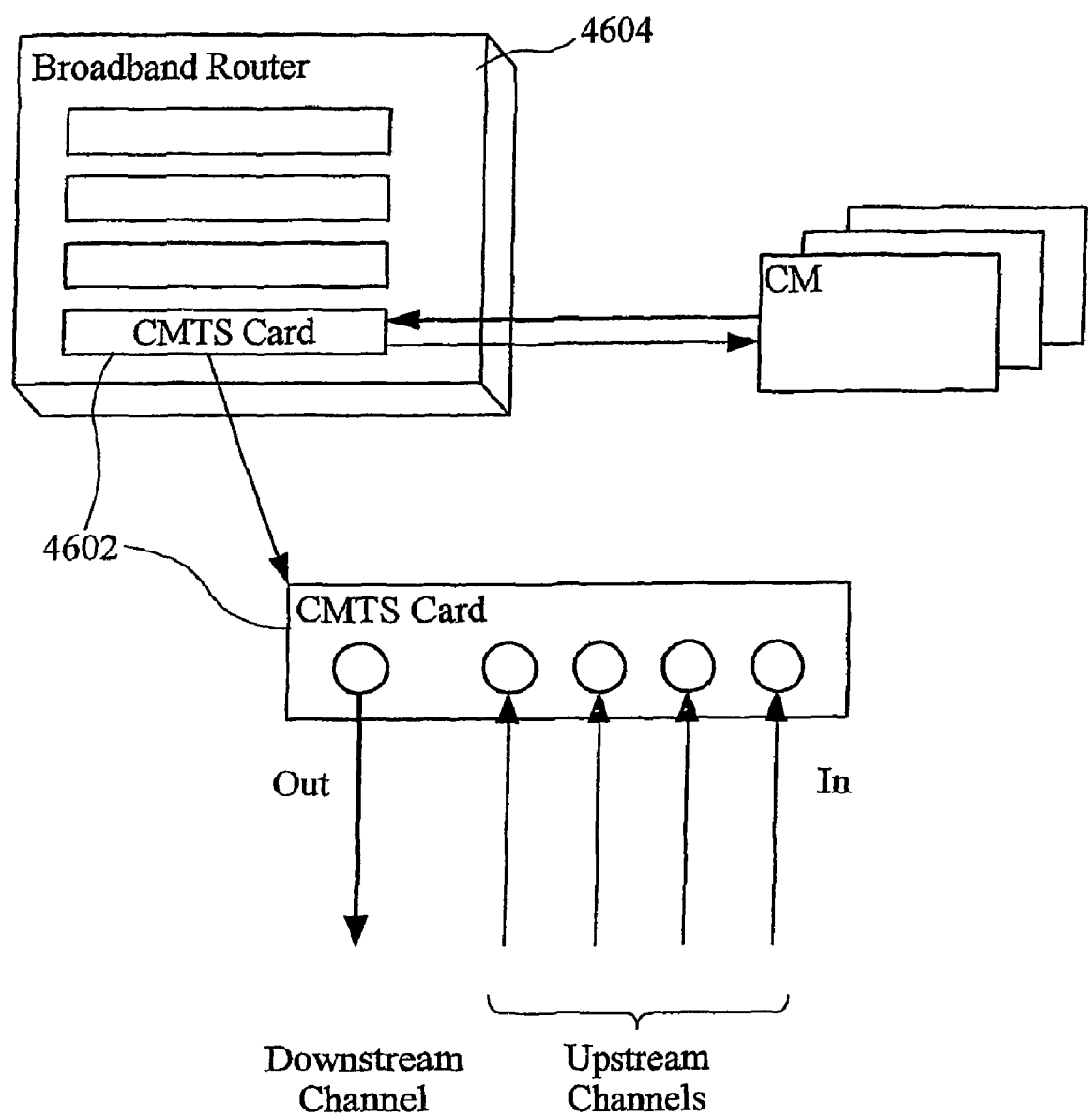
FIG. 45 illustrates CMTS router and CMTS card relationships according to one embodiment of the systems and methods described herein.

FIG. 45 illustrates CMTS router 4604 and CMTS card 4602 relationships.

Figure 46:
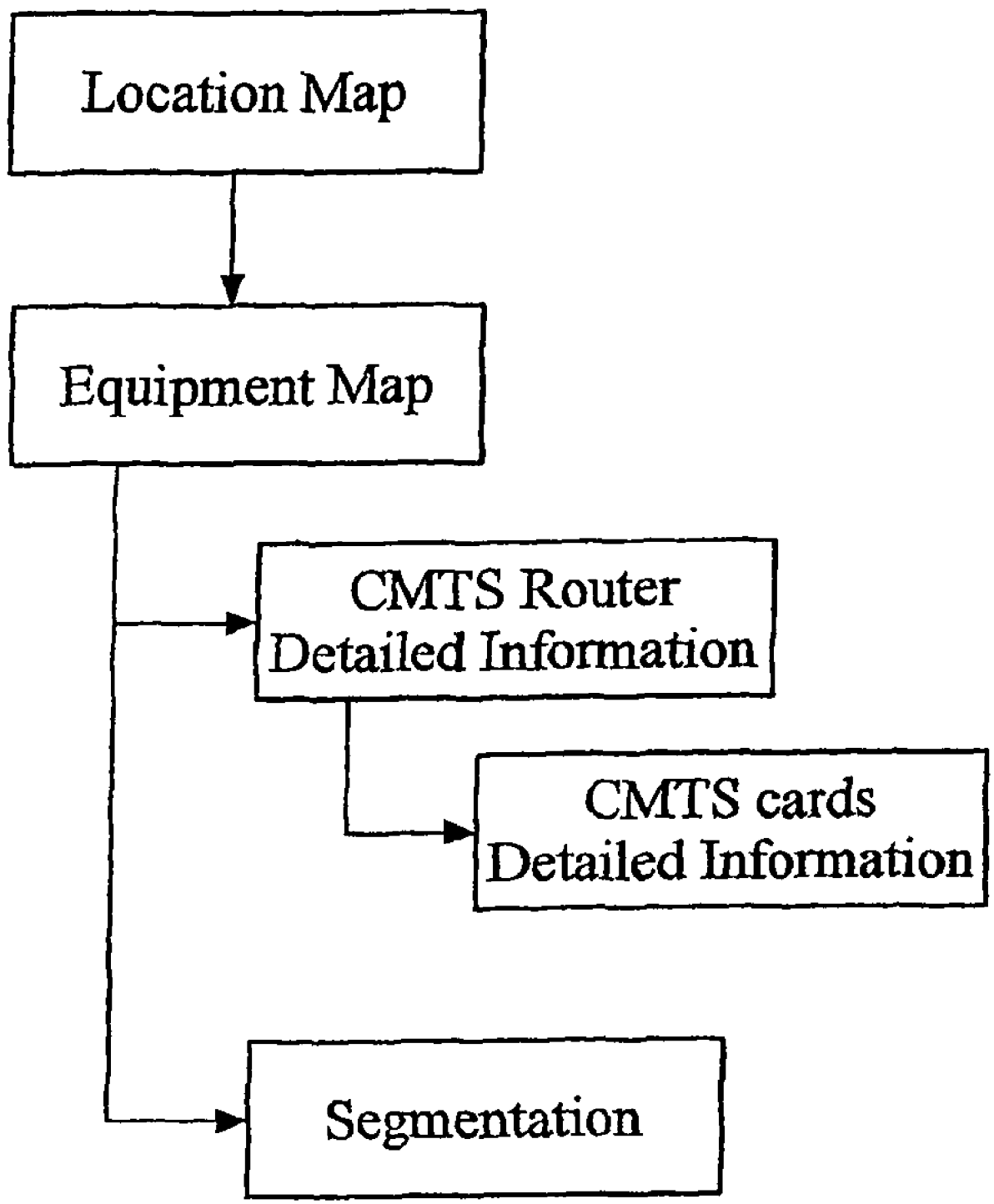
FIG. 46 shows an HFC manager user interface overview for a preferred embodiment of the systems and methods described herein.

According to the present embodiment, the HFC Manager may provide the user with the following views, accessible through a drill-down geographical tree:
A global National view, showing Regions information
A Regional view (National/Regional Head-End (NHE, RHF), Hubs), showing nodes information
A node view, detailing HFC segments information
FIG. 46 shows a user interface overview.

According to one embodiment of the user interface, a user may drill-down through Countries, Regions or Equipments, or obtain open detailed information about CMTS router or CMTS cards. This may be done by a user, for example, by clicking on appropriate text or icons in a user interface display.

The main window of the HFC_MGR user interface may be divided into two main parts. A "Location/Equipment Panel" may be used to display the different levels of the location tree and related equipment An "Information Panel" may allow the display of information about HFC equipment. The system may be configured so that only HPC equipment relevant to the selection in the Location/Equipment Panel is displayed.

The "Location/Equipment Panel" may display information according to the following structure:
All Locations may be attached to the country with a hierarchical tree: Region, NHE, RHE and attached HUB All Equipment attached to any Location. For instance all CMTS Router attached to a HUB, then all CMTS cards attached to a CMTS Router.

If a Country, region, NHE or RHE is selected in the first (location) environment, a second (display) environment, the "Location Information Panel", may be used to display the list of all available locations. The fields may include some or all of the following:
Location: depending on the selection in the first environment, the "Location/Equipment Panel":
If a Country is selected, a list of regions within the country maybe displayed.
If a Region is selected, a list of Regional Head Ends (RHEs), National Head Ends (NHEs) and HUBs may be displayed.
Total HP: number of "Home passed". A "Home passed" represents the number of Cable Modems or Set-Top Boxes we can potentially connect.
Total CM-STB: number of Cable Modems or Set-Top Boxes actually connected.
Penetration: Total CM-STB as a percentage of /Total HP
Bronze: number of Cable Modem or Set-Top Boxes with Bronze Quality of Service
Silver: number of Cable Modem or Set-Top Box with Silver Quality of Service
Gold: number of Cable Modem or Set-Top Box with Gold Quality of Service If a HUB is selected in the first environment, the "Location/Equipment Panel", the second environment, the "Location Information Panel", may further display information on the Signal-to-Noise Ratio (SNR), downstream/upstream bandwidth, and CM for all CMTS cards in this CMTS Router. The fields may include some or all of the following:
CMTS: CMTS card identification e.g. "Cable3/0"
CMTS Router: CMTS Router path e.g. "ubr01 soph.ib-.sophia.com"
SNR min: in db, Signal to Noise Ratio. Minimal Signal/Noise ratio as perceived from this CMTS card.
SNR max: in db, Signal to Noise Ratio. Maximal Signal/Noise ratio as perceived from this CMTS card.
Downstream bandwidth: in bits, the bandwidth of this downstream channel.
Upstream bandwidth: in bits, the bandwidth of this upstream channel.
CM number
Registered CM number If a CMTS Router is selected, for example on the "Location/Equipment Panel" or the "Location Information Panel", detailed information for this CMTS Router can be displayed. In this embodiment, information is displayed in two main sections; one for CMTS Router detailed information and the other for CMTS downstream/upstream data.

The information displayed in the CMTS Router Information Panel may include some or all of the following:
System Description: a text description of the entity. This value may include the full name and version identification of the system's hardware type, software operating system, and networking software.

System Up Time

Memory Daily Graph: graph of memory utilisation.

Overall CPU 0 Load: The Current Load or a Daily Graph may be displayed.

Interface FastEthernet 0/0: The current Status (e.g. UP/DOWN) may be displayed in addition to or in place of a Daily Graph of the FastEthernet 0/0 traffic.

Interface FastEthernet 1/0: The current Status (e.g. UP/DOWN) may be displayed in addition to or in place of a Daily Graph of the FastEthernet I/O traffic.

For all CMTS cards, downstream and upstream information can be displayed in the "CMTS Card Upstream/Downstream section".

CMTS CARD information may also be displayed in a "CMTS Card Information Panel", which may incorporate sonic or all of the following CMTS card information:

General Information may Include:
  Number of Cable Modems
  Number of Cable Modems registered (online)
  Number of Flapping Modems
  Check Segmentation
  CMTS CARD Downstream information, such as that below may also be displayed:
  Total bytes OUT
  Total discard OUT
  Traffic Analysis/Daily Graph
  CMTS CARD Upstream information, such as that below may also be displayed:
  Codewords received without errors
  Codewords received without correctable errors
  Codewords received without uncorrectable errors
  Current SNR in dB
  Signal Noise Ratio Analysis/Daily Graph
  Traffic Analysis/Daily Graph
  Total bytes IN in Mb
  Total discard IN in packets According to one embodiment, it may also be possible to perform a segmentation audit using the HFC_MGR. The user may edit segmentation parameters and the process display shows if segmentation is needed or not. According to the present embodiment, the segmentation process uses three methods that provide three different results.

Method 1: If the total number of Cable Modems (CMs) registered on the network is greater than the edited Number Max of CM/Seg parameter, then segmentation is needed.

Method 2: If the total number of CM registered on the network, multiplied by the Bandwidth min parameter is greater than the Bandwidth parameter, then segmentation is needed. This means that given the available bandwidth, the pre-defined minimum QoS is not guaranteed for all the CMs.

Method 3: If the total number of CMs registered on the network, multiplied by their maximum bandwidth (defined in their configuration file) and multiplied by the Contention parameter, is greater than the Bandwidth parameter, then the segmentation is needed since, given the available bandwidth and the contention, the QoS is not guaranteed for all the CMs.

Parameters used in segmentation, some or all of which may be displayed in a "Segmentation Parameter Panel" include:
  Bandwidth in Mb:: available bandwidth.
  In this embodiment, there are two possible values:
    24 Mbps for USDOCSIS
    34 Mbps for EURODOCSIS
  Number Max of CM/Seg: maximum number of CM (used for Method 1)
  Bandwidth min in Kb/s: minimum bandwidth available for all the CMs, without regard to their QoS. (Used for Method 2)
  Contention in percentage: 100% means that the bandwidth is shared between all the CMs, at the same time. (Used for Method 3).

The three results of the segmentation process can be displayed. For each of these three results, the value can be "segmentation needed" or "segmentation not needed".

"NB CM=": result of Method 1

"MIN=": result of Method 2

"MAX=": result of Method 3

A Cable Modem Manager

The system may also be implemented in conjunction with a Cable Modem Manager. An embodiment of the Cable Modem Manager, or Cable Modem Manager Application (CM_MGR) is described in more detail below. The CM_MGR may be implemented as part of the system described herein or may be provided independently. The features of the system described herein may be provided in combinations other than those outlined here and may be provided independently unless otherwise stated. This embodiment of the Cable Modem Manager application is described by way of example only and is not intended to be limiting in any way. Potential users of the system may be described as customers or subscribers in the following description.

Figure 23:
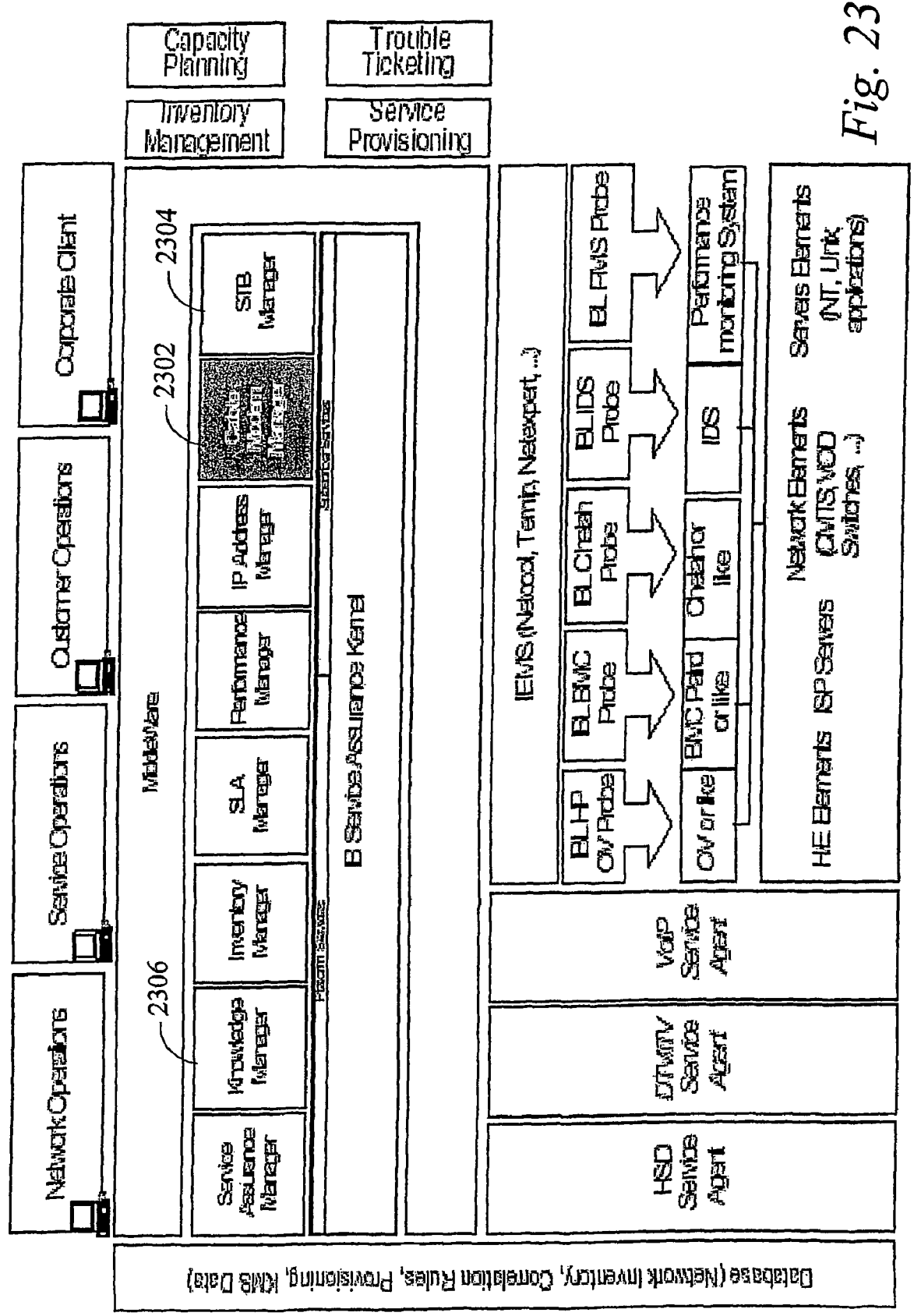
FIG. 23 is a schematic diagram of a Cable Modem Manager integrated into a distributed system according to one embodiment of the systems and methods herein described.

The Cable Modem Manager may be implemented as a distributed web based application, and can be deployed centrally or be distributed. FIG. 23 shows an embodiment of the CM-MGR 2302 with a distributed solution incorporated into a network environment for provisioning apparatus. Other elements of the provisioning apparatus, such as the Set Top Box Manager 2304 and the Knowledge Manager 2306, are described herein and may be implemented alongside the CM_MGR 2302. In an alternative embodiment, features of the other elements may be incorporated into the CM_MGR.

The Cable Modem Manager can be integrated with Imagine Service Emulation Agent (ISEA) modules to simulate a subscriber access to Internet Service.

Figure 24:
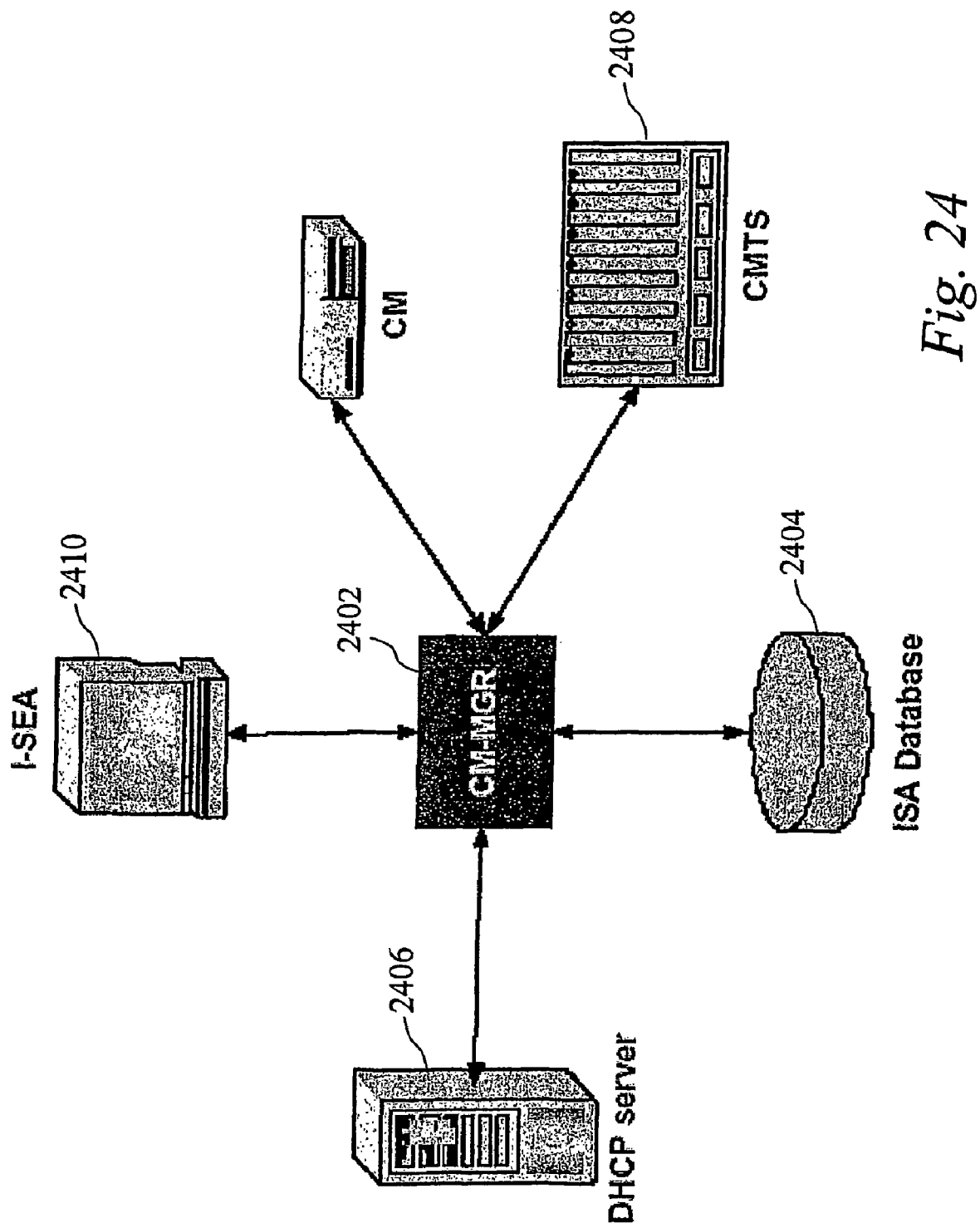
FIG. 24 is a schematic diagram of a technical architecture overview of the Cable Modem Manager according to one embodiment of the systems and methods herein described.

FIG. 24 shows the CM-MGR technical architecture overview, and how, in this embodiment, the CM-MGR application 2402 can retrieve and display information from sources including.

The ISA Database 2404, which may be used to retrieve subscriber, provisioning and services data.

The Dynamic Host Configuration Protocol (DHCP) servers 2406, which may be used to retrieve cable modem IP addresses.

The Cable Modem Termination System (CMTS) 2408 and cable modem, which may allow retrieval of cable modem data.

The ISEA 2410 (when ISEA integration is employed), which may be used to obtain detailed information concerning subscriber services.

According to the present embodiment, the Cable Modem Manager application can perform some or all of the following main functional features:

Subscriber information searching, wherein information about individual subscribers may be obtained by inputting criteria such as first name, last name, PID, MAC or IP address into a search panel. The application displays a list of subscribers that match the search criteria in a Results list.

Status Monitoring, wherein by inputting the details of a selected subscriber, the application displays detailed information about that selected subscriber. Such detailed information may include:
Subscriber Information: PID, name, address and e-mail address.
Cable modem status from the ISA database: MAC address, CMTS name, UBR name, Location and Region.
Cable modem status from the Cable Modem Termination System (CMTS): includes downstream and upstream channel information, online state, timing offset, received power, and Quality of Service (QoS) profile.
Cable modem status directly from the cable modem: serial number, software and hardware versions, and operating system.
Performance MoniLoring (Polling), wherein by inputting the details of a selected subscriber and polling characteristics, the application can monitor and display performance inforination such as the start date, MAC address, PID and status.
Service status monitoring, whereby if ISEA Integration is employed, status of ISP, Internet, and performance can be displayed In this way the CM-MGR can be used as a tool to solve a number of technical problems in the field of communications networks. For example, if a subscriber has recently upgraded to a premium subscription service, but complains that service is no faster than before, then by taking the subscriber's details, the status of the subscriber's modem can be displayed at a remote location, and if necessary that modem can be remotely rebooted.

In an example where ISEA integration is employed, if a subscriber makes a complaint because of being unable to access their e-mail service, and by taking the subscriber's details and analyzing the status of the subscriber's modem the cause of the subscriber's issue is not identified, then ISEA connection can be activated and the availability of the email service to the user account can be displayed.

It will be appreciated that such an application can be used to monitor a wide variety of information associated with a communications network. Examples of status information which the present application may be used to monitor are given below. The status information may be displayed on a control terminal or apparatus to allow monitoring of the system and resolution of faults which may arise. The system may be arranged so that selected items of information may be displayed in a "Standard View" and further details may be obtained by entering a "Advanced View" for each of the frames below.

Subscriber information including the following details may be displayed in a "Subscriber Information Frame":
Personal ID (PID)
First and Last Name
Address: street, city, zip code
E-mail A "Cable Modem Information from Database Frame" may display inforination retrieved from the ISA database, including:
CM MAC address
CMTS name
UBR name
Location and Region A "Cable Modem Status from the CMTS Frame" may display information retrieved from the Cable Modem Temination System, including:

Downstream Channel:
Identification. The Cable Modem Termination System (CMTS) identification of the downstream channel.
Frequency. The frequency of this downstream channel.
Bandwidth. The bandwidth of this downstream channel.
Modulation. The modulation type associated with this downstream channel.
Interleave. The Forward Error Correction (FEC) interleaving used for this downstream channel.
Power. At the CMTS, the operational transmit power. At the CM, the received power level.

Upstream Channel:
Identification: this may comprise a unique value, greater than zero, for each interface. In one embodiment, values could be assigned incrementally starting from one.
Frequency. The centre of the frequency band associated with this upstream channel may be displayed. "0" may be shown for an unknown or an undefined frequency. Minimum permitted upstream frequency is 5 MHz for current technology.
Bandwidth. The bandwidth of this upstream channel may be displayed. "0" may be shown for an unknown or an undefined frequency. Minimum permitted channel width is 200 kHz currently.
Transmit timing offset. A measure of the current round trip time at the CM, or the maximum round trip time seen by the CMTS may be displayed.
Slot size. The number of 6.25 microsecond ticks in each upstream mini-slot may be displayed.
Ranging backoff start. The initial random backoff window to use when retrying Ranging Requests.
The value may be expressed as a power of 2. A value of 16 at the CMTS may be used to indicate that a proprietary adaptive retry mechanism is to be used.
Ranging backoff end. The final random backoff window to use when retrying Ranging Requests.
The value may be expressed as a power of 2. A value of 16 at the CMTS may be used to indicate that a proprietary adaptive retry mechanism is to be used.
Transmit backoff start. The initial random backoff window to use when retrying transmissions. The value may be expressed as a power of 2. A value of 16 at the CMTS may be used to indicate that a proprietary adaptive retry mechanism is to be used.
Transmit backoff end. The final random backoff window to use when retrying transmissions. The value may be expressed as a power of 2. A value of 16 at the CMTS may be used to indicate that a proprietary adaptive retry mechanism is to be used.

Other information, such as that listed below, may also be displayed in the "Cable Modem Status from the CMTS Frame". For any unknown value, a value of "0" may be displayed:
Max number of CPEs. The maximum number of permitted CPEs connecting to the modem.
IP address. IP address of this cable modem. If no JP address has been assigned, or for an unknown IP address, a value of 0.0.0.0 may be displayed. If the cable modem has multiple IP addresses, the IP address associated with the cable interface may be displayed.
Received power. The received power as perceived for upstream data from this cable modem.
Timing offset. A measure of the current round trip time at the CM, or the maximum round trip time seen by the CMTS. This may be used for the timing of CM upstream transmissions to ensure synchronised arrivals at the CTMS. In this embodiment, units are in terms of (6.25 microseconds/64).

DOCSIS status. Status code for this cable modem as defined in the RF Interface Specification. In this embodiment, the Status code comprises a single character indicating error groups, followed by a two or three digit number indicating the status condition.

Unerrored. Codewords received without error from this cable modem.

Collected. Codewords received without error from this cable modem.

Uncorrectable. Codewords received with uncorrectable errors from this cable modem.

Signal to Noise Ratio. Signal/Noise ratio as perceived for upstream data from this cable modem.

Micro reflections (dbmV): A rough indication of the total microreflections including in-channel response as perceived on this interface. This may be measured in dBc below the signal level.

Connectivity state. Current cable modem connectivity state.

Online times. The percentage of time that the modem stays online during the time period starting with the modem's first ranging message received by the CMTS until now.

Minimum online time. The minimum period of time the modem stayed online during the time period starting with the modem's first ranging message received by the CMTS until now.

Average online time. The average period of time the modem stayed online during the time period from the modem's first ranging message received by the CMTS until now.

Maximum online time. The maximum period of time the modem stayed online during the time period from the modem's first ranging message received by the CMTS until now.

Minimum offline time. The minimum period of time the modem stayed offline during the time period from the modem's first ranging message received by CMTS until now.

Average offline time. The average period of time the modem stayed offline during the time period from the modem's first ranging message received by the CMTS until now.

Maximum offline time. The maximum period of time the modem stayed offline during the time period from the modem's first ranging message received by the CMTS until now.

Admin status

Quality of service. This may be a group number, for example a QoS profile of 9 may mean that the maximum downstream data rate is 128 kb/s, corresponding to a bronze QoS.

In Octets (MB). The total number of octets received on the interface, including framing characters.

In Packets

Create time

SID. Service ID

A "Cable Modem Status Directly from Modem Frame" may display information that has been retrieved from the cable modem itself, including some or all of:

Description. A text description of the entity. This value may include the full name and version identification of the system's hardware type, software operating system, and networking software.

System uptime. Time the system has been up for, since last reboot.

CMTS MAC address. MAC address of this cable modem. For a cable modem with multiple MAC addresses, the MAC address associated with the cable interface may be displayed.

Ranging response waiting time. Waiting time for a Ranging Response packet.

Ranging waiting time. Waiting time for a Ranging packet.

Upstream transmit power. The operational transmit power for the attached upstream channel.

Resets. Number of times the cable modem reset or initialised this interface.

Lost syncs. Number of times the cable modem lost synchronisation with the downstream channel.

Status code. In this embodiment, this may consist of a single character indicating error groups, followed by a two or three digit number indicating the status condition.

Invalid MAP. Number of times the cable modem received invalid MAP messages.

Invalid UCD. Number of times the cable modem received invalid UCD messages.

Invalid ranging. Number of times the cable modem received invalid ranging response messages. Invalid registration. Number of times the cable modem received invalid registration response messages.

Counter T1, T2, T3 or T4 expired. Number of times counter T1, T2, T3 or T4 respectively expired in the cable modem.

Down channel frequency. The frequency band associated with this upstream channel.

Up channel frequency. The centre of the frequency band associated with this upstream channel. Minimum permitted upstream frequency is 5,000,000 Hz for current technology.

Up channel transmit timing offset. A measure of the upstream transmissions.

Relative priority [0-7]. A relative priority may be assigned to this service when allocating bandwidth. (0) may be used to indicate lowest priority; and (7) may be used to indicate highest priority. Interpretation of priority is device-specific.

Maximum upstream bandwidth (kbps). The maximum upstream bandwidth, in bits per second, allowed for a service with this service class.

Guaranteed upstream bandwidth (kbps). Minimum guaranteed upstream bandwidth, in bits per second, allowed for a service with this service class.

Maximum downstream bandwidth (kbps). The maximum downstream bandwidth, in bits per second, allowed for a service with this service class.

Transmit burst. The maximum number of minislots that may be requested for a single upstream transmission.

Profile status.

Downstream signal to noise ratio: describes the Signal/Noise of the downstream channel.

Micro reflections: A rough indication of the total microreflections including in-channel response as perceived on this interface, measured in dBc below the signal level.

Examples of performance information which the present application may be used to monitor include:

Current In: current number of octets received on the CM, in Bytes/seconds

Current Out: current number of octets transmitted by the CM, in Bytes/seconds

Average In: average number of octets received on the CM, in Bytes/seconds

Figure 25:
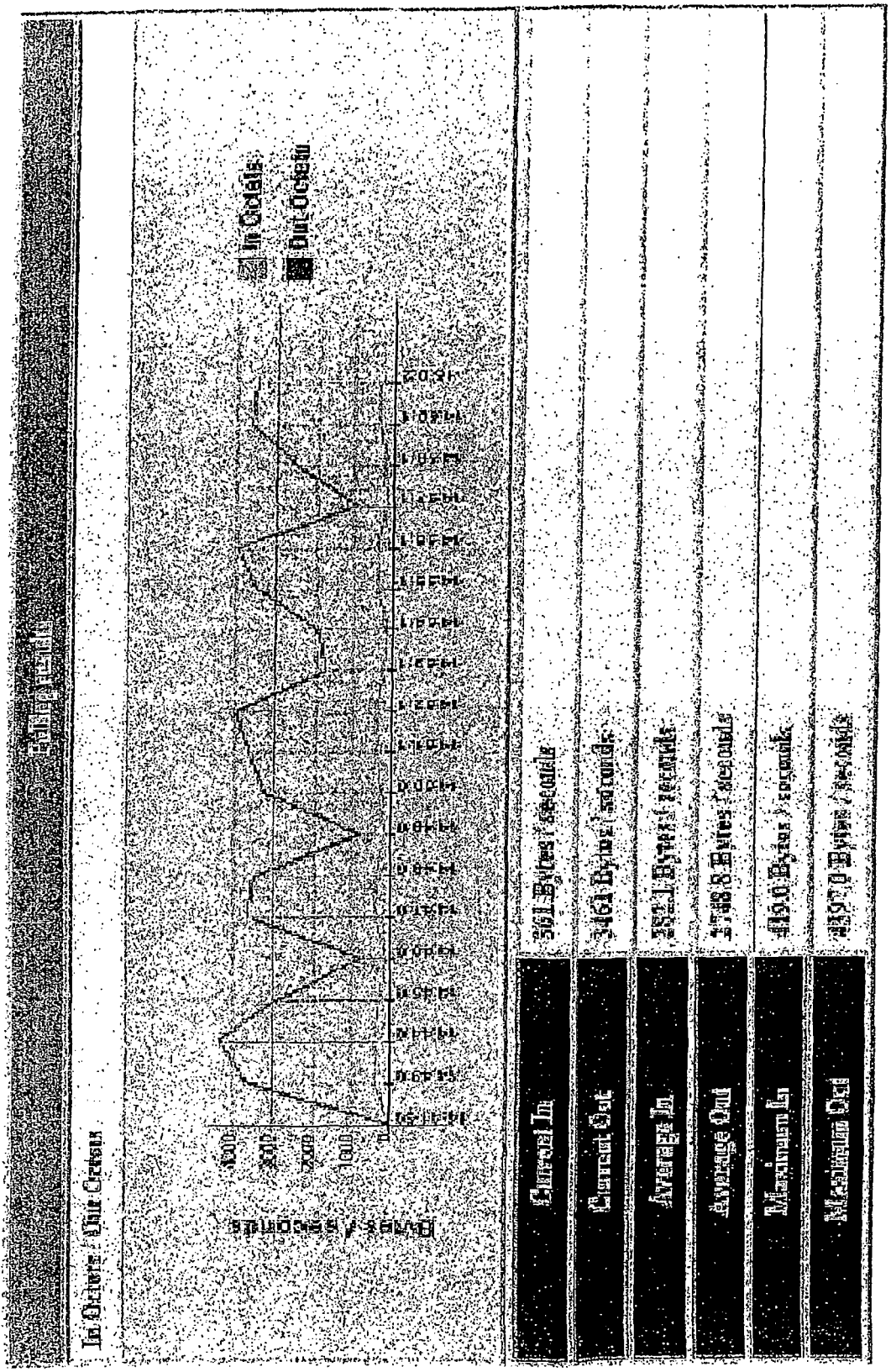
FIG. 25 is a schematic diagram of a screen display which may be generated by the Cable Modem Manager to display data according to one embodiment of the systems and methods herein described.

Average Out: average number of octets transmitted by the CM, in Bytes/seconds
Maximum In: maximum number of octets received on the CM, in Bytes/seconds
Maximum Out: maximum number of octets transmitted by the CM, in Bytes/seconds
Current SNR: current Signal/Noise ratio as perceived for upstream data from the CM., in dB
Average SNR: average Signal/Noise ratio as perceived for upstream data from the CM., in dB
Maximum SNR: maximum Signal/Noise ratio as perceived for upstream data from the CM., in dB These data may be displayed either graphically as shown in FIG. 25, or in tabular form.

A Set Top Box Manager

The provisioning system described above and the communications network management system, which will be described in more detail below may be implemented in conjunction with a Set-Top Box Manager, an embodiment of which is described below.

To implement fault resolution in provisioned communications systems, it is often necessary to have direct access to the user equipment. It may be possible to resolve faults by instructing a user to implement changes in the user equipment. However, for more complicated faults, it may be necessary for a system engineer to attend the user's site. This may mean that there is a significant delay between fault detection and resolution.

The set-top box manager (STB-MGR) is a tool which may allow customer service operators and network operators to interact directly with user devices, such as a Set-Top Box or DOCSIS-compliant (Data Over Cable Systems Interface Specification compliant) cable modems. The STB_MGR may allow a service provider to reduce the lead-time for problem resolution.

The STB-MGR tool may be provided as part of the system described herein, or it may be provided in dependently. By way of example, one embodiment of the STB-MGR will now be described in more detail. The features of the system described herein may be provided in combinations other than those outlined here and may be provided independently unless otherwise stated. The following description is not intended to be limiting in any way. Potential users of the system may be described as customers or subscribers in the following description.

As stated above, the STB-MGR tool may be used to provide the customer service operator with a means of interacting directly with a user's Set-Top Box to reduce lead-time for problem resolution.

Figure 11:
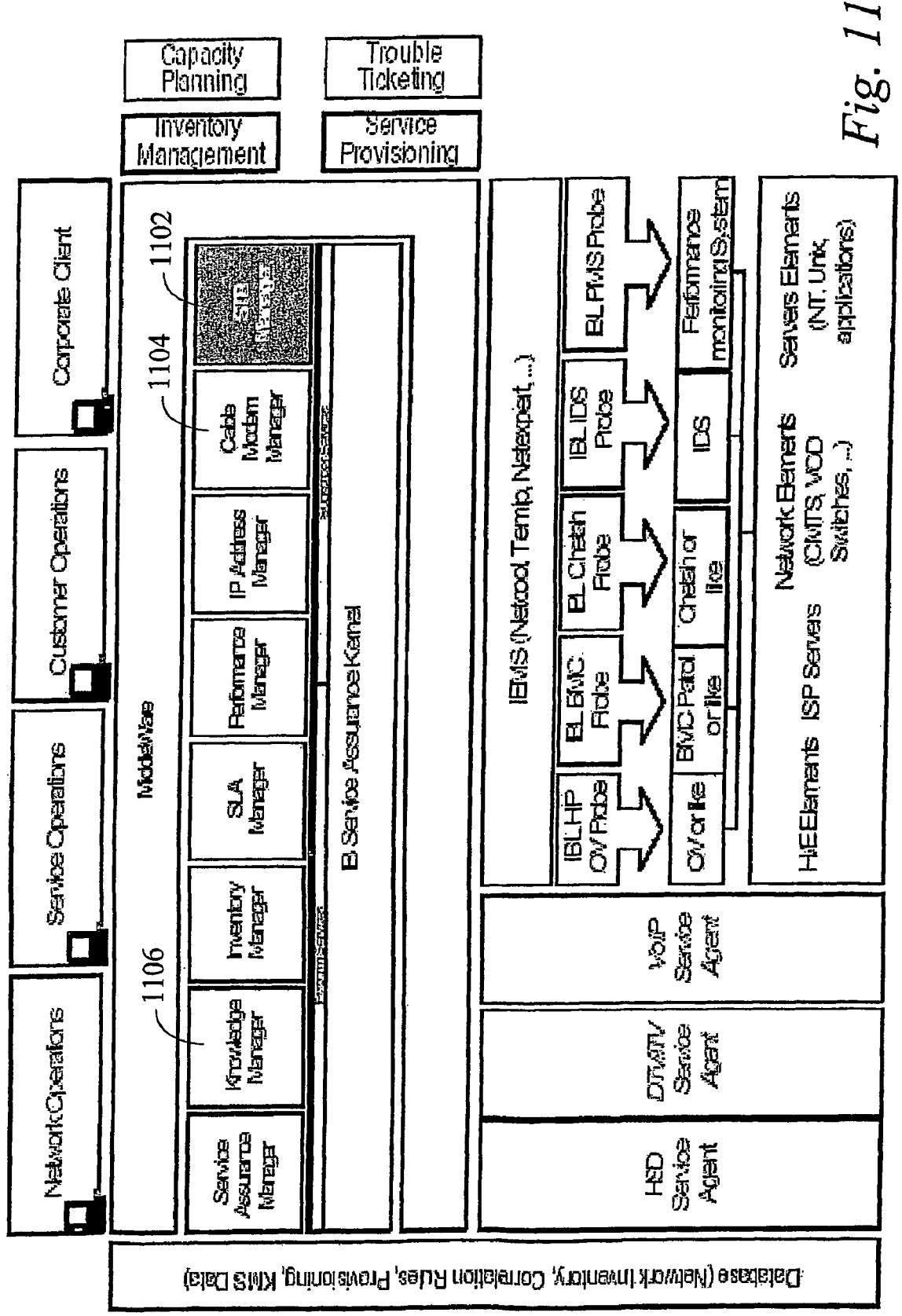
FIG. 11 is a schematic diagram of how the Sct-Top Box Manager application may be incorporated into a network environment for provisioning apparatus according to one embodiment of the systems and methods herein described.

FIG. 11 provides an outline of how one embodiment of the STB-MGR 1102 may be incorporated into a network environment for provisioning apparatus. Other elements of the provisioning apparatus, such as the Cable Modem Manager 1104 and the knowledge Manager 1106, are described herein and may be implemented alongside the STB_MGR. In an alternative embodiment, features of the other elements maybe incorporated into the STB_MGR.

The STB_MGR tool may perform some or all of the functions outlined below. Features of the STB_MGR functionality may be provided independently, or may be provided by elements other than the STB-MGR within the system.

By way of Example, the functions of the STB-MGR may include at least one of:

Displaying a list of users based on the identity of their Set-Top Box. For example, based on the user's PID, MAC address or IP address. More details of this functionality are provided below.

Managing Installation parameters. This button may be configured to run the query with the content of the selection fields and is also described in more detail below.

The type of window used by the STB_MGR tool to display user details may depend on the number of users for which details have been retrieved. For example, if the details of many users are retrieved in response to a particular query, a "matched subscribers list" may be displayed. If the details of only one user is retrieved, the "'Install' Results List Panel" for this user may be displayed. By way of example, the 'Install' Results List Panel may provide information such as the About Installation parameters, hardware and code release version, MPEG and PCM attenuation level and the MAC Address. It may be possible to update some Installation parameters within the 'Install' Results List Panel, for example: the Network ID, QAM (Quadiature Amplitude Modulation) rs: Default frequency and symbol rate.

Detailed information from the Set-Top Box of a selected user may also be displayed. This information may include, for example, the About Forward Path or the About Return Path for a particular user. According to a further example, a list of events/status with time stamps may be displayed.

A user interface may also be provided. The user interface may be divided into a number of different types of windows. For example, three types of windows may be: a selection panel to edit, for example, the user name, PID, IP or MAC address for a particular user, a results list window to show user details that match a particular selection and a details window to show all the Set-Top Box information. More details of one embodiment of a STB_MGR user interface are provided below.

Use of one embodiment of the STB-MGR tool will now be described in more detail. A number of user issues and problems that may be overcome by use of the STB_MGR will be described to illustrate use of the STB-MGR tool, but these issues are not limiting and are provided by way of example only.

According to the first example scenario, a user makes a complaint that the can not gain access to a regional channel. By way of example, this complaint may be dealt with using the steps outlined below.

Figure 12:
FIG. 12 is a schematic diagram of an example of a Set-Top Box Manager screen display according to one embodiment of the systems and methods herein described.

A typical screen display which may be viewed by the STB_MGR tool operator whilst dealing with this problem is shown in FIG. 12.

Step 1: Display Subscribers Set-Top Box Installation parameters

Ask the caller for their name or PID and input this information into the relevant PID 1202 or Name 1204 fields.

Click on the Search button 1206 to view the Set-Top Box-Manager screen display.

In this example, the correct Set-Top Box is identified and the detailed Set-Top Box information, for example the Default Frequency 1208, is automatically displayed.

Step 2: Analyze the Data

In this example, the value of 'Network ID' 1210 does not match the region of the subscriber (this may occur due to a moving for instance). In this example, the problem may be cured by updating the Set-Top Box installation to reload the right Set-Top Box configuration file, as outlined in Step 3.

Step 3: Update Set-Top Box configuration

In this embodiment, the Set-Top Box configuration file may be updated by editing the right Network ID 1210 and clicking on the Update button 1212 to display the Set-Top Box-Manager tool screen In a second scenario, a user makes a complaint that he can't access a pay-per-view service. By way of example, this problem may be solved, with reference to FIGS. 12 and 13, using the following numbered steps:

Step 1: Check Installation parameter

In this example, this may be done in the same way as in Step 1 of the previous scenario, but, in this case, the initialization parameters are correct.

Step 2: Display Subscriber's Set-Top Box Forward parameters

Ask the caller for their name or PID and input this information into the relevant fields 1202, 1204.

Click on the 'Search' button 1206 to view the Set-Top Box-Manager screen display, as illustrated in FIG. 12.

Figure 13:
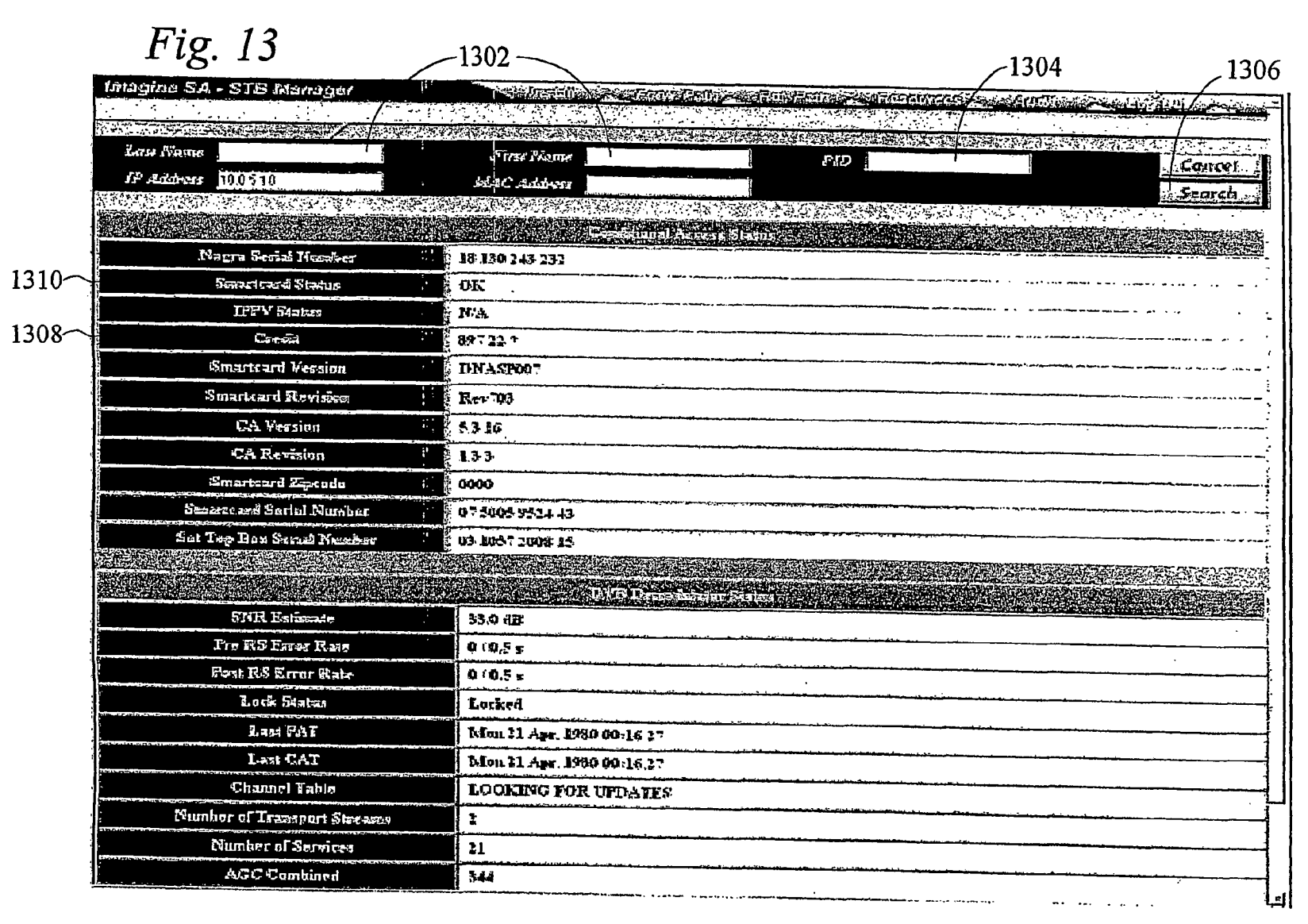

Click on 'Forward Path' 1214 menu to view the Set-Top Box-Manager screen display shown in FIG. 13.

Step 3: Analyze the Data

In this example, the value of 'Credit' 1308 shows that the user does not need to carry a sum to his credit. The status of the smardcard 1310 may show that the Credit Card is out of order. In analysing the data, the STB_MGR operator may be able to identify problems with the user's system which may be preventing the user from accessing the pay-per-view service. The user may then be able to rectify, for example. problems resulting from his credit card.

In a third scenario, the subscriber makes a complaint that his Set-Top Box often reboots. This problem may be solved, by way of example, according to the following numbered steps.

Step 1: Check Installation Parameters

In this example, Step 1 may be implemented in the same way as in Step 1 of the previous scenario, but, in this case, the initialization parameters are correct.

Step 2: Display Audit information

Figure 14:
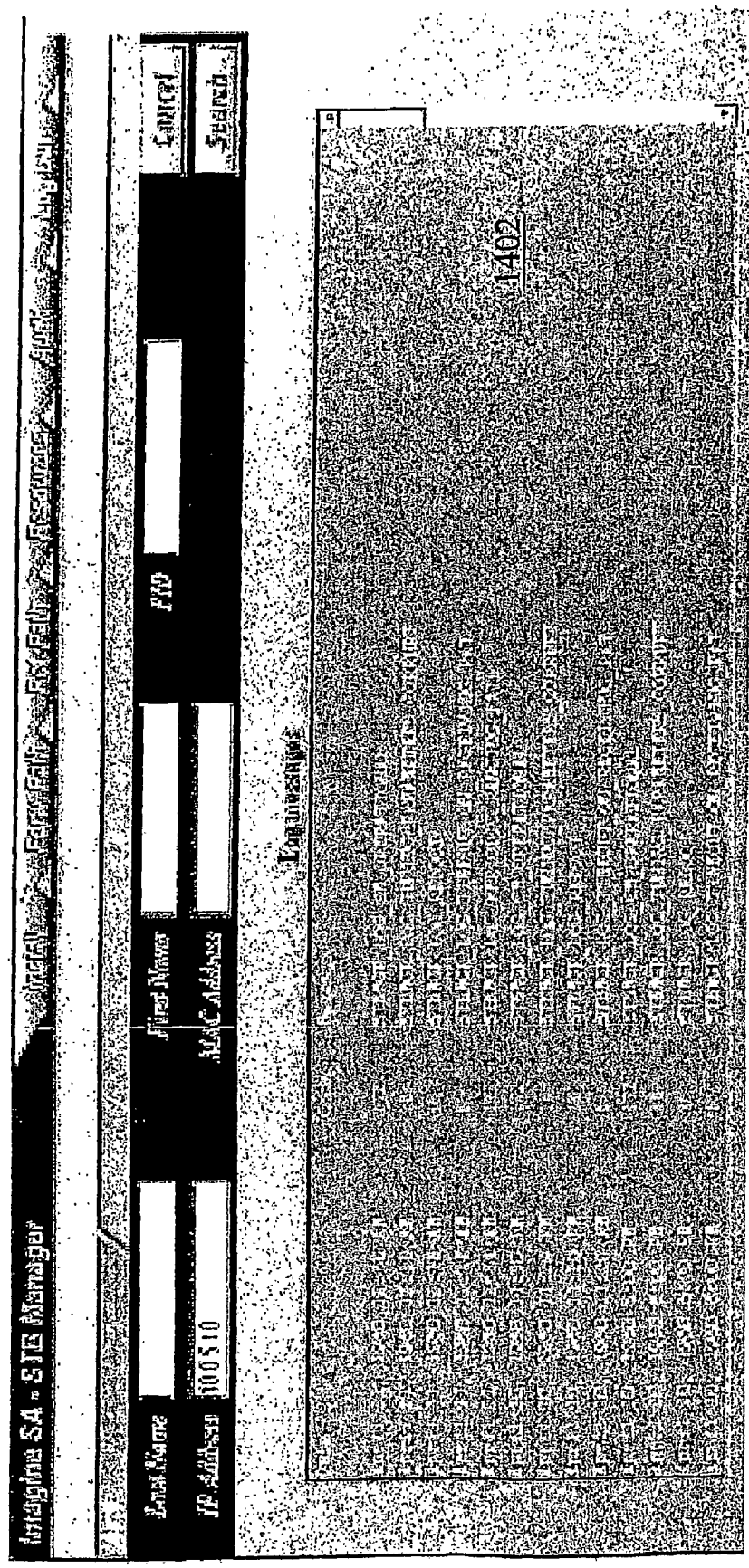
FIG. 14 is a schematic diagram of an example of a further Set-Top Box Manager screen display, which may be used to show 'Audit' information, according to one embodiment of the systems and methods herein described.

With reference to FIG. 12, click on the Audit menu 1216 to view the Set-Top Box-Manager screen display shown in FIG. 14. The event log 1402 is displayed.

Step 3: Analyze the Data

This may allow the operator to see if the number of reboots announced by the subscriber is correct and abnormal. Further action may then be taken to rectify any problems detected in the event log.

Further details of a preferred embodiment of a user interface for the STB-MGR tool are outlined below. Features may be provided independently or in alternative combinations. Features of the following components of the STB-MGR tool user interface are outlined: the Connection Window, the Main Window and the Top-bar. Features described herein may be applied to other components of the STB-MGR tool.

Figure 15:
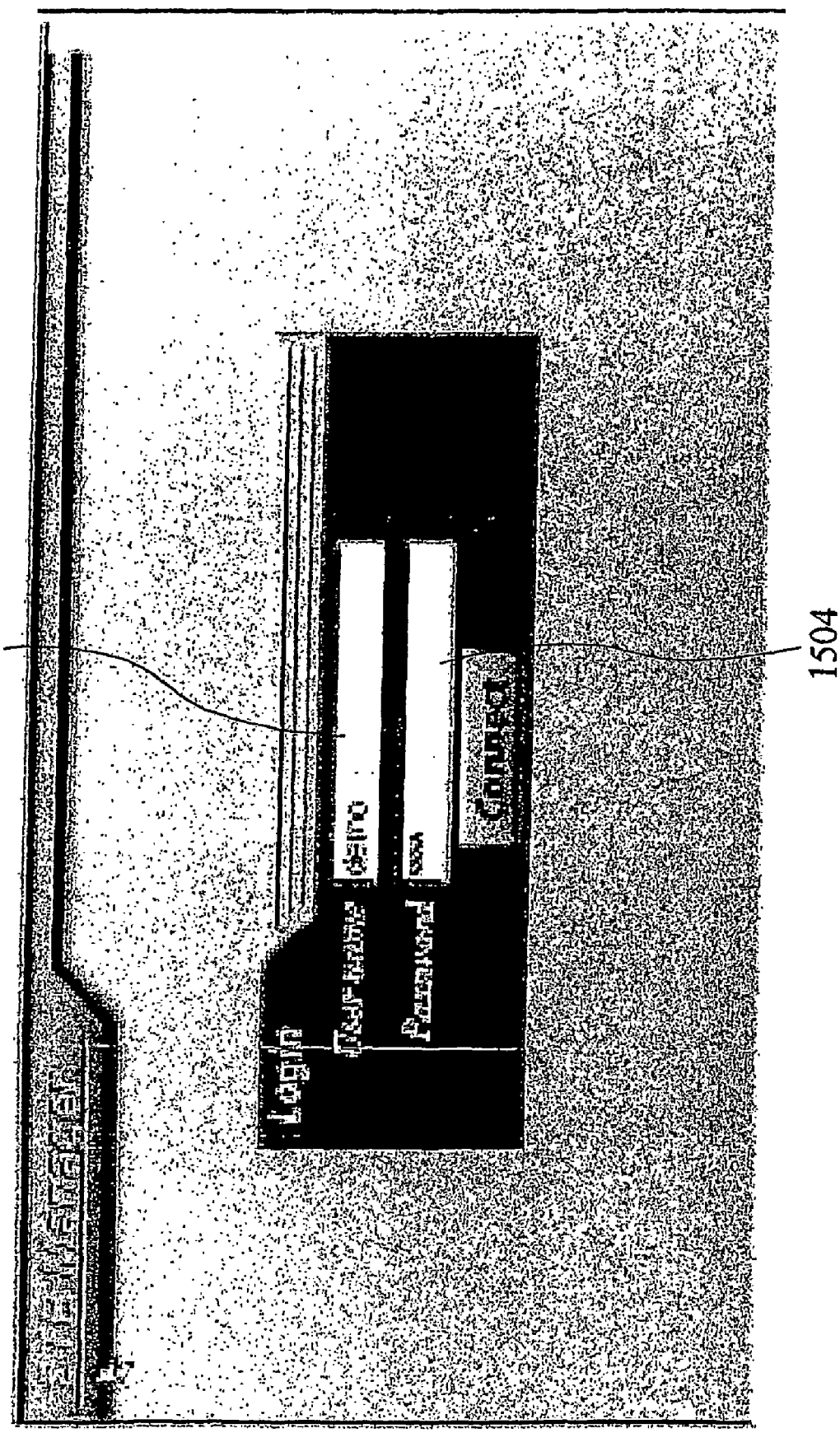
FIG. 15 is a schematic diagram of a 'Connection Window' screen display according to one embodiment of the systems and methods herein described.

FIG. 15 illustrates a screen shot of an embodiment of the Connection Window. According to a preferred embodiment, the Set-Top Box-Manager tool may be accessed by an operator by entering the correct URL in the browser bar. According to a further, optional feature, the Set-Top Box-Manager can be accessed directly either from a Customer Operations Dashboard application, for example, by clicking on 'STB-MGR' in the top bar or from a Network Operations Dashboard application, from either the Alarm Explorer or the Location Explorer. The Customer Operations Dashboard application and the Network Operations Dashboard application may comprise applications via which system or network operators may access a number of different tools, such as the STB_MGR tool, to help in fault detection or resolution.

A login window may be provided for the Communications Window, as shown in FIG. 15, at which a valid username 1502 and password 1504 are required. Text entered in the Password field may be obscured with asterisk (*) characters. If connection fails due to an incorrect username or password, a connection error dialog box may be displayed.

Figure 16:
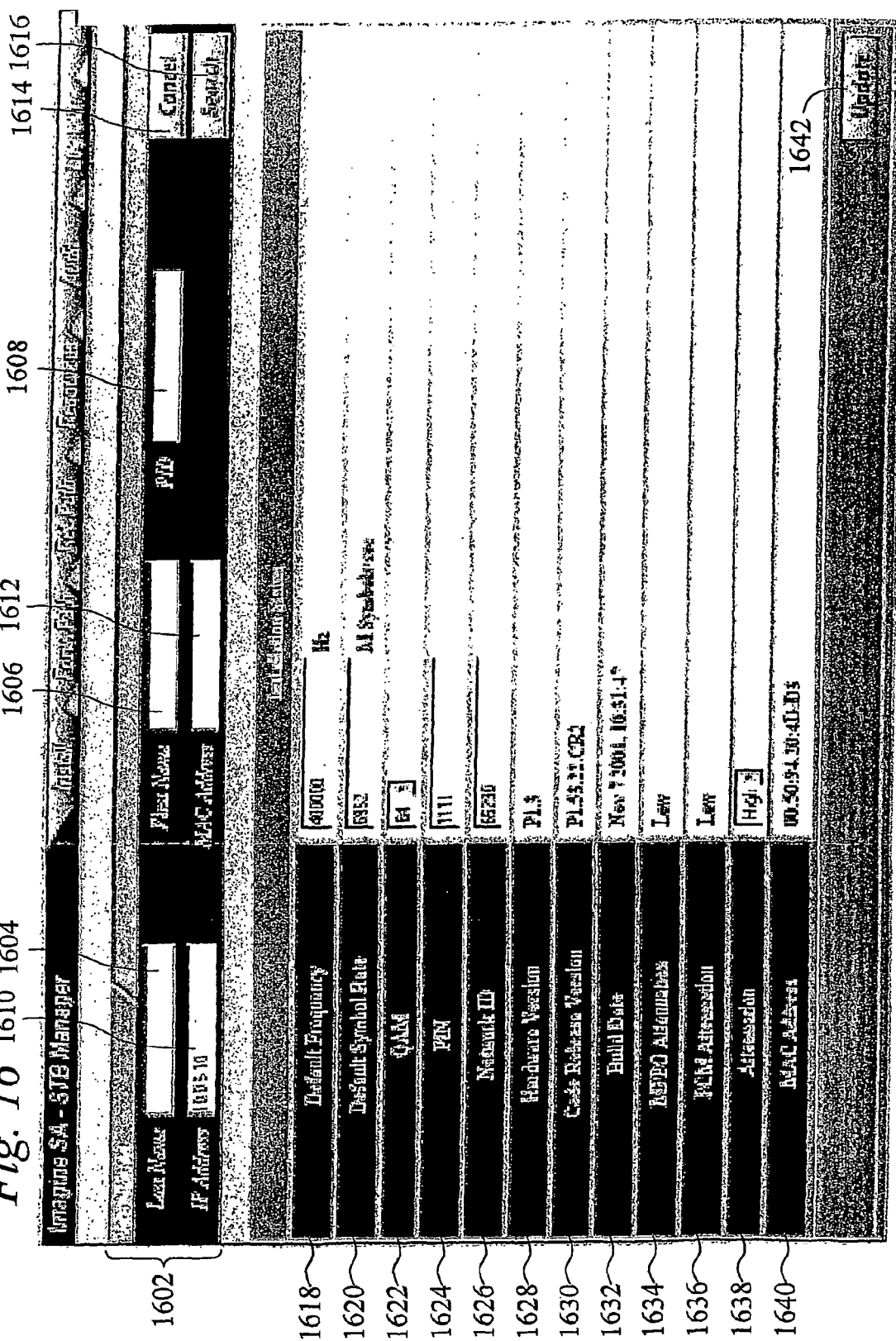
FIG. 16 is a schematic diagram of an 'Install' Results List Panel screen display according to one embodiment of the systems and methods herein described.

A screen display of one embodiment of the Main Window is shown in FIG. 16. According to one embodiment, the Main Window may be used to retrieve details from the Set-Top Box Manager (STB-MGR) based on either user information, IP Address or MAC Address or to check the status of a user's Set-Top Box.

Preferably, a Select Panel 1602 may be provided as part of the Main Window and may be used to search within any combination of selection fields such as the Last name 1604 or First Name 1606 of a user, a user's PED 1608, an IP address 1610 or a MAC Address 1612.

Preferably, at least one field must be completed to run the query and avoid an error message. A cancel button 1614 may be provided to clear the content in the selection fields. A Search Button 1616 may be used to run the query with the content of the selection fields.

As described above, the window displayed may depend on the number of users for whom details are retrieved:

If many user details are retrieved, the "matched subscribers list" may be displayed.

If the details of only one user is retrieved, the 'Install' Results List Panel for this user may be displayed.

In this embodiment, the 'Install' Results List Panel is displayed and shows the results of the query matching the selection. A screen shot of this panel is shown in FIG. 16.

The 'Installation' parameters that may be displayed for a particular user include:

Default frequency 1618: Frequency in Hz of the Home Transport Stream

Default symbol rate 1620: Rate at which the data leaves the modulator. In one embodiment, the symbol rate may be calculated as outlined below:

symbol rate=input rate rate (Mbps)*framing overhead*1/RS-rate*1/FECrate modulation factor QAM 1622: Type of Quadrature Amplitude Modulation (for example, QAM64 or QAM256)

PIN 1624: The user's Personal Identification Number

Network ID 1626: Identifies the network segment (in DVB terms) to which the STB is attached. If a subscriber moves from one region to another, he typically needs another STB ID Hardware version 1628: Version of the hardware platform Code release version 1630: Release number of the software platform Build date 1632: Download date of the software platform MPEG attenuation level 1634

PCM attenuation level 1636: Pulse Code Modulation attenuation level

Attenuation 1638

MAC address 1640: MAC address of the integrated cable modem

Update Button

In a preferred embodiment, the user can use an 'Update' button 1642 to modify only information displayed in FIG. 16 with a white background, by edition or pre-defined value selection. The parameters which it is possible to modify may include some of all of the following:

Default frequency 1618

Default symbol rate 1620

QAM 1622

PIN 1624

Network ID 1626

The Update button 1642 preferably displays a confirmation box.

Figure 17:
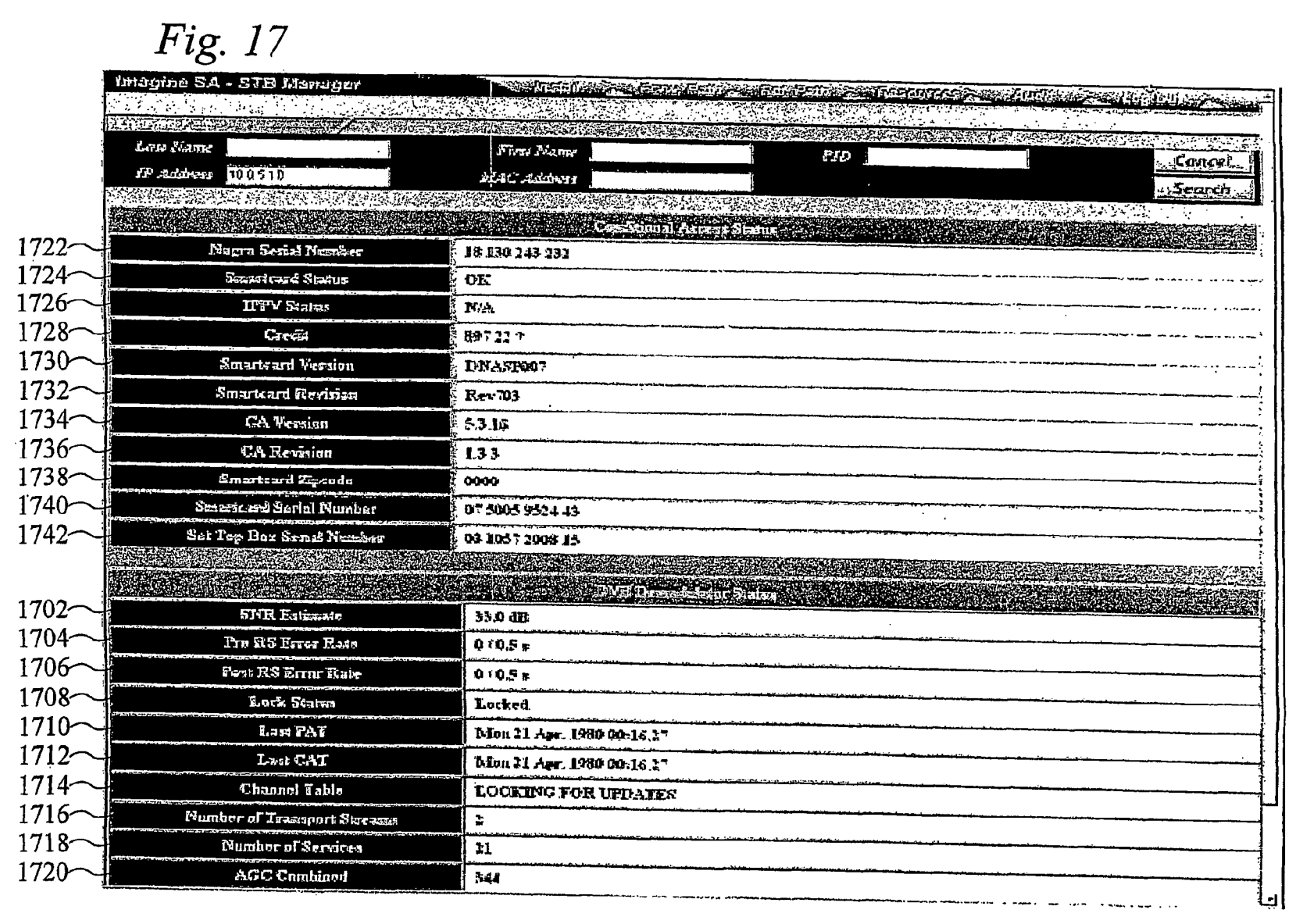

A further feature may be the 'Forward Path' Results List Panel, an example of a screen display of which is shown in FIG. 17, which may display parameters such as those outlined below:

- SNR estimate 1702: Signal/Noise estimate. Should be high if there is little noise
- Pre RS Error rate 1704: Number of errors per 500 ms before Reed-Solomon error correction
- Post RS Error rate 1706: Number of errors per 500 ms after Reed-Solomon error correction
- Lock status 1708: Indicates whether the STB is successfully tuned to a transport stream (i.e. locked to a RF carrier).
- Last PAT 1710: Last time/date when a Program Association Table was received
- Last CAT 1712: Last time/date when a Conditional Access Table was received
- Channel table 1714: Status of the channel table capture process, for example: "Looking for UPDATES" means that the STB is receiving DVB SI tables under normal conditions. If the status remains "Looking for NIT", it means the STB can not receive the Network Information Table
- Number of transport streams 1716: Number of Transport Streams available received by the STB (i.e. Transport Streams available to the configured Network ID)
- Number of services 1718: Number of video services (digital channels) available received by the STB (i.e. DVB services available to the configured Network ID).
- AGC combined 1720: Combined Audio/Video gain currently applied to the forward Path signal.
- AGC stands for Automatic Gain Control.
- Current TSD: Transport Stream ID to which the STB is currently tuned.
- Current Service ID: Service ID (i.e. digital channel) to which the STB is currently tuned.

In a preferred embodiment, at least some of the following information may also be provided in the "Forward Path Results" List Panel:

- Nagra serial number 1722: CAS (Conditional Access Smartcard) serial number.
- Smartcard status 1724: Shows the status of the Conditional Access smartcard
- IPPV status 1726: Status of theJImpulse Pay-Per-View service provision
- Credit 1728: Current credit available for Impulse Pay-Per-View
- Smartcard Version 1730: version of the Conditional Access smartcard
- Smartcard Revision 1732: Revision of the Conditional Access smartcard
- CA Version 1734: Version of the CAS software kernel
- CA Revision 1736: Revision of the CAS software kernel
- Smartcard zipcode 1738: Zipcode of the smartcard owner
- Smartcard serial number 1740: Serial number of the Conditional Access smartcard
- Set Top Box serial number 1742: Serial number of the Set-Top-Box
- Last EMM received: Dale when the last EMM was received The information displayed may be used for fault detection and resolution for systems, such as Set-Top Boxes of users.

The 'Return Path' Results List Panel may display a number of 'Return Path' parameters. An example of a screen display of the 'Return Path' Results List Panel is shown in FIG. 18. In a preferred embodiment, the parameters displayed may include:

MCNS (Multimedia Cable Network System) IP addressing
- MAC address 1802: Set-Top-Box integrated cable modem physical address
- STB IP 1804: Configured Set-Top-Box IP address
- DNS Server IP 1806: Configured domain name server IP address
- Subnet mask IP 1808: Configured subnet mask
- Default gateway IP 1810: Configured default gateway IP address
- Quality of service 1812: Current cable modem configuration file (which may be used to define the Quality of Service allocated to the STB)
- Liberate proxy 1814: IP address of the Liberate Proxy server (alternative types of Proxy servers may be used in some implementations)
- Liberate security proxy 1816: IP address of the Liberate Security Proxy server (alternative types of Security Proxy servers may be used in some implementations)
- First URL 1818: URL opened upon start-up of the browser. The browser used may depend oil the user equipment used to implement the system, for example the Liberate Browser may be used as a software platform for browsing from a television.

MCNS Downstream
- Channel frequency 1820: Frequency of the used return path downstream channel
- Symbol rate 1822: Rate at which the data leaves the return path modulator. According to one embodiment, the symbol rate may be calculated as outlined below:
- symbol rate=input rate rate (Mbps)*framing overhead*1/RS-rate*1/FECrate modulation factor
- SNR estimate 1824: Signal/Noise estimate. Should be high if there is little noise
- Pre RS Error rate 1826: Number of errors per 500 ms before Reed-Solomon error correction
- Post RS Error rate 1828: Number of errors per 500 ms after Reed-Solomon error correction
- Lock status 1830: Indicates whether the STB is successfully tuned to a transport stream (i.e. locked to a RF carrier).
- Power level 1832: Radio Frequency power level
- Assigned SID 1834: Assigned DOCSIS channel identifier (Service Identifier)

Figure 19:
FIG. 19 is a schematic diagram of a 'Resources' Results List Panel screen display according to one embodiment of the systems and methods herein described.
Figure 20:
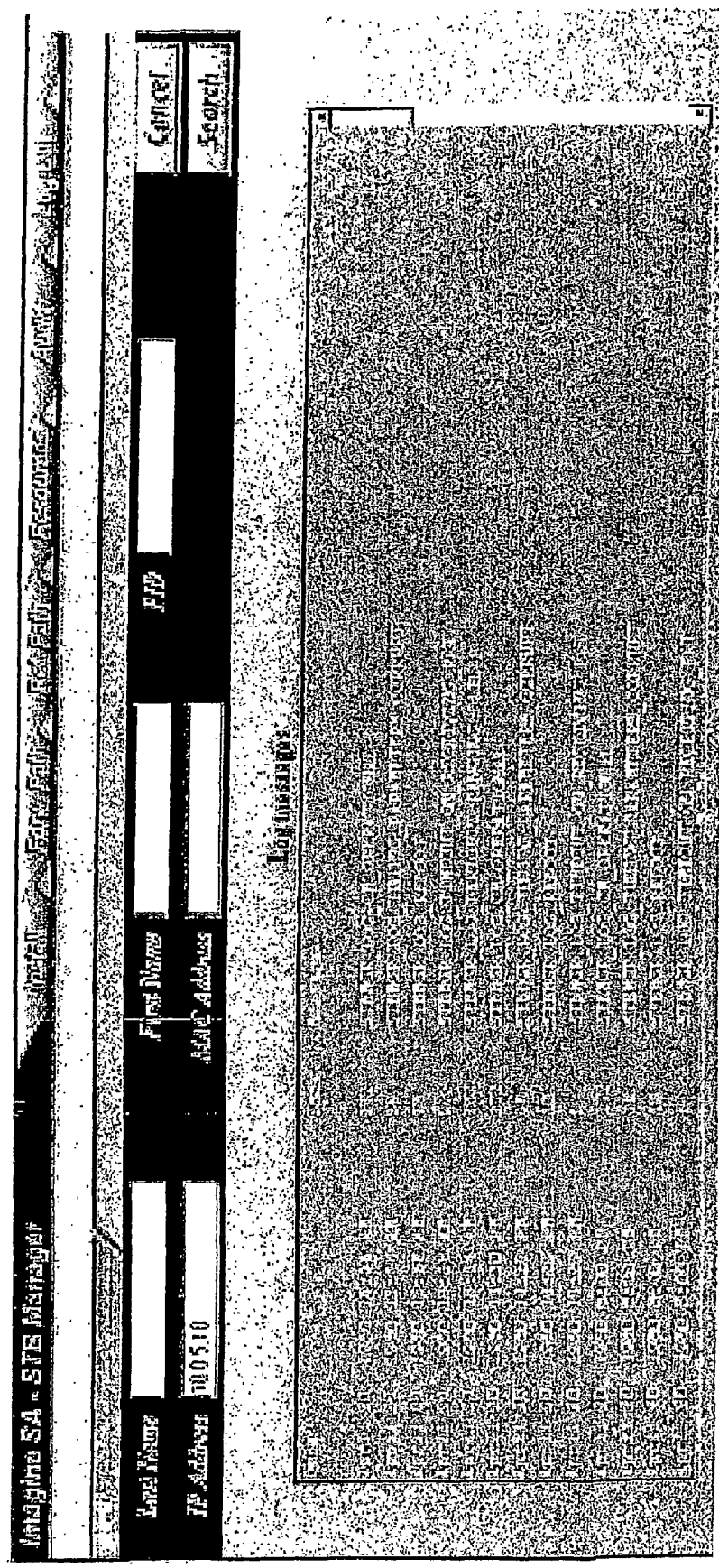
FIG. 20 is a schematic diagram of an example of a further Set-Top Box Manager screen display, which may be used to show 'Audit' information, according to one embodiment of the systems and methods herein described.

A further feature of a preferred embodiment may be the 'Resources' Results List Panel, an example screen display of which is shown in FIG. 19, which may display information such as:

- Available flash 1902: Free Flash memory currently available
- Total flash 1904: Total Flash memory available on the STB hardware
- Available RAM 1906: Free volatile memory currently available
- Total RAM 1908: Total volatile memory available on the STB hardware
- Available NVRAM 1910: Free non-volatile memory currently available
- Total NVRAM 1912: Total non-volatile memory available on the STB hardware A screen shot of the 'Audit' Results List Panel according to one embodiment is shown in FIG. 20. This panel may be used to display the list of the last status logged by the STB. In this example, the information may be formatted in 3 parts:

Date of the action in MM-DD-YYYY IIH-MM (AM/PM) Code
Messages to describe the status.
For instance:
STBMGR_LOG_REBOOT
STBMGR_LOG_CM_OPERATIONAL
STBMGR_LOG_TUNING_PARAMETERS_CORRUPT
STBMGR_LOG_PERIODIC_RANGING_FAIL
STBMGR_LOG_TIMEOUT_ON_RECEIVING_PAT
Further messages may also be provided to describe the status of the STB.

Figure 21:
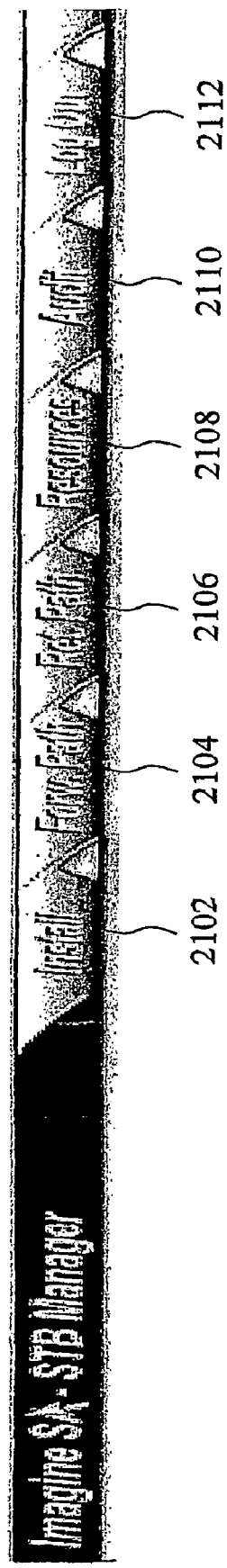
FIG. 21 is a schematic diagram of a Set-Top Box Manager Top Bar according to one embodiment of the systems and methods herein described.

The STB-MGR TopBar may contain buttons which control the overall functionality of the system. An example screen display of a Sct-Top Box Manager Top Bar is shown in FIG. 21. The buttons on the Top Bar may include:

The 'Install' Button 2102 may be used to run a query relative to the Installation information of the Set-Top Box. The selection criteria may be set in the Select Panel (as described above) and the information may be displayed. This button 2102 may run the query with the content of the selection fields. As described above, the window displayed may depend on the number of users for whom data is retrieved:
If data for many users is retrieved, the matched subscribers list is displayed.
If data for only one user is retrieved, the 'Install' Results List Panel for this subscriber may be displayed, as described earlier with reference to FIG. 16.

The 'Forw. Path' Button 2104 may be used to run a query relative to the Forward Path information of the Set-Top Box. The selection criteria may be set in the Select Panel (described earlier) and the information may be displayed in the 'Forward Path' Results List Panel (described earlier with reference to FIG. 17).

The 'Ret. Path' Button 2106 may be used to run a query relative to the Return Path information of the Set-Top Box. The selection criteria may be set in the Select Panel and the information may be displayed in the 'Return Path' Results List Panel (described earlier with reference to FIG. 18).

The 'Resources' Button 2108 may be used to run a query relative to the Resources information of the Set-Top Box. The selection criteria may be set in the Select Panel and the information may be displayed in the 'Resources' Results List Panel (described earlier with reference to FIG. 19).

The 'Audit' Button 2110 may be used to run a query relative to the Audit information of the Set-Top Box. The selection criteria may be set in the Select Panel and the information may be displayed in the 'Audit' Results List Panel (described earlier with reference to FIG. 20).

The 'Log Out' Button 2112 this may be used to close the current STB-MGR session and open a new Connection Window.

A summary of the functionality of one embodiment of the STB-MGR is provided below:

The STB-MGR may be used to increase call centre efficiency by facilitating remote operations and reducing manual transfers and interventions. The functionality of a preferred embodiment of the Set-Top-Box Manager may include:
Monitoring the status of a particular Set-Top-Box by sending a request to the STB directly with any of the following being used as input criteria: STB MAC address, STB IP address or subscriber name/PID. As described above, the following sets of data may be retrieved from the STB:
Installation parameters
Forward path parameters
Return path parameters
Resources information
Audit information.
Polling a set of selected Set-Top-Boxes for a given period of time in order to gather history of STB utilisation.
Selected STB may be polled at a regular interval for a defined duration (customisable)
The polling feature may be limited to a configurable number of simultaneous STB to be polled.
The data generated by this polling may be stored for a configurable time period in a separate database or until extra space is needed to store more recent data.
A web-based application may allow operators to view, over the polled time period, utilisation of:
STB Memory
Channels
Transport Stream ID
Service ID In a preferred embodiment, the managed information may include:
Installation parameters
Default frequency*
Default Symbol Rate*
Modulation type*
PIN*
Network ID*
Hardware version
Code Release version
Build date
MPEG Attenuation
PCM Attenuation
Attenuation*
Mac Address
Forward path parameters
Conditional Access Status
Nagra Serial Number
Smart card Status
IPPV Status
Credit
Smart card Version
Smart card Revision
Conditional Access Version
Conditional Access Revision
Smart card Zip Code
Smart card Serial number
Set-Top-Box Serial Number
Last EMM received: Date when the last EMM was received
DVB Demodulator Status
SNR Estimate
Pre-RS Error Rate
Post-RS Error Rate
Lock Status
Last PAT
Last CAT
Channel Table
Number of Transport Streams
AGC Combined
Return path parameters
MCNS IP Addressing
Mac Address
STB IP Address
DNS Server IP Address
Subnet Mask IP Address
Default Gateway IP Address
Quality of Service Liberate Proxy
Liberate Security Proxy
First URL
MCNS Downstream
Channel Frequency
Symbol Rate
SNR Estimate
Pre-RS Error Rate
Post-RS Error Rate
Lock Status
Power level
Assigned SID
STB Resources information
    Available flash memory
    Total flash memory
    Available RAM
    Total RAM
    Available NVRam
    Total NVRam
Audit information
    Log of the last STB operations (Date/Code/Operation . . . )
(Preferably, appropriate installation parameters (*) can be updated directly from the STB Manager front-end (reload of the right Set-Top Box configuration file).)

The Architecture of a preferred embodiment can be summarised as follows with reference to FIG. 22: The STB manager is preferably implemented as a distributed web based application. It may be deployed centrally for a small amount of STBs to poll but could be distributed as the number of polled cable modems increases. The preferred STB manager may be implemented in conjunction with its own database to store historical data polled from cable modems.

FIG. 22 shows one embodiment of an STB manager with a distributed solution.

This may provide the advantage that the number of STB that can be polled by this solution is greater than in a centralised solution. Only infrastructure elements relative to the STB Manager are shown in FIG. 22.

Any convenient hardware and software platform may be used. Purely by way of example, a Unix platform may be used, and this may be conveniently based on readily available components. Hardware and software resources required are not excessive and, for example, a commercial deployment may be implemented readily using the hardware and software below (or equivalents).
Hardware for STB manager:
    Sun E420
    1×450 MHzCPU
    1 Gb RAM
    2×17 Gb disk
Additional software required for STB manager
    Apache 1.3.19
    Tomcat 3.2.1
    JVM 1.3.1
    Solaris 7 or 8
    Database: Oracle or any SQL-compliant database A further feature of one embodiment of the present system may be the Digital Subscriber Line modem manager. The DSL modem manger may allow an operator to view the status of each VPN subscriber's DSL line and modem. For example, when an ADSL CE router is provisioned in the database, a DSLAM port must be assigned for the customer and using DSL modem manager it may then be possible to gather information. Examples of the information which may be gathered may include one or more of: the customer name, the port on the DSLAM, the port status, the modem SNR US/DS, a 5 minutes average input/output rate and bytes input and output. The invention independently provides a method comprising gathering status data from a DSJ modem connected to a broadband comprising communicating with the modem or an agent associated with the modem over the network.

A further feature of the system described above may be the VPN MPLS network manager. Using the network view of MPLS network manager, it may be possible to browse, for example: PAD (PACA), POP (Antibes), PE router (PE4).

The network view of the network manager may also be used to show the VPN logical view functionality that displays, for example, VPNs from the OSS database and VRFs that are auto-discovered from the PE.

The network view of the network manager may also be used to show, for example the PE router's:
    CPU (MRTG)
    Memory (MRTG)
    Interface bandwidth utilization per physical interface. Show the button that can be used to define target max aggregate bandwidth for the physical interface
    Number of sub-interfaces per physical interface. Show the button that can be used to define target max number of sub-interfaces per interface
    Total number of VRFs (target max VRFs can be edited by clicking on a button)
    CEF statistics (show ip cef summary)

The customer view of MPLS network manager may be used to browse, for example: Customers (B), VPNs (VPN B), PE routers and CE routers.

When on the PE router level one can view the same data in the customer view as in the network view, an example of which is provided above.

All of the above features are advantageously provided in an exemplary network manager; however, features may be omitted in a simplified embodiment.

A further feature of the present embodiment may be the ISM VPN, which may advantageously be implemented using one or a number of agents. Each agent may monitor the network for, for example: VPN connectivity, VPN Performance, Centralized services, Management VPN and Audit & accounting.

In a preferred arrangement, which may be independently provided, at least one agent is provided, the agent comprising means for accessing a service and means for signalling an alarm in the event of detection of a fault condition. By providing an agent which accesses a service, potential or actual faults may be more reliably or rapidly identified as compared to detection of a hardware failure and subsequent determination of affected services.

For each alarm that may be generated by ISEA VPN, each ISEA may be able to detect connectivity, performance, management, audit and centralised service problems independently. Five different scenarios that simulate each type of problem will now be described by way of example.
VPN Connectivity Alarm A VPN connectivity alarm may be generated by making a CE router unavailable. This may occur if, for example, the CE router's Ethernet connector is physically unplugged. In this situation, ISM may be configured to generate a VPN connectivity alarm.
Performance Monitoring A performance alarm may be triggered, for example, when the data is beyond "acceptable" levels, for example, the system may be set up to trigger a performance alarm when data is being processed at a slower rate than it is being received. Rate limiting may be disabled from the VPN to make performance acceptable. Preferably, the disabling of rate limiting may allow the alarm state to be overcome within 1 minute.

VPN Central Services Monitoring

A central services alarm may be generated in the ISM in certain situations, for example, if the ISEA is continuously monitoring central services (email and www) offered from the operator's central services site and the central services www server is shut down, a central services alarm may be generated. Preferably, when the www server is resumed ISM central services monitoring should return to green status in less than 1 minute.

Management Network Monitoring

The ISEA may include management VPN monitoring that can check on the status of the management VPN by continuously pinging the management network central router. A management services alarm may be triggered if, for example, the IP address of the management router is de-configured. If the management services router is subsequently re-configured, ISM central services monitoring preferably returns to green status in less than 1 minute.

Audit & Accounting

Using ISEA MPLS, examples of statistics that may be gathered for each VPN include:

Total uploads/downloads for each CE router using Netflow

Analysis of traffic patterns using netflow.

A further feature of an embodiment may be the Imagine Component Fault Manager (ICFM). An ICFM view may show an inventory with a map of the network of the system. The ICFM may be implemented as a client of the inventory manager that is described in more detail later.

A Knowledge Management System (KMS) may be implemented as part of the ICFM, it may be possible to right click on "documentation" for a given PE router to show the documentation associated with the device. Further, a component alarm may be generated by shutting down the PE-PE core link on PE3. This alarm, and the documentation associated with the alarm may be shown within the ICFM. The documentation linked to the alarm may also be modified within the ICFM.

A link to a configuration manager may also be provided for each PE router, for example it may be possible, for a given PE router, to click on "Configuration manager" to be taken to the "Configuration Manager" application and to view the configuration file of the PE router. A link to an inventory manager in the ICFM, outlined in more detail below, may also be provided and may be used to be taken to the inventory manager application An inventory manager may further be provided in which it may be possible, for example, to add a new PE router (for example, PE 5 of type Cisco 3662) to the Sophia Antipolis POP. Equipment can be auto-discovered by, for example, running an auto-discovery script. A file may be generated to populate the database.

As part of the resource management of the inventory manager, it may be possible to define a pool of IP addresses by adding a new pool of IP addresses. Utilization statistics on the pools of IP addresses and the pools of RTs, RDs, VLANs, ASN numbers may be viewed.

A further feature of one embodiment of the present invention may be a Configuration Manager, which may allow the use of template configuration files. New template files may be added to the template manager.

Further, the configuration file may allow the display of configuration files of routers in the system and may allow the version history of configurations on routers to be displayed.

HSD Agent

One embodiment of an agent that may be used in conjunction with the system and methods described herein is a High Speed Data (SD) agent. The HSD agent may be implemented as a standalone system, or may be implemented alongside other aspects of the system described herein. The HSD agent preferably allows a HSD network operator to monitor services as they are delivered to the service user, i.e. in the "last mile". In particular, the agent may provide remote visibility of all critical parameters involved in the High-Speed Data service.

According to one embodiment, the agent is physically located as one agent per HUB. The agent may provide sophisticated, permanently-running scenarios to simulate extensive HSD end user activity. The simulated user activity may include simulating some or all of the following:

Provisioning process

Internet access

ISP access

Security checks

The agent may further provide:

Easy configuration of scenarios in XML language

Logging of service outages to local files

Integrated Web Server for Service Monitoring

Specific check on request

Failure diagnostics.

Interface to any external SNMP manager (e.g. HP OV, or Spectrum)

Figure 58:
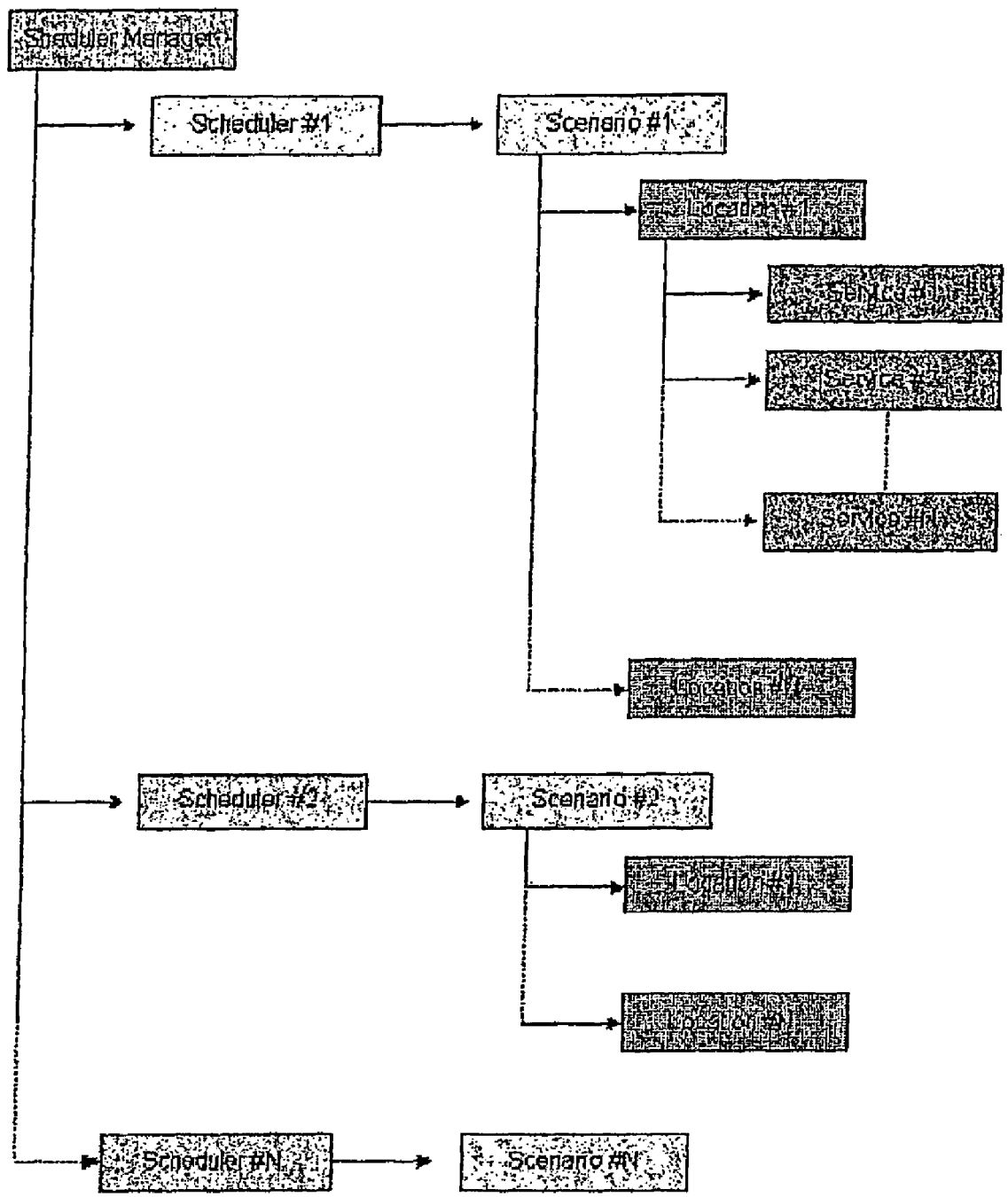
FIG. 58 illustrates one embodiment of the scenario organisation for a HSD agent according to one embodiment of the systems and methods described herein.

The architecture of the HSD agent preferably allows the agent to operate as close to the customer as possible. A scheduler may be used to supervise the launching of the Service Emulation scenarios. According to one embodiment, these scenarios test parameters involved in the nature of the service; regardless at this point to the access technologies or the state of the network components involved in the transport. FIG. 58 illustrates one embodiment of a scenario organisation for a HSD agent, controlled by a scheduler manager.

The HSD agent may be implemented on a number of different hardware and software systems. Typical implementations may run on, for example Linux Red Hat 7.1, Java JDK 1.3.1, Apache 1.3.20, Tomcat 3.2.1, NetSaint plug-in. According to one embodiment, hardware requirements may include 2×17 GB Disk, Pentium 3 750 Mhz processor, 256 Mo RAM, 10 GB and 2 Linux compliant Ethernet Cards.

The IP Address Manager

A further aspect of the systems and methods described herein is the IP address manager. The address manager may allow a service provider to optimise resource allocation within the network, wherein the network may be a multimillion address network. The IP Address Manager may be implemented as part of a suite of Network Management Tools or may be implemented as a stand-alone, vendor agnostic produce. The address manager may allow a service provider to track the use of every single IP address and to centrally manage entire scopes of IP addresses in a single operation. According to a preferred embodiment, the Address Manager satisfies both legal requirements and security procedures requiring a detailed monitoring of suspected access to restricted resources on the network.

The IP Address Manager is preferably implemented with at least one of the following management functionalities:

Identity Management may enable instant access to the name, type, location, domain name of every single IP address currently in use in the network, as well as providing an history of the usage of any IP address.

Scope Management may provide a series of tools that enable the service provider to analyse the allocation of ranges of IP addresses. The IP Manager may display the percentage of IP addresses allocated per DHCP server, which may enable proactive balancing steps to be taken before service failure. Scope Manager may also enable a provider to edit, remove and add any fraction of the IP range anytime and anywhere, providing full control of, for example CMTS, access servers, DHCPs, UBRs and DSLAMs.

According to one embodiment, Domain Name Server Management is constituted of a series of functionalities which may be used to verify the integrity and the reversibility of the association of an IP address to a domain name.

Preferably, the IP manager may be implemented with reporting capabilities, including graphic and statistic features and may also interface with third-party reporting software.

Figure 59:
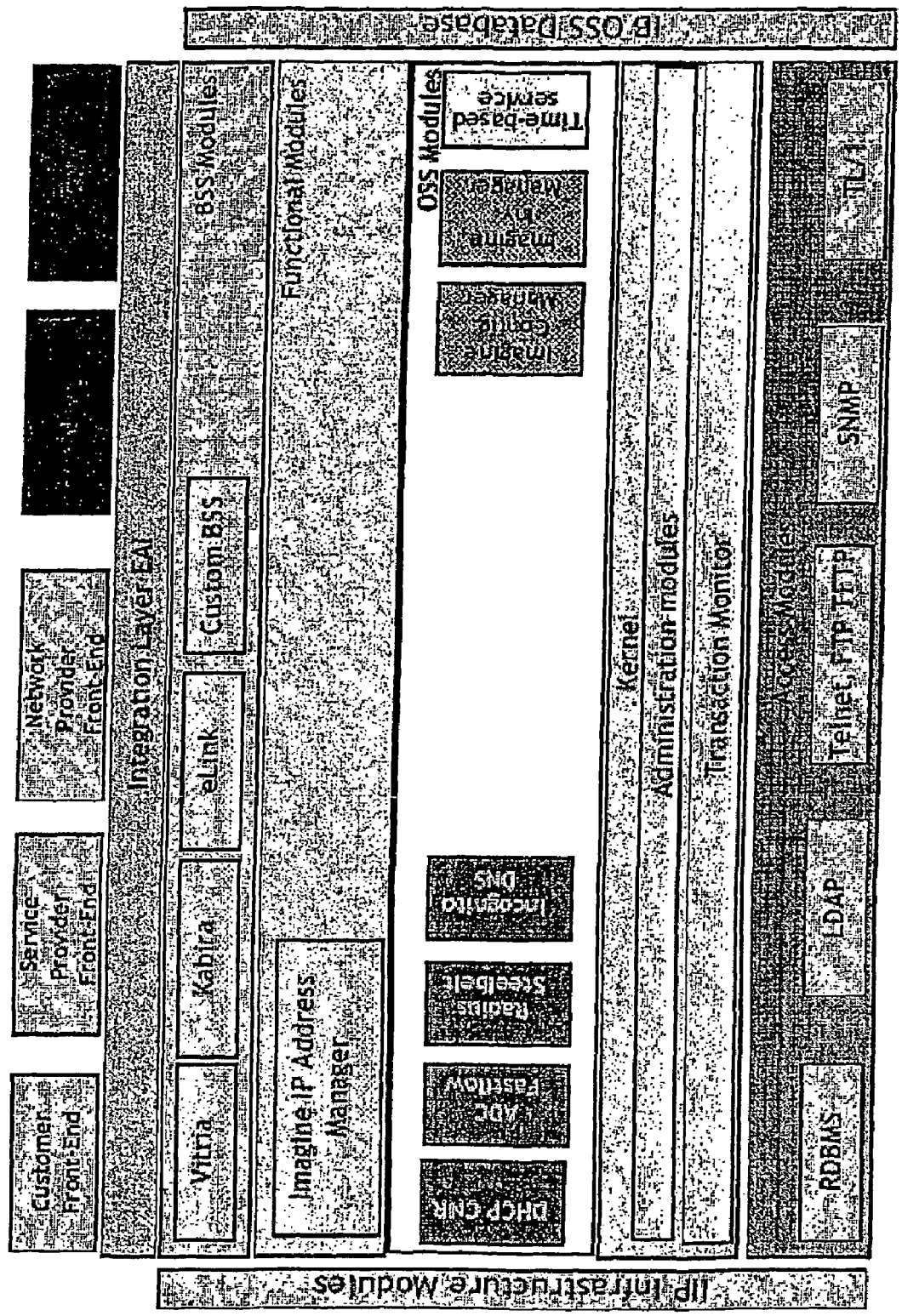
FIG. 59 is a schematic diagram of the IP address manager integrated into a service assurance suite according to one embodiment of the systems and methods described herein.

The IP Address Manager may be implemented as part of a suite of service assurance tools and so is preferably implemented with a modular architecture. The integration of the IP address manager into a service assurance suite according to a preferred embodiment is illustrated in FIG. 59. The IP Address Manager is preferably located in the Network Operation Centre since the ability of the tool to manage a multimillion address network makes it a centrally based application. The IP Address Manager is preferably implemented with a Graphical Interface, which may allow context-sensitive help to be provided to the network engineers at each step. Examples of the information provided in the context sensitive help may include: the exact page containing the relevant hardware vendor documentation, in-house recovery procedures and reminders of the technical and business rules.

Operational Integration with BSS Modules

Integration with BSS elements may allow the IP Address manager to manage multiple logical groups of users, which may be used to allow usage-based billing for dedicated services. Usage-based billing may be provided to a user by collecting and tracking IP address assignments and linking each address to a billing location or group. This seamless integration may allow the service provider to manage large-enterprise customers, offering them differentiated services through organization-based IP address management capabilities. Multi-group membership for a single customer may be implemented to allow customised services for individual users.

Scope Management

Analysis tools may be provided by the IP Address Manager to enable pro-active balancing of the network resources and to anticipate potential service disruption. The scope management function may be used to collect statistics about utilisation per DHCP, RADTUS servers. The administrator can set thresholds on IP address scope to generate alarms within a Component Fault Management tool (ICFM). Based on these statistics, the network administrator may reserve and assign IP address across networks, domains and subnets. The scope management feature may allow the service provider to edit, cut and add IP address ranges, or fractions of ranges, and update the scope of IP addresses on the DHCP and RADIUS servers from a central location.

Inventory Capabilities

In order to cope with the proliferation of 1P addresses and equipment in the broadband environment, the IP Address Manager preferably provides a view of a large proportion of the IP infrastructure. The IP Address Manager may allow views by subnet, and may support Variable Length Subnet Masks (VLSM) to handle subnets in the most flexible and effective way. "Per location" and "per type of equipment" views may also be provided in addition to or instead of the per subnet view. The module may further allow the management of all component IP addresses and subnets with detailed component configuration from a given IP address (name, type, and location). This granularity and flexibility in the views may allow cost effective resource management capabilities. IP Address Manager can reserve and assign subnets. IP address management may also allow quick and easy re-arrangement of the subnets, reflecting the frequent changes in the network organization.

Policy and Class-of-Service Management

The IP Address Manager may interfacing to DHCP and Radius Servers to offer the capability to create Classes-of-Services and Policies. Policies may be used to create consistent subnet addressing schemes within multiple sublets, helping to ensure efficient network management and simplified administration. Sub-addresses ranges can be dedicated to different types of cable modems or tiered client classes. Policies creation or modification may be reflected in the service provider billing elements.

DNS Management

The DNS Management functionality may allow the service provider to check the availability of an IP address in the DNS server, which may allow the service provider to identify potential causes of service disruption. According to one embodiment, Incognito's IP Commander DNS solution may be used with IP Address Manager interfaces for DNS Management. The IP Address Manager may allow reverse/forward query matching in order to check the IP/Domain association. As a logical complement to its subnet capabilities, the IP Address Manager may also be used to manage DNS Zone and Domain allowing the necessary granularity to differentiate services.

Typical hardware requirements which may be used to implement the IP Address Manager system may include: Sun E420, 1×450 MHz CPU, 1 Gb RAM and 2×17 Gb disk. Software Requirements for a typical embodiment nay include: Apache 1.3.19, Tomcat 3.2.1, JVM 1.3.1 or Solaris 7 or 8.

An outline of further features that may be provided as part of the IP address manager system is provided below. Some or all of these features may be provided in some embodiments of the system.

Included or Supported servers/services may include: DNS/DDNS BIND 8.x compliant, DHCP, RADIUS and SNMP.

Data storage may take the form of relational database support (e.g. Sybase, Oracle or another relational database) or a directory service (LDAP Support) (e.g. NDS, Netscape, University of Michigan or another directory service)

Data may be imported using, for example DNS zone files, Unix/etc/host files, BOOTP, User-defined/program-defined system. Similarly, data may be exported using DNS zone files, BOOTP/DHCP, Unix/etc/host files, a user-defined text-based format or a program-defined custom format.

DHCP services may include: multiple subnets/segment, dynamic DNS update, ping testing before assignment, assign based on MAC address, global templates, template per subnet/by logical group, view active lease information, variable length subnet masks (VLSM), user-to-address mapping, failover DHCP Services, static IP @ assignment & reservation, assignment of PC IP addresses based on CM (i.e. access portal) rights, IETF Draft Standard lease query & inverse lease query, support of source verify DHCP to prevent IP @ spoofing.

DNS services may include dynamic DNS, incremental DNS updates, direct DHCP integration, GUI management, BIND forwarder/zone updates, integration of infrastructure db with DNS.

Management may take place over: web management, Java management tool, native NT management tool, native UNIX management tool, SNMP MIB, Reporting/Reporting Tools.

Reporting features may include: IP Address by device/object, Reserved objects, Dynamically allocated objects, DHCP server status, By administrator, By domain, By subnet, Audit, User-customizable, Service take-up/churn rate per service per location, IP address statistics per location, IP address statistics history per location, Fault impact analysis with impacted subscribers, CMTS management (flap list, segmentation), Security audit, Automatic TTS creation.

Remote access may also provided via, for example, Windows 95/98/NT/W2K clients, HTMUServlet w XML/XSL, Java applet, Telnet, X-Window, Other features of the IP Address manager may include: Centralised IP @ mgt for infrastructure components, Centralised IP address inventory for subscriber address pools, Command line interfaces, Application programming interfaces, Full E2E service monitoring, IP address by subscriber ID (real time), IP address history by subscriber ID, CSR can view real time service status per location, CM management.

VPN Service Assurance

A further tool which may be implemented in conjunction with the systems and methods described herein is the Service Assurance (ISA) suite for Virtual Private Networks (VPNs)

The ISA suite is preferably arranged to monitor the VPN service that is supplied to a user. This service may comprise a number of different VPN technologies, such as Layer 3 MPLS (Multi-Protocol Label Switching), IPSec (IP Security) and Layer 2 MPLS (Martini and Kompelia). This may allow the ISA to be integrated easily into existing systems and to work with existing technologies. The service is preferably monitored by monitoring a series of key indicators of the health of the service which is delivered to the user. This may be advantageous over the disjointed prior art systems which use a series of technical alarms generated by numerous network management systems to monitor the systems. The ISA suite may also be used to simulate complex scenarios relating to the delivery of the VPN services and so test VPN service delivery.

The service assurance aspect may be provided independently or may be integrated with other system components disclosed herein, for example, the ISA may be integrated with a system provisioning too.

Figure 60:
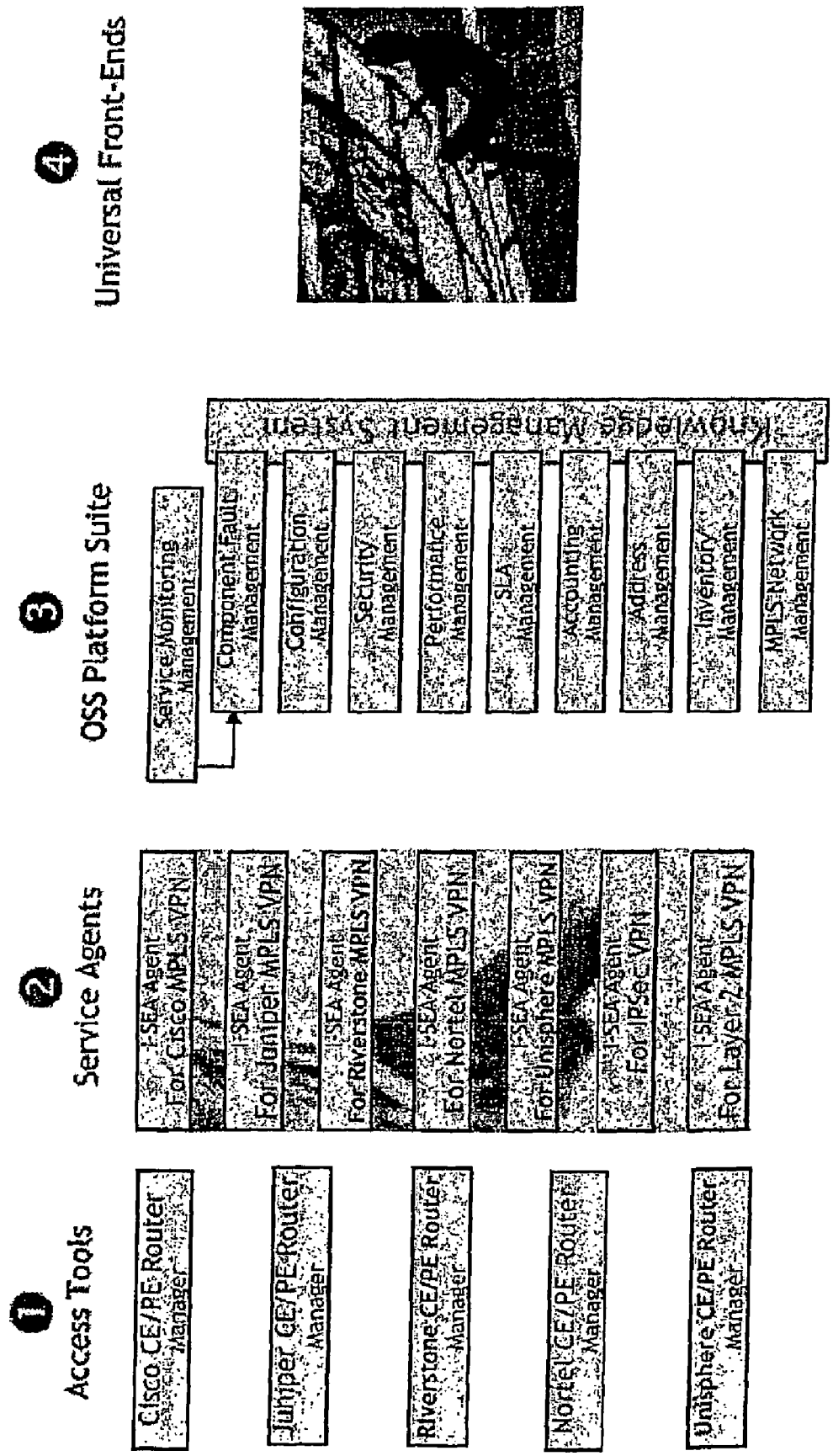
FIG. 60 is a schematic diagram of an overview of one embodiment of the architecture of the VPN service assurance suite.

The architecture of the ISA is preferably modular so that the ISA may be based on a series of modular elements that may work together for the monitoring of the end-to-end performance of VPN services. An overview of one embodiment of the architecture is shown in FIG. 60 in which Customer Edge (CE) Router Managers offer full access to VPN elements, Service Agents monitor VPN services' key features, and the Service Fault Management platform correlates the different OSS elements to simplify the outage resolution from universal graphical frontends.

A further aspect of the VPN monitoring ISA suite may be I-SEA stand-alone systems (or Agents). The agents are preferably located in the network provider Point-of-Presence (POP) and may be used to test and monitor the VPN services and their provisioning.

According to one embodiment, the I-SEA redundant principle is based on "round robin" sophisticated scenarios where the features of the created VPN link may be tested and where end-user activity may be simulated.

According to a preferred embodiment, the agent can test, for example Provider Edge (PE) and CE links, IPSec tunnels, security, QoS, performance by Class-of-Service and central services (mail, internet access, VoIP, etc). The agent may also be used to monitor management links and services. The agent may also monitor a user's IP service within a VPN and within a wide range of protocols (for example, HTTP, ICMP, SMTP and POP). Agents may be implemented for MPLS and IPSec-based VPNs as well as Layer 2 MPLS (Martini and Kompella). Agents are preferably implemented to run on standard PCs running, for example, a Linux operating system.

According to a preferred embodiment, network providers can create scenarios based on the Class-of-Services (Diff-Serv) that the used in the network or that are required by the user.

The agent may be implemented to monitor that the VPN user has access to the service or services that they are entitled to. Hence the agent may be implemented in a flexible manner. Use of the agents may provide the advantage that Service Level Agreement (SLA) metrics associated with the offered VPN can closely match the proposed services whatever the standardized technology in the network.

An agent may implement test scenarios in order to test the VPN network and service provision in the network. Preferably, an agent can execute up to 10 scenarios per minute. A web interface may further be provided to offer direct access to manage and create the scenarios.

As discussed above, the agents may he integrated into existing networks (such as IIP VPN (Itinerant Internet Protocol VPN) networks) and may be added to existing service assurance suites to enhance network monitoring and reporting capabilities.

Figure 61:
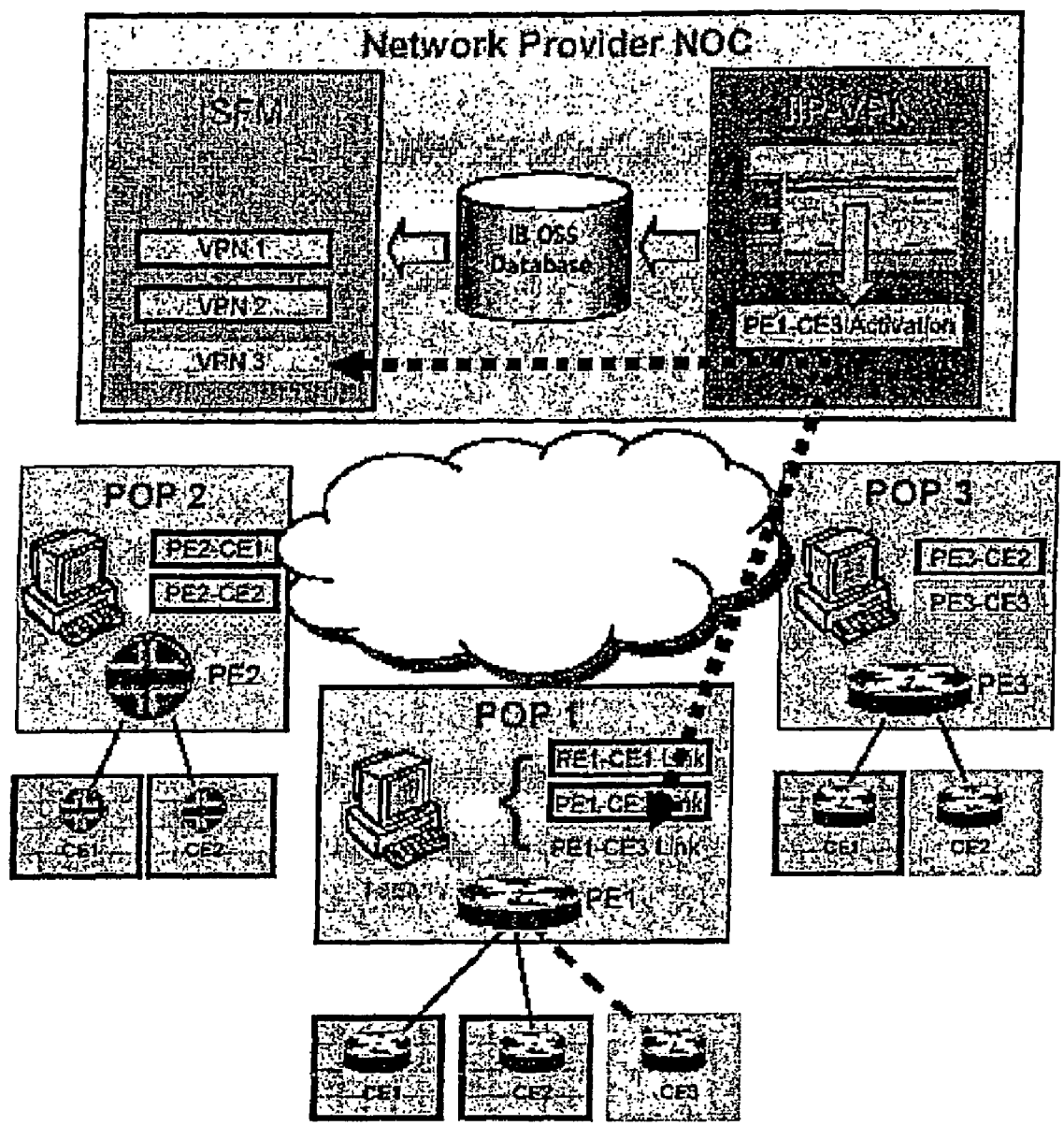
FIG. 61 illustrates one embodiment of the operation of an agent on provisioning of a new PE-CE link.

According to a preferred implementation of the system, once the MPLS PE-CE link or the IPSec tunnel is provisioned by IIP VPN, the operator can automatically activate its monitoring with the agent. One embodiment of the operation of this process is illustrated in FIG. 61 in which the agent is asked to monitor a new PE-CE link, which allows a Fault Management module to monitor the VPN enhanced by this new link.

The IIP VPN module may use a template scenario in relation to the provisioning (Class-of-Service, central services etc). In this case, the activation of the agent may be performed in the same seamless workflow. A single agent may be used to monitor multiple VRFs (VPN Routing/Forwarding instances) on a PE. The switch from one VRF to another may be implemented immediately and, preferably no configuration manipulation on the PE is required.

According to a further preferable embodiment, for the purpose of local maintenance the reports are accessible from a local web-based interface, the CPE Router Manager or from a third party system such HP OpenView or Spectrum via SNMP.

The agents are preferably integrated within the ISA Suite for VPN to allow the alarms to be remotely collected by a Service Fault Manager (ISFM), which is described in more detail below. The ISFM may be used to compile the results from all agents and may provide audit and accounting reports for example, by VPN domain, by customer, or by site.

While agents may be used to monitor the performance of the PE and CE links, a centralised module may also be implemented as part of the system to monitor the VPN service as a whole. A key role of the Service Fault Manager's (ISFM) is to manage the agents and to compile results from all Service Emulation Agents (I-SEA) and deliver a consistent view of the VPN service performance for various purposes. In the VPN services context, ISFM is preferably located centrally and may be used to monitor, for example:

- VPN connectivity, coordinating tests of each PE-CE link to ensure VPN connectivity. ISFM preferably supports full-mesh, hub-and-spoke or mixed topologies.
- VPN network performance, coordinating tests of each of PE-CE link (for example delay, packet loss, jitter)
- access to central services like internet access, mail, VoIP gateways etc.
- access to management services The ISFM's functions may include:

- View of the VPN service outages, for immediate maintenance actions.
- View of VPN service alarm details (e.g. time, date, subscribers). ISFM may also enable the creation of alarm severity thresholds based on percentage of impacted subscribers, the percentage of impacted gold subscribers, etc.
- Access to alarm specific documentation, e.g. linking up to a Knowledge Management System (KMS). From a service outage, die ISFM may list all the suspected network elements (physical or logical). The KMS, as described herein, links the platform components to relevant documentations (for example, vendor manuals, URL, procedures, test cases/results, engineering documents). It may also be used to link service alarms to the database which preferably provides a full description of each service alarm, a list of recommended actions to be taken by the user (operator, corporate client), and a list of documents related to the service alarm (URL, procedures, engineering documents). Finally, the ISFM may link the component alarms to the database which preferably provides a full description of each component alarm, a list of recommended actions to be taken by the user (operator, corporate client) and a list of documents related to the service alarm (URL, procedures, engineering documents etc).

- Performance of audit and report on daily, weekly or monthly periods for SLA per VPN domain, per customer or customer site.
- Display of the list of the inpacted subscribers when interfaced with the IP database (or an external database), with details about their Class-of-Service (CoS) and the service they should be granted. This may allow pro-active customer care and prioritized resource allocation.
- When interfaced with Imagine Component Fault Manager (iCFM), ISFM may perform con-elation with Component Alarms to identify and short-list the suspected cause of the service outage.
- In one embodiment, ISFM can be interfaced with a Trouble Ticketing system (i.e. Clarify) for the automatic creation of trouble tickets based on the severity of the service alarms.

The monitoring results are preferably accessible from two types of web-based presentation modules:

- Service Operation Dashboard (SOPs) for the Network or Service provider
- Customer Operation Dashboard (COPs) that may be offered by the network provider to the end user as an enhanced SLA feature. COPs may be implemented to offer direct access to some service assurance reports.

According to a preferred embodiment, both SOP and COP offer drill-down and graphical views of the VPN and sites, identifying the failing links and elements, for example by colours.

For full automation of the VPN service provisioning process, the JSFM may be interfaced to IIP VPN. When a PE-CE link is provisioned in IIP, IIP may generate the necessary instruction for the proper I-SEA agent to monitor the new PE-CE link with the right scenario and for ISFM to compile the results of this monitoring in the proper VPN.

When Service Fault Manager (ISFM) identifies a deterioration or an outage in the VPN services, ISFM may use a Component Fault Manager (ICFM) to shortlist the components potentially involved in the event. The ICFM preferably allows operators to collect and manage all platform component alarms from a single point. Correlation Engines may be used to correlate service alarms with component alarms to determine the component responsible for tle failure. ICFM can collect component alarms from any standard industry Element Management Systems (EMS) such as HP OpenView, BMC Patrol, IIP ITO, Micromuse Netcool, Compaq TeMIP, CiscoWorks or OSI NetExpert.

According to a preferred embodiment, a Java-based Presentation Module provides a sophisticated user interface designed for Network Operators and Administrators (NOPs). Types of views available may include:

- Location Explorer View: a graphical view of the platform network.
- Alarm Explorer View: a view that shows the details of VPN services and their component alarms.

ICFM preferably allows reporting of component outage per vendor, equipment type, location or period and the ICFM preferably interfaces with KMS to help fixing the problem.

A Correlation Engine may further be provided to allow fault and problem management through, for example:

- Correlation from service alarms to component alarms. From a service alarm, die correlation engine may determine the platform components that could be involved in the service outage and get the component alarms of the suspected components from EMS systems.
- Correlation from service alarms to impacted VPN subscribers/users. From a service alarm, the correlation engine may be used to determine the users impacted by the service outage.
- Advanced correlation capabilities, that involve an expert system with its rule set. It allows the operator to view only the component alarms that are relevant for the diagnosis.

The system may further be implemented alongside a CPE router manager, which may offer full access to remote VPN elements information and full access to the inventory database. The CPE router manager can preferably monitor a large range of equipment namely Cisco, Juniper, Riverstone and Unisphere and Nortel Networks.

According to a preferable embodiment the CPE router manager monitors the status of CE, PE and P routers of a particular user or VPN providing, for example user and subscription details, traffic history and on-demand polling. The polling function is preferably customizable, for example a group of selected equipment (i.e. serving the same VPN) can be polled at regular intervals for specified durations. The CPE router manager is preferably integrated with the ICFM and may allow remote debugging and fixing of faults, which may significantly reduce the lead time for outage resolution.

A VPN Network Manager may also be provided to monitor, report and generate alarms for MPLS and IPSec network performances. The VPN Network Manager may operate by polling the groups of physical and logical equipment on customized periods and duration. According to a highly preferable feature, the VPN Network Manager may be integrated with the IIP VPN. When a new PE-CE link is provisioned and activated via IIP VPN, the VPN Network Manager may be automatically updated with this addition. The VPN Network Manager may then poll this new link for the metrics that have been defined for the VPN. The VPN Network Manager preferably monitors metrics specific to MPLS and IPSec technologies, as well as metrics common to the two, like memory and CPU usage.

For MPLS VPN services, VPN Network Manager is preferably arranged to poll the performance of the VPN network, for example per network equipment (physical or logical), per CE-PE routes and for the entire VPN. For each of these scopes some or all of the following metrics may be monitored: Jitter, Delay, Packet loss, Throughput, VRF availability. The VNP Network Manager may also monitor Quality-of-Service (QoS) metrics as traffic management, policy and Class-of-Service (CoS) split per equipment or VPN.

For a given VRF, the VPN Network Manager preferably also monitors traffic shaping and congestion with standards such as Generic Traffic Shaping or Frame Relay Traffic Shaping (providing history for queuing). The VPN Network Manager may also monitor the policy performance based on CAR and D-CAR.

In order to anticipate outages on the PE-CE links and based on DiffServ standards (RFC 2597 (AF), RFC 2598 (EF), RFC 2474 & 2475 (DSCP) and RFC 791, the VPN Network Manager preferably also provides statistics about the different Class-of-Services. This may be done, for example, per VRF, for reallocation of the workload, per CE, PE, P routers for creation of alternation links, per site, per VPN or per customer.

The VPN Network Manager may be arranged to monitor the network performance per CoS. The VPN Network Manager is preferably also designed to accommodate customized CoS, in particular those that are based on the DiffServ Standards.

IPSec MPLS VPN Services may be used in tunnel mode, which may allow the monitoring of metrics such as Jitter, Delay, Packet loss, Throughput and CE availability, for each of the created IPSec tunnels.

The VPN Network Manager is preferably implemented with a web-based interface with drill-down logical and physical network views for, for example, hourly, daily, monthly and yearly views. The views may be used to show the current situation and history for the provider administrative domain, the POP, the PE routers, the interfaces and the sub-interfaces. Due to its preferable VPN auto-discovery capabilities, the VPN Network Manager may also show the details for the customer VPN.

According to a further preferable feature, the VPN Network Manager may allow operators to define alarm generating thresholds for each of the monitored metrics. The monitoring reports may then be used by a Configuration Fault Manager for component fault isolations and by a Service Fault Manager for service fault isolation.

A Service Level Agreement (SLA) Manager may also be implemented as part of the system described above and may be used to measure customizable Key Performance Indicators (KPIs) and compare them with targeted VPN KPIs.

Major VPN service KPIs include:
Availability time for each service provided to users within the VPN. These services include Internet Access, mail, access to database or selected extranet sites, chat and Video-conferencing etc.
The service may be monitored per VPN, per PE-CE link (or IPSec tunnel), per location, per period (month, year).
The SLA manager may provide details about, for example:
The occurrence of service outage per service, per location or per period.
Performance of each VPN service (Response time, Bandwidth, QoS) per location of per period.
Time to repair after notification from the user, per severity of outage.

A comparison of the measured KPIs with targeted KPIs may be performed for each customer under a SLA. The SLA Manager preferably monitors and shows the KPI violation, identifies the time to fix a failure before the violation of the SLA and provides details about the remaining 'service non-availability' budget. The SLA Manager preferably orders the Service alarms based on, for example the risk of KPI violation and penalties incurred which may limit the risks of creating unreachable KPIs. According to a further feature, violation of the SLAs can be notified to the customer account manager and the customer by mail or web server notification. SLA reports can be generated for use in Crystal Reports or through a web interface.

A summary of some advantages of the ISA Suite for VPN is provided below:
A network operator can access a unique and immediate view of the service delivered to the network user.
The ISA suite provides seamless integration with pre-existing Provisioning Suites for VPN.
The ISA suite removes Complexity from the OSS and from VPN service assurance, providing fast access to critical information: impacted customer listings for pro-active customer care actions, service to component correlation for short-listing of the suspected failing elements andl immediate access to the necessary documents.
ISA Suite for VPN reduces the VPN network complexity with context-sensitive help and views of the service delivered to the user. ISA Suite for VPN interfaces with the most popular OSS and Network Management systems.
The ISA suite allows fast remote diagnosis since it allows remote access to the PE and CE and P routers in the VPN and also provides a wide range of tools supporting a large range of vendor equipment, protocols, standards and technologies.
Flexible and Scalable deployment scenarios may be implemented and a suite of stand-alone agents, may be positioned at critical points in the network. The ISFM may further offer customizable Front-Ends for customer self-care, service provider, network provider with granular lights and full integration of legacy systems.

The Configuration Manager

The methods and systems described herein may further be implemented in conjunction with a configuration manager, which may be implemented to automate the configuration steps for providing services to users in a broadband network whilst maintaining flexibility in the configuration process and adapting to future evolution in the broadband environment.

According to a preferred embodiment, the Configuration Manager simplifies all the configuration steps to a command sentence from a Verb/Entity/Attributes (VEA) language. The VEA language provides a grammar which applies a verb on an entity, and qualifies a verb with an attribute. According to a preferred embodiment, the entity is the equipment, the verb is the action and the attribute is the configuration parameter set. Use of the VEA language reduces the risk of configuration errors in the configuration process. The entities, verbs and attributes are preferably dependent on the provider and module in use (i.e. MPLS or IPSec). Each module may be provided with a vocabulary description or dictionary and each backend preferably has a well-defined interface that is coupled with a dictionary. The dictionaries may also be enhanced with new 'entities' (i.e. equipment), new 'verbs' and 'attributes' (i.e. new protocols).

The configuration manager may also be provided with a template library, which classifies the templates in association with the hardware platform, the software version, the functionalities and the context. The templates can be created from multiple sources, for example MS Excel spreadsheets, manual entry or the IIP VPN module. The template library may allow replication of the configuration to many devices, or to the same device multiple times.

An example of the operation of one embodiment of the configuration manager is provided below by way of example. When the operator provisions a VPN element, preferably using the VEA syntax, the Configuration Manager automatically selects the correct template from the template library, calls the necessary information about the impacted equipment from an Inventory Manager, creates the proper un-do actions and generates the new configlet. The Configuration Manager may then notify the operator who visualizes the changes and commits the action, requesting the Configuration Manager to deploy the new configuration to the group of devices using various methods like telnet, tftp, ftp, SNMP, and others. The Configuration Manager then preferably audits the deployment and provides a selection of potential remedies when errors are identified. Once deployed, Configuration Manager may save and edit the version of the new configuration. Preferably, the Configuration Manager can be emulated by the IIP VPN scheduler for 'just-in-time' configuration.

Figure 62:
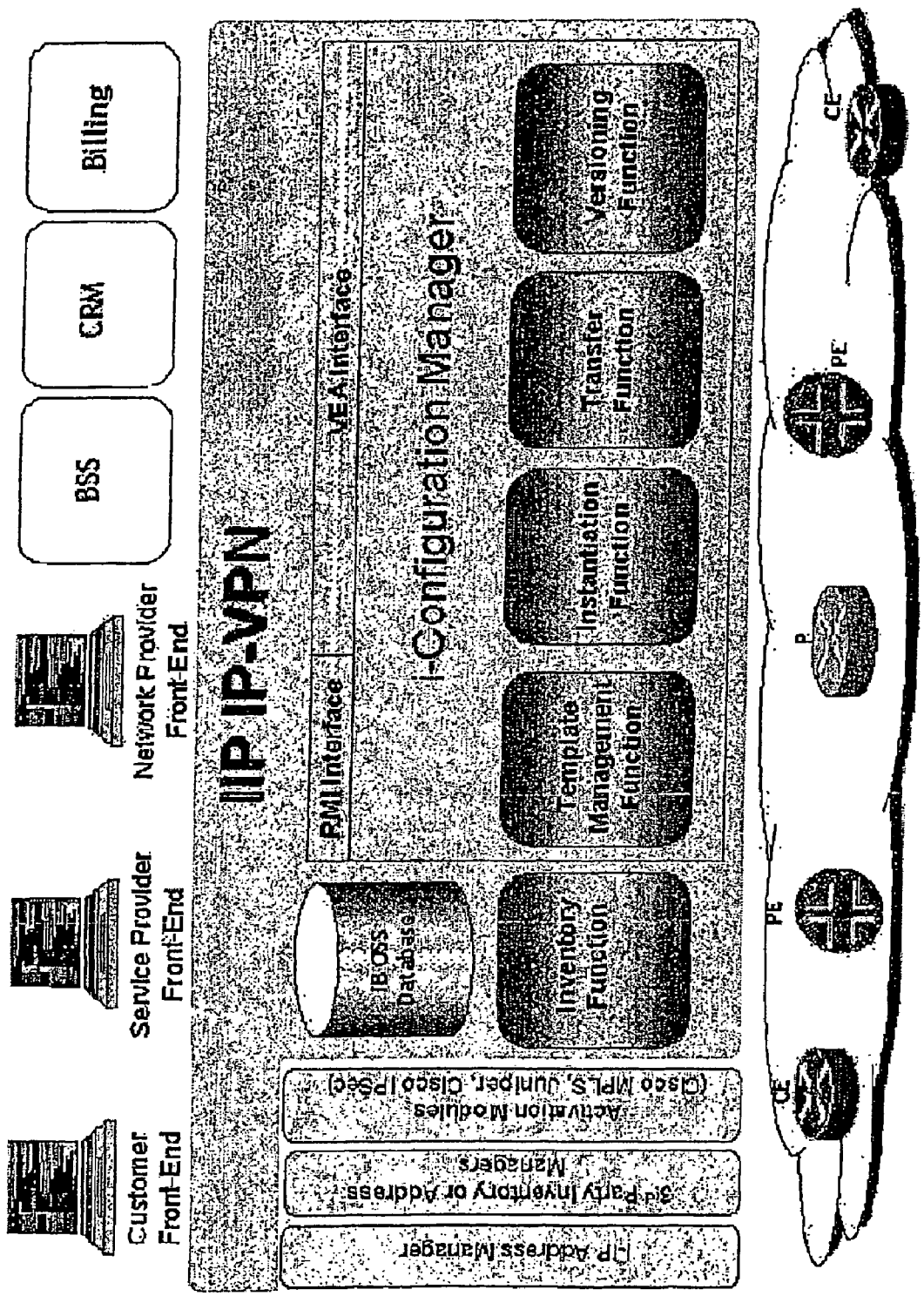
FIG. 62 illustrates one embodiment of the architecture of the Configuration Manager and the integration of the Configuration Manager into a VPN provisioning network.

FIG. 62 illustrates one embodiment of the architecture of the Configuration Manager and the integration of the Configuration Manager into a VPN provisioning network.

VPN Provisioning

A further aspect of the provisioning methods and systems disclosed herein may be the provisioning of VPN services. Advantageously, the VPN provisioning system described herein is vendor-agnostic and enables central or distributed end-to-end VPN provisioning from a single front-end.

Figure 63:
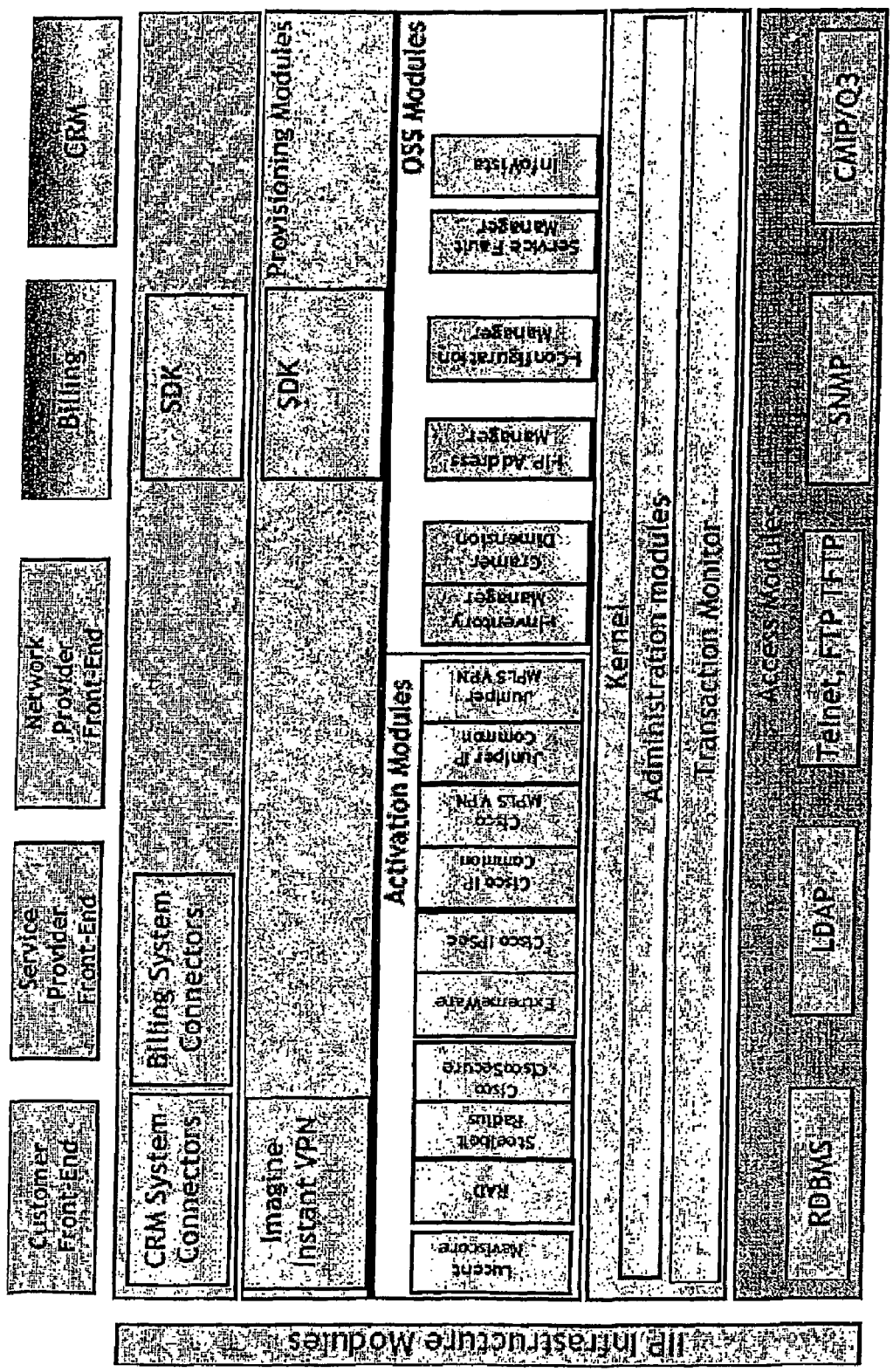
FIG. 63 illustrates how a VPN provisioning system may be incorporated into a network according to one embodiment of the systems and methods described herein.

The VPN provisioning system (IIP VPN) may be implemented as a stand-alone system, but is preferably implemented with other systems and tools described herein. FIG. 63 illustrates how the VPN provisioning system may be incorporated into a network according to one embodiment of the systems and methods described herein.

According to a preferable embodiment, IIP VPN automates the end-to-end process of provisioning customer, service and management MPLS and IPSec VPNs regardless of the routing equipment in the network.

According to a preferred embodiment, the IIP VPN operates as outlined below: the IIP VPN receives the business service requests from the operator's CRM or from the network provider's IIP VPN front-end. The operator provisions the PE-CE links or tunnels and the associated Quality-of-Service (QoS) level completing assisted fields. It then deploys the configurations that activate the new MPLS and IPSec VPN service.

Preferably, the IIP VPN can preferably check the CE/PE configuration by executing a static audit. It can also generate an I-SEA agent scenario that will test the full VPN service, for example testing the links, the QoS and the security. 'Just-in-time' activation of the VPN services may be provided by scheduling the download or upload of the configurations to the CE or the PE. A record of the actions is preferably maintained by OSS database, which may allow roll-back or undo of the configurations.

A Software Development Kit (SDK) may allow the network provider to offer web-based, user-friendly interfaces to service providers or to end users for self-activation. It may also keep direct access to the CLI for batch edition.

According to a further preferred feature, IIP VPN fully integrates with the network provider's systems for billing and customer management and may further be provided with reporting capabilities, which may include graphical views of the VPN, status and metrics reports which are useful in meeting Service Level Agreement (SLA) targets.

IIP VPN is preferably built around a modular IIP infrastructure. Some or all of the following elements may be used to enable MPLS and IPSec VPN seamless provisioning:

The IP VPN SDK

The IIP VPN SDK allows flexibility in creating automated configlet templates to be used for provisioning, for example PE-CE (Provider Edge—Customer Edge) links and the QoS definition for MPLS VPN, the IPSec tunnel endpoints, the security and authentification methods. The flexibility is achieved by allowing a network operator to independently design the automation of its provisioning workflow and the alteration of PE/CE configlets. This may allow a system in which no re-compilation of the application is necessary unlike in prior alt automated provisioning systems. This may allow The network provider to keep to its current provisioning workflow and to independently plan its evolution.

Templates from OSS and BSS systems are preferably used to limit the number of necessary actions in the provisioning and to automatically complete the maximum number of parameters in the configlet.

Three scenarios that may occur while creating a new configlet template are discussed below by way of example.

1. The change is made to the configlet template and does not imply any change to the parameters; for example it may be the case for NTP and SNMP. In this case, the network engineer may save the changes in a template library, which allows the IIP VPN to provision these devices with the updated configlets in an automated way. In this scenario, only the network engineer is needed to make the modifications, no additional expertise is required.

2. In the second scenario, the network provider can decide:
    to adapt its provision workflow; the network operator may decide to add a QoS provisioning step in the workflow, reflecting an enhancement of its commercial offer.
    to manually modify a parameter in the configlet; it can be a change of the IP address or a new RT.

As in the previous scenario, the network engineer can modify the configlet template. The IIP VPN administrator may then update the IIP VPN VEA dictionary and the IIP VPN back-end may be stopped and restarted to have the modifications activated for the future automated provisioning. In this case again, the network provider can evolve its configlet library with limited expertise required.

3. In the final scenario, the network provider uses parameters that are generated by an algorithm. It can be, for example an IKE hash algorithm for tunnel endpoints authentication for IPSec VPN. The network provider may then use the SDK to implement the new "methods" used by the IIP VPN VEA dictionary to automatically retrieve the new parameters. The network engineer may create the new configlet template and the administrator may update the IIP VPN VEA dictionary with the new methods. The IIP VPN back end may then be stopped and restarted to active the changes. The network provider has the capability to independently complete this task using its own Java specialist who has been trained to the IIP VPN SDK.

As shown in the examples above, the network provider has the independence to evolve its provisioning automation process with very limited dedicated expertise resources, without complexity, and in a very short timeframe.

The IIP VPN SDK is preferably provided with a template library. Preferably, by means of the IIP VPN SDK, the network provider can independently organize the template library according to the scope of the template's use. The template library may be used as a repository for predefined configlets. According to a preferred embodiment, the library is based on a drill-down tree structure and reflects the following organization:
- Site
- Client
- VPN
- Operator Site
- Operator Network
- All operators This structure can preferably be customized to ease the retrieval and use of the configlets for specific deployment purposes.

A Verb Entity Attributes (VEA) Dictionary may also be deployed as part of the provisioning system. According to a preferred embodiment, the IIP VPN VEA dictionary contains four major functions:
- The Creation function, addresses the MPLS backbone (Traffic Engineering).
- The Provisioning function is usually divided into the following 3 steps but the network provider can create additional steps to reflect its service creation workflow:
1. The pre-provisioning of the PE and CE
2. The provisioning of the VPN
3. The provisioning of the QoS For IPSec VPN provisioning, the steps preferably include:
1. Traffic flow selection
2. Choice of the security parameters
3. Choice of the VPN topology and selection of the endpoints authentication methods When pre-provisioning a PE or a CE, the right configlets should be used or instantiated for edition of the parameters. When the creation of a new configlet template is necessary because of the evolutions of the VPN service offer or because of the technology, the configlet may then be saved into the VEA dictionary for future use. This process optimizes the automation of the provisioning and gives flexibility to enrich the VEA library with additional configlet templates.
- The Inventory function may provide static views of the VPNs and PE/CE equipments per Customer, per VPN, or per site.
- The Reporting function may provide SLA oriented information about the VPNs, the CE/PE, and the provisioning dates. This reporting function preferably interfaces with the I-SEA Suite for MPLS and with Cisco SAA to report about the VPN service provisioning performance.

Figure 64:
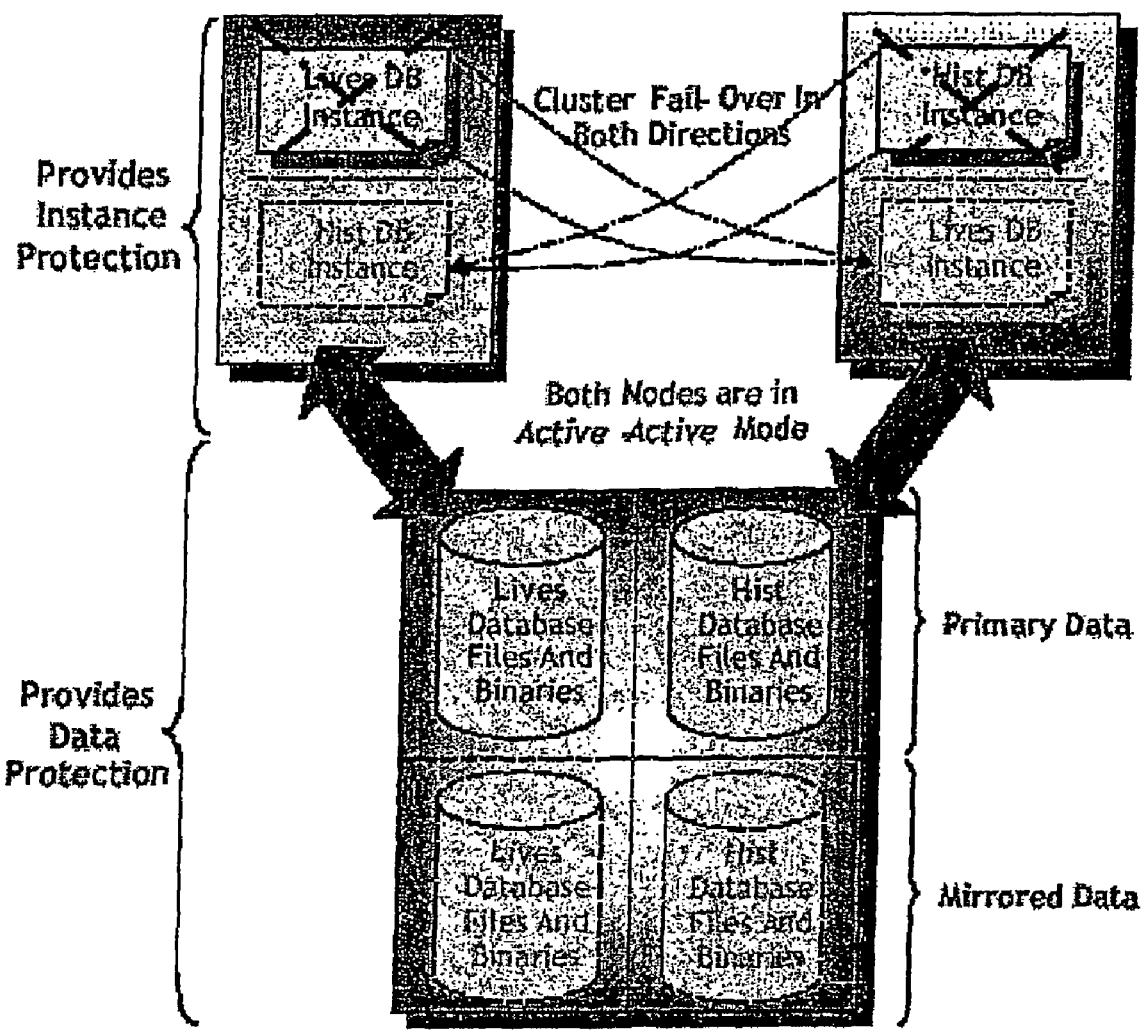
FIG. 64 illustrates one embodiment of the OSS database with the high availability cluster in active-active mode.

In addition to the IIP VPN Configuration Manager and SDK, other modules may be solicited in the provisioning flow.
- A further element that may be used in MPLS and IPSec provisioning is the EB OSS Database The OSS database may be used to modelize the network and systems infrastructure and maintain the configurations of the CPE, the customer and user information and the service details. The database is preferably implemented as a high availability database, may be based on Oracle and preferably follows the JTU M3100 recommendations for redundancy and data integrity. It preferably works on an active-active mode and offers a full back-up, recovery for 'instances' and data protection. FIG. 64 illustrates one embodiment of the OSS database with the high availability cluster in active-active mode.

Inventory Manager

IIP VPN preferably uses the inventory capabilities of an Inventory Manager. The Inventory Manager's primary role is to monitor the CE, PE and P routers availability and their configurations, in order to support the link or tunnel creation. The SDK may collect information, such as that outlined below, from the Inventory Manager:
- Physical and logical inventory of the network elements
- Configuration inventory of existing VPNs
- IP Routing used
- Capacity: PE and CE interfaces, VRF capacity per PE.
- Location and topology information
- QoS In the context of Layer 2 MPLS VPN, the Inventory Manager preferably collects the PE and the CE endpoints configuration (CE ID, CE range, logical circuits, node colours and role).

The IIP VPN provisioning system is preferably implemented in conjunction with an IP Address Manager, which is described in more detail herein. IIP .VPN nay use the IP Address Manager to get the PE, CE, P router IP addresses, and the subnets in the network. Specifically for MPLS VPN, the IP Address Manager preferably also provides:
- the Route Distinguishers (RD) and Route Targets (RT) current assignments
- BGP Autonomous Systems Network elements
- The routing context of VPNs
- The VRF routing tables For IPSec VPN, the IP Address Manager preferably provides:
- The subnets details for identifying the traffic that will be protected.
- The IP Address of the equipments that will serve as tunnel endpoints.

The IIP VPN is preferably also implemented in conjunction with a Configuration Manager, which may be used to create, add and edit the configlets per MPLS or IPSec domain. The Configuration Manager may also create the RD and the RT and configure the VRFs. For IPSec VPN provisioning, Configuration Manager preferably leverages a system such as Cisco's IOS to select the traffic flows. It may then edit the security parameters (IPSec and IKE), the VPN topology, the authentication methods (e.g. pre-shared keys or PKI) and apply them to the CEs. All common IPSec and IKE security algorithms are preferably supported by IIP VPN and Configuration Manager preferably negotiates new keys regularly and provides authentication services.

According to a preferred embodiment, the Configuration Manager allows multi-device and multi-vendor configuration in one step, for example Cisco IOS PE and CE, Cisco VPN 3000/5000, Juniper and Nortel PE/CEs. The Configuration Manager preferably uses the VEA (Verb Entity Attributes) language, which may be used to simplify the configlet creation. With the VEA, the operator uses a simple syntax for editing the configlet. However, the use of the VEA does not prevent the operator from immediately accessing the Command Line Interface (CLI), which may be useful for editing batches.

Once created, the configlets can preferably be downloaded to the VPN network elements via multiple technologies, for example TFTP, Telnet or FTP.

The Configuration Manager preferably provides a scheduler feature which may allow 'just-in-time' provisioning and activation of the VPN and planning capabilities. In the context of Managed Network Services, where the service provider delivers the CE to the customer, the scheduler may allow automatic activation of the service. The scheduler preferably also limits the necessary operator actions when BGP dampening parameters are configured in the CE or the PE.

According to a further preferable feature, the Configuration Manager may also enable static audits of the configuration. These static audits may be used to check that the configuration of the router has not been modified during the 'instantiation'. The Configuration Manager preferably also provides a repository for the configlets allowing roll-back and undo of the configlets. The roll-back action can be associated to the scheduler.

The Front-ends of the IIP VPN According to one Embodiment are Described Below

The web-based front-ends may be built and customized from a front-end SDK and may be connected to one or multiple back-ends.

Three kinds of front-ends are usually defined:
A Network Provider front-end
A Service Provider front-end; when the VPN service is not delivered by the network provider
A Customer front-end; offering self-provisioning capabilities.

Each of these front-ends can preferably be customized to allow different levels of access and rights. By means of the SDK, the network provider can preferably develop the screens and the flows, to reflect the rapid changes in the offering or infrastructure. The front-ends are the interfaces for accessing the graphical views of the VPNs, which may include:
CPE to CPE tunnelsfor.IPSec.VPNs.
PE and CE views or CE to CE views for MPLS VPNs The GUI Command Line Interface is preferably accessible from the front-ends for the creation of batches.

I-SEA Suite for VPN

The IIP VPN is preferably implemented in conjunction with agents, which may be used to test and monitor VPN services. The agents are also described herein in more detail. The I-SEA agent preferably executes a "round robin" scenario where the features of the created VPN may be tested. The agent can preferably test, for example the PE and CE links and tunnels, the security, the QoS, the performance by Class-of-Service and the central services (such as mail, internet access, VoIP, etc). It may also be used to monitor the management links and services. A single I-SEA agent can be used to monitor multiple VRF on a PE. The switch from one VRF to another is preferably immediate and operation on the PE is not required. The I-SEA agent preferably also offers a web interface for direct access and creation of the scenario.

The alarms may be collected by a Service Fault Manager (also described in more detail herein) which may be used to compile the results from all ISEA agents and provide audit and accounting reports. The reports are preferably accessible from two web-based interfaces for customer operation and service operation.

The IIP VPN system is preferably implemented in conjunction with a Component Fault Manager for MPLS.

The Component Fault Manager preferably collects and manages all platform component alarms (for example, Micromuse, HP ITO, Compaq TeMIP, BMC Patrol). The Component Fault Manager is preferably associated with the Service Fault Manager and maybe used to correlate the service and component alarms to identify the failing component. A Java-based presentation module preferably provides a sophisticated user interface designed for Network Operators and Administrators (NOPs).

MPLS Network Manager

The MPLS Network Manager, if required, can be used to monitor the traffic engineering of the VPNs.

One Example of an MPLS VPN Provisioning Flow is Described in the Numbered Steps Below.
1. The network engineer creates a new Business Service Request (BSR) for a customer, describes it and assign it to an operator.
2. The operator creates a new site for the customer.
3. The operator initiates the PE-CE link provisioning by selecting the parameters from the pre-documented fields.
4. The operator executes a visual check of the created configlet and saves it.
5. The operator selects the L3 parameters, executes a visual check and saves it.
6. The new configuration can then be manually submitted.
7. Alternatively, the new configuration can be automatically submitted from the GUI
8. The operator then runs the static audit of the configuration.
9. The operator adds a VPN to the PE-CE link that he has created. He visually checks the new configlet.
10. The operator enters the routing parameters, operates a visual check, and saves the parameters.
11. The operator enters the QoS parameters, for example traffic marking, congestion avoidance and class-of-service.
12. He operates a visual check, submits the configuration to the PE and CE and runs a static audit The VPN is ready.
13. The operator can request a report for the new specific VPN. He will access the details of the PE and CE elements which belong to the VPN.

The IIP VPN is preferably designed to be multi-technology compliant and is preferably based on the well-established IETF standard RFC 2547 Bis for MPLS-based VPN, and the following routing protocols: RIP v2, BGP, Multi-protocol BGP (BGP-MP), Static routing and OSPF. IIP VPN can preferably provision IPSec-based VPN and automate the provisioning of IP-Sec tunnels encapsulation into MPLS VPN, a configuration that is well adapted to LAN-to-LAN VPN services. In addition to ATM and Frame-Relay, IP VPN preferably supports a large range of Layer 2 technologies, such as PPP, DSL, Optical Ethernet and HFC. IIP VPN is preferably designed to be vendor-agnostic. In particular, because of its flexible template edition capabilities, IIP VPN can activate MPLS VPN services on a large range of routing equipments, such as Cisco Systems, Juniper Networks and Riverstone Networks portfolio. This compliance makes IP VPN particularly suitable for use in MPLS VPN service provisioning in heterogeneous networks.

IIP VPN can preferably be implemented to provision any kind VPN topologies, for example: fullmesh, hub & spoke or partial-mesh VPNs for extranet applications lip VPN may provision one or multiple PE-CE links, managing the attributes of the BGP routing protocol. This may allow, for example, the following connectivity patterns:
A CE single-homed and non-redundant as connected to one PE interface.
Two CE dual-homed with HSRP on one PE interface.
Two physical interfaces on a CE interfacing to two PEs offering partial redundancy.
Two CE dual-homed with HSRP on two PEs offering full redundancy.

In addition, IIP VPN may provision ISDN redundancy solutions for single-homed, non-redundant configurations.

Quality-of-Service Provisioning:

In order to address the need for tiered VPN links, IIP VPN may further enable the provisioning of QoS features associated to PE-CE links.

Class-of-Service (CoS):

In an MPLS environment, the CoS is enforced on both the PE and the CE. IIP preferably uses imported ACL for defining and applying multiple traffic classes per subscriber or defining QoS profiles with pre-defined CoS allocation. In this case there is preferably one QoS profile per subscriber. With the imported ACLS, IIP VPN may offer a user flexible requirements and preferably complies with DiffServ's CoS standards-RFC 2597 (AF), RFC 2598 (EF); RFC 2474 & 2475 (DSCP) and RFC 791.

Traffic Shaping and Congestion Management:

In order to complement the CoS capabilities, MPLS IIP VPN preferably handles the traffic shaping configurations by configuring the PE or the CE egress interfaces and marking the traffic with D-WRED and Generic Traffic Shaping (GTS). IIP VPN preferably handles Frame Relay Traffic Shaping (FRTS) for Frame-Relay with the associated queue management protocols WQF, CBWQF, customed queuing (CQ), priority queuing (PQ), PQ-CBWFQ (LLQ) and the non-Frame Relay specific Generic Traffic Shaping (GTS) associated with complementary Frame Relay traffic shaping protocols; Forward Explicit Congestion Notification (FECM) and Backward Explicit Congestion Notification (BECN).

Policing:

As for traffic shaping, IIP VPN may configure the PE or the CE egress interface with policing configuration. IIP VPN preferably uses Committed Access Rate (CAR) and Distributed Commintted Access Rate (DCAR) protocols.

As a further feature of a preferred embodiment, the IIP VPN can provision Layer 2 MPLS VPNs following the IETF drafts 'Martini' and 'Kompella'. Leveraging 'Kompella' auto-discoveiy capabilities (BGP-MP) and Inventory Manager, IIP VPN preferably identifies die membership set of the VPN context and processing intended to receive the new VPN information. The Inventory Manager may then collect the topology information; the details related to the endpoints connectivity and the 'reachability' (VPN routes in the VPN space) that may be used by IIP VPN.

IIP VPN uses 'Kompella' CE indexation membership scheme which includes, for example:
  The VPN ID
  The CE ID
  The CE range, the number of CE within the VPN
  The Logical Circuits (e.g. DLCI or VLAN)
  The node colour that has to be shared for connectivity
  The role (Hub or spoke)

The L2 MPLS VPN provisioning preferably follows the L3 MPLS VPN workflow. IIP VPN preferably provisions the logical circuit, the node colour and the role of the CE. These 'connectivity' parameters preferably serve a similar purpose to LDP signalling in L3 MPLS VPN. The colour of the node and the role of the CE parameters preferably permit VPN topologies other than full-meshed. The provisioning workflow is easily adapted to the L2 MPLS VPN provisioning requirements with the IIP VPN SDK.

IPSec VPN

In the context of IPSec VPN provisioning, IIP VPN may be used to provision IPSec services and may be used in particular but not exclusively, to provision services with the following two protocols:
  Authentication Header (AH), RFC 2402
  Encapsulation Security Payload (ESP), RFC 2406

Using the AH protocol, IIP VPN can provision IPSec VPN using MD5-HMAC and SHA-1-HMAC authentification algorithms. Using the ESP protocol, IIP VPN can provision IPSec VPN using 56-bit DES, 3DES and should support Advanced Encryption Standard (AES). It may also provision authentication configlets using Blowfish.

IIP VPN can preferably Accommodate the Different Modes of IPSec:
  Tunnel Mode for passing security gateways when the destination host doesn't support IpSec as the IP packet is encapsulated into AH or ESP and then headed with a new IP header.
  Transport Mode where the AH or ESP is placed after the IP header.

For authentification and key management, UP VPN preferably allows manual keying or the use of IKE with the following mechanisms:
  Pre-shared keys where the operator manually enters the same key on each peer.
  Encrypted nonces where the asymmetric key is generated on a peer, collected by IIP VPN and copied to the other peers.
  Digital certificates where die key is generated by the certificate authority (CA) and pre-fed into IIP VPN.

IIP VPN preferably also provides the necessary templates for the automation of the IPSec VPN configlet edition.

Some of the benefits and advantages of the IIP MPLS VPN system are outlined briefly below:
  End-to-end and Seamless VPN Provisioning from a single Front-End may be provided IIP VPN preferably provisions MPLS and IPSec VPN on multi-technology access and edge from single customizable front-ends. The same tool may be used for, for example, Frame-Relay, xDSL, Cable, Optical customers, for MPLS/BGP VPN, Layer 2 MPLS VPN and IPSec VPN.
  Web-based and CLI Front Ends. IIP VPN SDK preferably allows flexible adaptation of the templates, workflow and front-end screens to the network operator situation. The network provider can offer GUI front ends to the service providers and self-activation to the customers. In addition, the network provider can implement VPN service provision through batches generated in the GUI CLI.
  The IIP VPN system is both scalable and distributed.
  Flexible SDK-based. According to a preferred embodiment, the network operator can easily evolve the activation modules, the interfaces reflecting the changes in the workflows, infrastructure, service offering.
  The system is preferably operationally integrated with the BSS and OSS modules, which enables timely and precise billing and customer support. Interfaced to CRM systems, IIP VPN allows flexible changes of, for example the QoS, the customer CoS, the service pack, VPN.
  IIP VPN is preferably compliant with multiple-vendors, multiple-routing protocols, multiple-OS and hence facilitates the provisioning of VPN services in a heterogeneous infrastructure.

It will be appreciated by the skilled person that there have been described herein numerous aspects and preferred features, including independent methods, tools, agents, interfaces, particularly graphical user interfaces, services, data products for use in a variety of communications problems, including without limitation provisioning and related activities, capacity planning, service monitoring, component monitoring, device management and the like. As apparent and as discussed, some of these may combine synergistically with other features and indeed may enable provision of novel services and applications. However, for the avoidance of doubt, unless otherwise stated, all features disclosed herein, whether as aspects, clauses, features explicitly stated to be preferred, claims or simply as individually identifiable preferred features may be provided independently of other features. In particular, whilst many features have application to provisioning of services and can offer significant advantages in combination with a provisioning application or method, it will be appreciated that these may be applied independently. The examples given have included a variety of broadband communications protocols, including cable modem access, DSL, VPN purely by way of example. The features techniques and tools etc disclosed herein may be applied to other hardware configurations or communications modes, if necessary with changes as will be apparent to the skilled person.

A large number of features have been described and in several places the foregoing has provided numerous lists of preferred or optional features, for example in relation to sample actions or functions that may be performed, data that may be stored, displayed or communicated, parameters that may be monitored or changed, options that may be provided. In all lists of preferred features herein, unless otherwise explicitly stated, whilst provision of the complete set of features as listed may be advantageous, it is specifically intended that any one of the features listed, or any sub combination, may be provided independently of other listed or accompanying features. The advantages of providing any said features independently will be apparent to the skilled person and may not therefore have been stated explicitly in the interests of conciseness. Whilst described and applied to advantage in a broadband context, where problems peculiar to broadband communications may be solved, aspects and features of the invention may be more generally applied.

The invention claimed is:

1. A computer-implemented method comprising:
    receiving, from a service provider, a request to activate a software agent for monitoring an assured virtual private network (VPN) service provided over a provisioned connection on a broadband network, wherein the provisioned connection exists between the service provider and an end-user client device;
    activating the software agent based on receiving the request;
    selecting, by the software agent, a Class-of-Service specific testing scenario for monitoring the assured VPN service from among multiple available testing scenarios, wherein the testing scenario is selected using a round robin scenario;
    monitoring, by the software agent, a series of Key Performance Indicators (KPIs) associated with the assured VPN service on the provisioned connection by simulating end-user activity on the client device according to the testing scenario;
    comparing a result of simulating the end-user activity to Service Level Agreement metrics associated with a Class-of-Service that the user of the end-user client device is entitled to access; and
    sending, by the software agent, a result of the comparison to a remote component of the broadband network.

2. The computer-implemented method of claim 1, further comprising compiling, by a software fault manager, the result of the testing by the software agent.

3. The computer-implemented method of claim 2, wherein the result includes an alarm.

4. The computer-implemented method of claim 2, wherein the result includes equipment status or identification information.

5. The computer-implemented method of claim 1, further comprising accessing, by a network operator using a web interface, the remote component of the broadband network.

6. The computer-implemented method of claim 5, further comprising obtaining, by the network operator, the result of the simulated end-user activity from the remote component of the broadband network.

7. The computer-implemented method of claim 1, further comprising providing, by the software agent, a web interface for direct access and creation of the multiple testing scenarios.

8. The computer-implemented method of claim 1, wherein the testing scenario tests one of a provider edge (PE) link, a custom edge (CE) link, an Internet Protocol Security (IPSec) tunnel, network security, quality of service (QoS), and performance by class-of-service and central services.

9. The computer-implemented method of claim 1, wherein the testing scenario monitors management links and services.

10. The computer-implemented method of claim 1, wherein the testing scenario monitors an end-user's internet protocol (IP) service on the VPN connection.

11. A non-transitory computer storage medium encoded with a computer program, the program comprising instructions that when executed by one or more computers cause the one or more computers to perform operations comprising:
    receiving, from a service provider, a request to activate a software agent for monitoring an assured virtual private network (VPN) service provided over a provisioned connection on a broadband network, wherein the provisioned connection exists between the service provider and an end-user client device;
    activating the software agent based on receiving the request; selecting, by the software agent, a Class-of-Service specific testing scenario for monitoring the assured VPN service from among multiple available testing scenarios, wherein the testing scenario is selected using a round robin scenario;
    monitoring, by the software agent, a series of Key Performance Indicators (KPIs) associated with the assured VPN service on the provisioned connection by simulating end-user activity on the client device according to the testing scenario;
    comparing a result of simulating the end-user activity to Service Level Agreement metrics associated with a Class-of-Service that the user of the end-user client device is entitled to access; and
    sending, by the software agent, a result of the comparison to a remote component of the broadband network.

12. The computer-implemented method of claim 1, further comprising providing, by an operator, the request to activate the software agent.

13. The computer-implemented method of claim 2, wherein the software fault manager provides audit and accounting reports that include the compiled result of the testing by the software agent by one of VPN domain, customer or site.

14. The computer storage medium of claim 11, wherein the operations further comprise compiling, by a software fault manager, the result of the testing by the software agent.

15. The computer storage medium of claim 14, wherein the result includes an alarm.

16. The computer storage medium of claim 14, wherein the result includes equipment status or identification information.

17. The computer storage medium of claim 11, wherein the operations further comprise accessing, by a network operator using a web interface, the remote component of the broadband network.

18. The computer storage medium of claim 17, wherein the operations further comprise obtaining, by the network operator, the result of the simulated end- user activity from the remote component of the broadband network.

19. The computer-implemented method of claim 1, wherein the software agent is located in a Point-Of-Presence (POP) for the broadband network.

20. A system comprising:
   one or more computers; and
   a non-transitory computer-readable medium coupled to the one or more computers having instructions stored thereon which, when executed by the one or more computers, cause the one or more computers to perform operations comprising:
      receiving, from a service provider, a request to activate a software agent for monitoring an assured virtual private network (VPN) service provided over a provisioned connection on a broadband network, wherein the provisioned connection exists between the service provider and an end-user client device,
      activating the software agent based on receiving the request;
      selecting, by the software agent, a Class-of-Service specific testing scenario for monitoring the assured VPN service from among multiple available testing scenarios, wherein the testing scenario is selected using a round robin scenario;
      monitoring, by the software agent, a series of Key Performance Indicators (KPIs) associated with the assured VPN service on the provisioned connection by simulating end-user activity on the client device according to the testing scenario,
      comparing a result of simulating the end-user activity to Service Level Agreement metrics associated with a Class-of-Service that the user of the end-user client device is entitled to access; and
      sending, by the software agent, a result of the comparison to a remote component of the broadband network.

* * * * *

UNITED STATES PATENT AND TRADEMARK OFFICE
CERTIFICATE OF CORRECTION

| | | |
|---|---|---|
| PATENT NO. | : 7,987,228 B2 | Page 1 of 1 |
| APPLICATION NO. | : 10/481933 | |
| DATED | : July 26, 2011 | |
| INVENTOR(S) | : Jean Christophe McKeown and Henri Chabrier | |

It is certified that error appears in the above-identified patent and that said Letters Patent is hereby corrected as shown below:

Claim 18, Line 3, Column 87, Line 1, delete "end- user" and insert --end-user--, therefor.

Signed and Sealed this
Twenty-seventh Day of September, 2011

David J. Kappos
*Director of the United States Patent and Trademark Office*